US 6,888,683 B2

(12) United States Patent
Itoh

(10) Patent No.: US 6,888,683 B2
(45) Date of Patent: May 3, 2005

(54) ZOOM LENS AND CAMERA

(75) Inventor: Yoshinori Itoh, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 85 days.

(21) Appl. No.: 10/147,103

(22) Filed: May 15, 2002

(65) Prior Publication Data

US 2003/0058548 A1 Mar. 27, 2003

(30) Foreign Application Priority Data

| May 17, 2001 | (JP) | ................................ 2001-147565 |
| Jun. 11, 2001 | (JP) | ................................ 2001-175882 |
| Jul. 2, 2001 | (JP) | ................................ 2001-200584 |

(51) Int. Cl.$^7$ ................................................ G02B 15/14
(52) U.S. Cl. ........................................ 359/686; 359/683
(58) Field of Search ................................ 359/686, 683

(56) References Cited

U.S. PATENT DOCUMENTS

| 4,662,723 | A | * | 5/1987 | Imai ........................... 350/426 |
| 4,687,302 | A | * | 8/1987 | Ikemori et al. ............. 350/427 |
| 4,802,747 | A | * | 2/1989 | Horiuchi ...................... 350/427 |
| 5,157,550 | A | * | 10/1992 | Tsuchida et al. ............ 359/686 |
| 5,434,710 | A | * | 7/1995 | Zozawa ....................... 359/689 |
| 5,452,134 | A | | 9/1995 | Sato |
| 5,999,324 | A | | 12/1999 | Kohno et al. |
| 6,124,984 | A | * | 9/2000 | Shibayama et al. ......... 359/689 |
| 6,191,896 | B1 | * | 2/2001 | Itoh ............................. 359/682 |
| 2002/0002772 | A1 | | 1/2002 | Hirano et al. |

FOREIGN PATENT DOCUMENTS

| JP | 60-31110 | * | 2/1985 |
| JP | S60-31110 | | 2/1985 |
| JP | 63-81313 | * | 4/1988 |
| JP | 3-296706 | * | 12/1991 |
| JP | H5-88084 | | 4/1993 |

(Continued)

OTHER PUBLICATIONS

Notice of reasons for rejection of JP2001–147565 dated Oct. 7, 2003 (with English translation).

Notice of reasons for rejection of JP2001–200584 dated Jul. 18, 2003 (with English translation).

Notice of reasons for rejection of JP2001–175882 dated Jul. 18, 2003 (with English translation).

Decision of Rejection of JP2001–175882 dated Oct. 20, 2003 (with English translation).

*Primary Examiner*—Scott J. Sugarman
(74) *Attorney, Agent, or Firm*—Morgan & Finnegan, L.L.P.

(57) ABSTRACT

The present invention discloses a zoom lens including:
 a first lens unit having negative optical power, the first lens unit having a negative lens element on a closest side to an object;
 a second lens unit having positive optical power, the second lens unit having two or more positive lens elements;
 a third lens unit having positive optical power; and
 a fourth lens unit having positive optical power, the fourth lens unit consisting of one positive lens component, said units arranged in the order presented from an object side to an image side,
 wherein at least the second lens unit and the third lens unit are moved toward the object for zooming from a wide angle side to a telephoto side such that a space between the first lens unit and the second lens unit is smaller, a space between the second lens unit and the third lens unit is smaller, and a space between the third lens unit and the fourth lens unit is larger at a telephoto end than at a wide angle end.

Thus, a zoom lens having fewer lenses, a compact body, and good optical performance, and a camera using the same can be realized.

42 Claims, 41 Drawing Sheets

FOREIGN PATENT DOCUMENTS

| | | | |
|---|---|---|---|
| JP | 5-173073 | * | 7/1993 |
| JP | 6-66008 | * | 8/1994 |
| JP | 7-82256 | * | 3/1995 |
| JP | H7-306362 | | 11/1995 |
| JP | H8-136803 | | 5/1996 |
| JP | H9-325271 | | 12/1997 |
| JP | 10-104520 | * | 4/1998 |
| JP | H10-170826 | | 6/1998 |
| JP | 11-23967 | * | 1/1999 |
| JP | 11-84242 | * | 3/1999 |
| JP | H11-194274 | | 7/1999 |
| JP | 2002-90624 | | 3/2002 |
| JP | 2002-323654 | | 11/2002 |

* cited by examiner

ZOOM LENS AND CAMERA

BACKGROUND OF THE INVENTION

1. Field of the Invention

The present invention relates to a zoom lens suitable for a camera such as a digital still camera or a digital video camera, and more particularly to a portable zoom lens with reduced variation in exit pupil positions during zooming, an increased angle of view, and a reduced total length of lenses.

2. Description of the Related Art

Digital still cameras and digital video cameras using a solid-state image pickup device have recently become multifunctional, and optical systems used therein have needed both high optical performance and reduced size.

Generally, a zoom lens used for a camera with a CCD such as a video camera is of a type including three to five lens units, a front lens unit among them consisting of lenses having positive, negative and positive refractive power, and a lens unit closest to an object being fixed during zooming.

For example, Japanese Patent Laid-Open No. 63-81313 proposes a zoom lens including four lens units having positive, negative, positive, and positive refractive power, and having an approximately 3× zoom ratio. Also, for example, Japanese Patent Laid-Open No. 3-296706 proposes a zoom lens with a higher zoom ratio that includes four lens units having positive, negative, positive, and positive refractive power, and having an appropriately 10× zoom ratio.

On the other hand, as a zoom lens for an electronic still camera for taking still images with a CCD, an optical system is required that has an extremely short total length of lenses, has a wide angle of view suitable for properties of the still images, and further has higher optical performance than a zoom lens used for a video camera for moving images.

As a lens including a wide angle area and achieving bright and high performance even with a relatively low zoom ratio of approximately 2.5 to 3×, Japanese Patent Publication No. 6-66008 or the like proposes a zoom lens including two lens units having negative and positive refractive power, zooming is performed by changing an air space of each lens unit.

Japanese Patent Laid-Open No. 7-82256 proposes a zoom lens including three lens units having negative, positive, and positive refractive power, a space between a second unit and a third unit increasing during zooming from a wide angle end to a telephoto end.

U.S. Pat. No. 5,434,710 discloses a zoom lens including three lens units having negative, positive, and positive refractive power, a space between a second unit and a third unit decreasing during zooming from a wide angle end to a telephoto end.

Japanese Patent Laid-Open No. 60-31110 proposes a zoom lens including four lens units having negative, positive, positive, and positive refractive power, a space between a second unit and a third unit decreasing, and a fourth unit being fixed during zooming from a wide angle end to a telephoto end.

Japanese Patent Laid-Open No. 10-104520 proposes discloses a zoom lens of a four-unit configuration including lens units having negative, positive, positive, and positive refractive power.

Japanese Patent Laid-Open No. 11-84242 proposes a zoom lens of a four unit type including lens units having negative, positive, positive, and positive refractive power, the zoom lens having a compact body, an approximately 3× zoom ratio, and relatively small exit pupil variation during zooming.

Multi-pixel solid-state image pickup devices have been recently increasing, and image taking lenses have needed higher optical performance than that of conventional lenses.

Especially, a zoom lens for a solid-state image pickup device is required that has telecentricity (an exit pupil position being remote from an image plane (if possible, infinity)) necessary for reducing shading, and has a reduced total length of lenses, a compact body, and a high zoom ratio.

A zoom lens with large exit pupil variation of a lens system during zooming can be used as a zoom lens for a silver camera, but when used for an electronic still camera with a CCD, power distribution is limited from a design viewpoint to increase a size of the total lens system.

In a zoom lens of a "negative lead type" in which a lens unit having negative refractive power is placed closest to an object, it is generally necessary to appropriately set refractive power distribution of each lens unit, a lens configuration of each lens unit, and a refractive index or an Abbe number of a material of each lens, in order to reduce the number of lenses of a total lens system, simplify a lens configuration, and achieve an increased angle of view and good optical performance across a zoom range. If the refractive power distribution of each lens unit, the lens configuration, and the material of the lens are inappropriately selected, aberration variation, particularly chromatic aberration variation in accordance with zooming increases to cause difficulty in achieving high optical performance across the zoom range.

For example, in the zoom lens of the conventional negative lead type, a positive lens in a first lens unit has been generally made of a glass material having an Abbe number of 24 or more. Thus, if the first lens unit is to consist of two lenses: a negative lens and a positive lens, the negative lens requires an aspheric lens with a large deflection ratio between center thickness and edge thickness to cause difficulty in manufacturing.

SUMMARY OF THE INVENTION

The present invention has an object to provide a zoom lens having fewer lenses, a compact body, and good optical performance, and a camera using the same.

Specifically, the present invention provides a negative lead type zoom lens with a front lens unit having negative refractive power, refractive power of each lens unit or a material of a lens being appropriately set to simplify a total lens system and achieve a wide angle of view and high optical performance across a zoom range, and a camera using the same.

A detailed configuration of the zoom lens of the invention and the above and other objects and features of the inventions will be apparent from the embodiments described below.

A detailed configuration of the of the invention; the above and other objects and features of the invention will be apparent from the embodiments) described below.

DETAILED DESCRIPTION OF THE PREFERRED EMBODIMENTS

Hereinafter, preferred embodiments of the invention will be described in detail with reference to the drawings.

Figure 1:
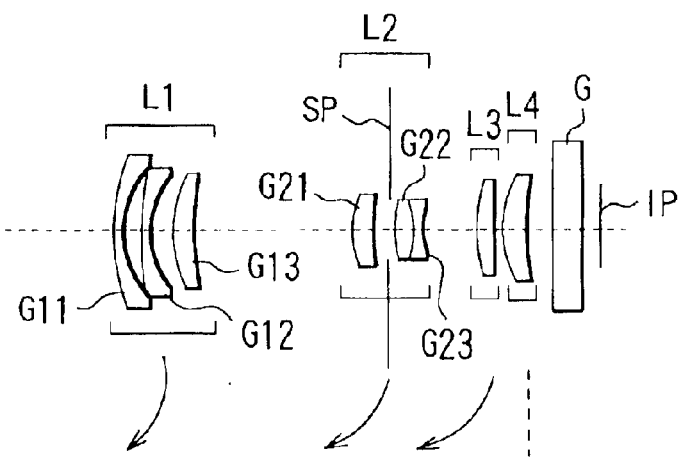
FIG. 1 is an optical sectional view of a zoom lens according to Embodiment 1 of the invention.
Figure 1:
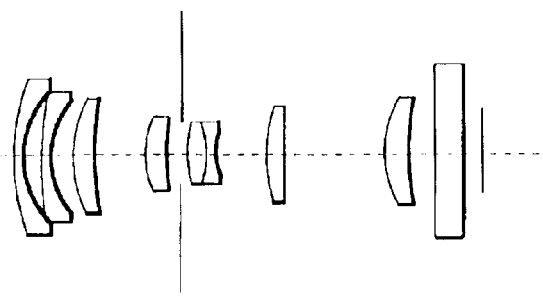
Figure 1:
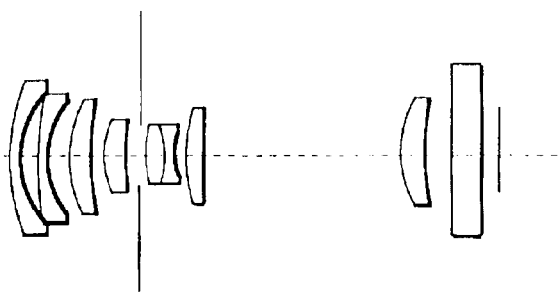
Figure 2:
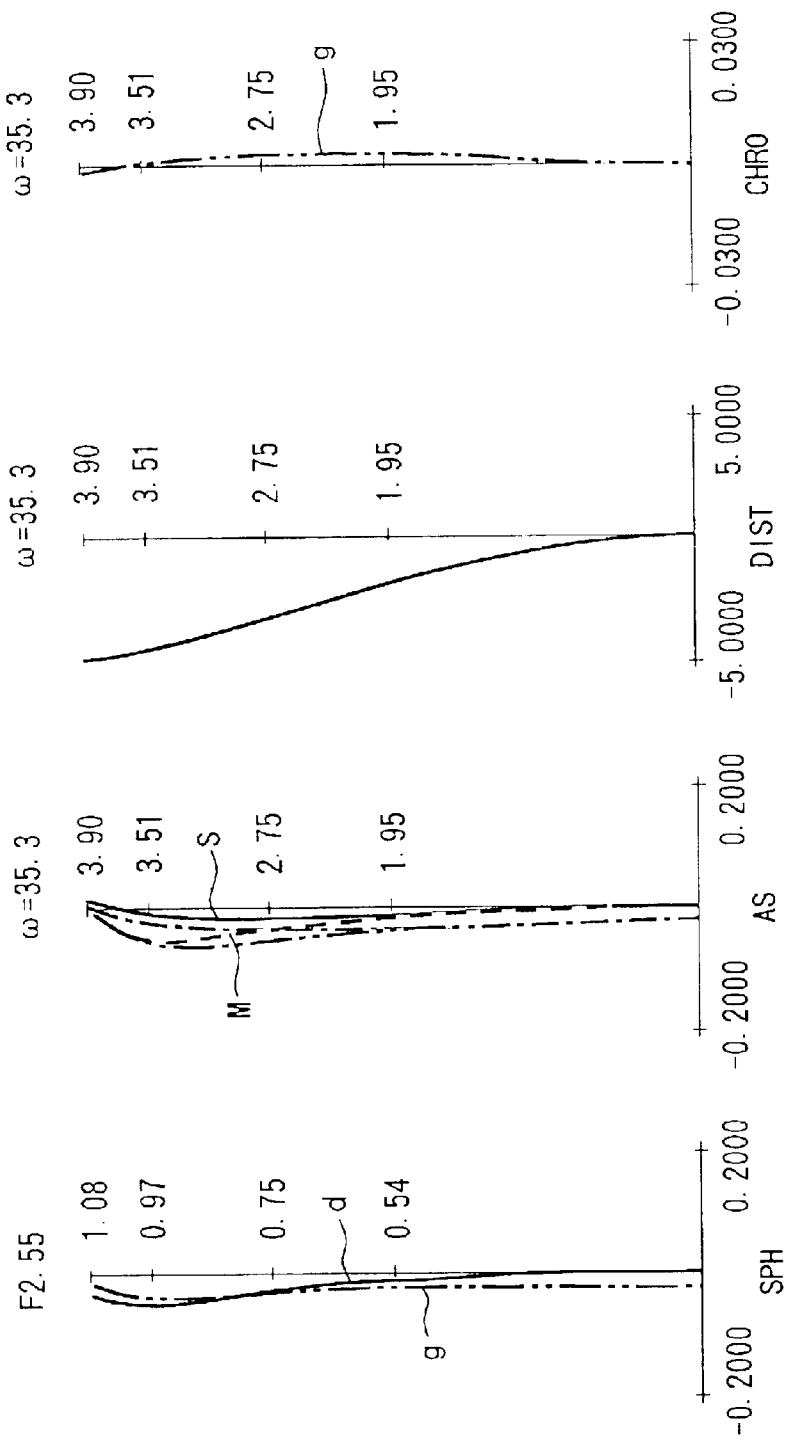
FIG. 2 shows aberration of the zoom lens of Embodiment 1 at a wide angle end.
Figure 3:
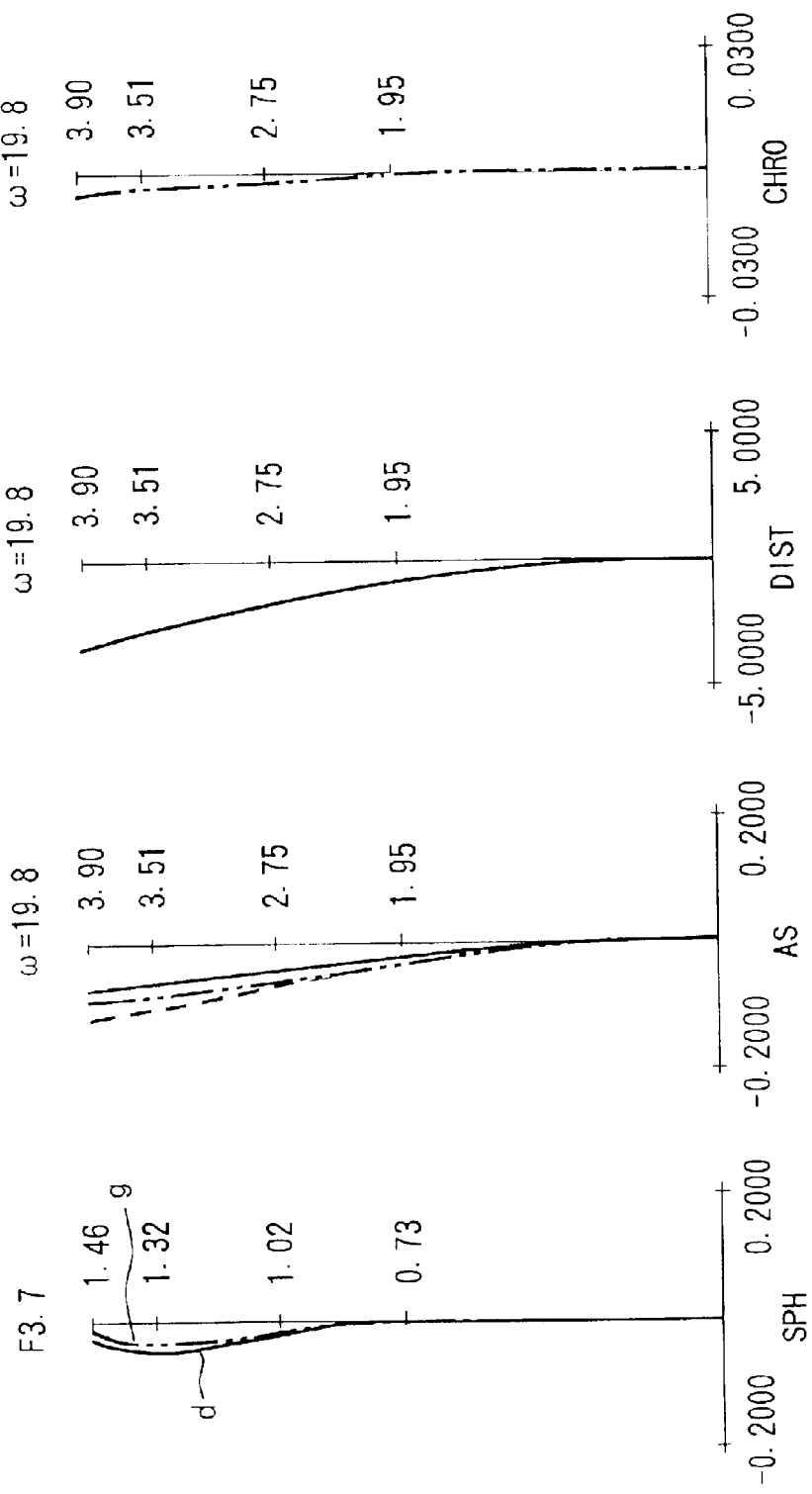
FIG. 3 shows aberration of the zoom lens of Embodiment 1 at an intermediate zoom position.
Figure 4:
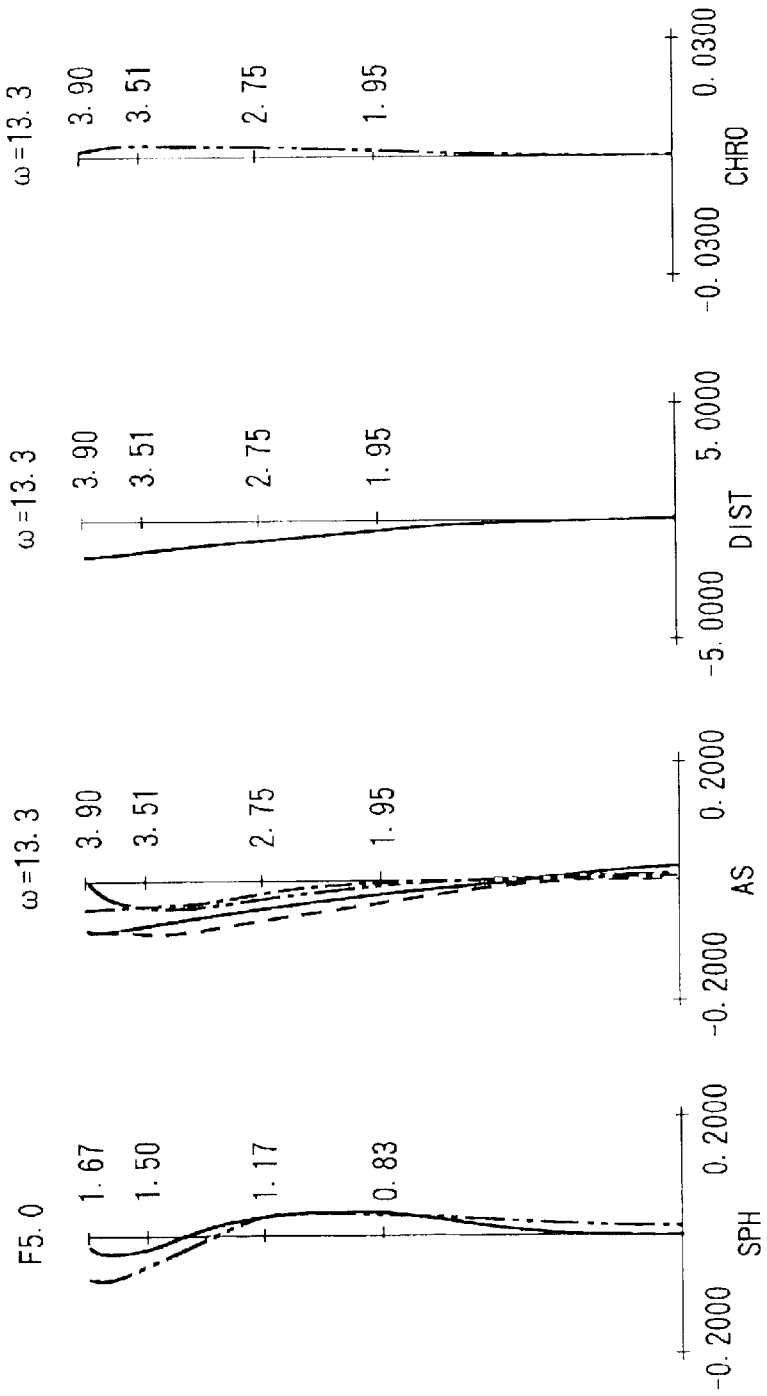
FIG. 4 shows aberration of the zoom lens of Embodiment 1 at a telephoto end.
Figure 5:
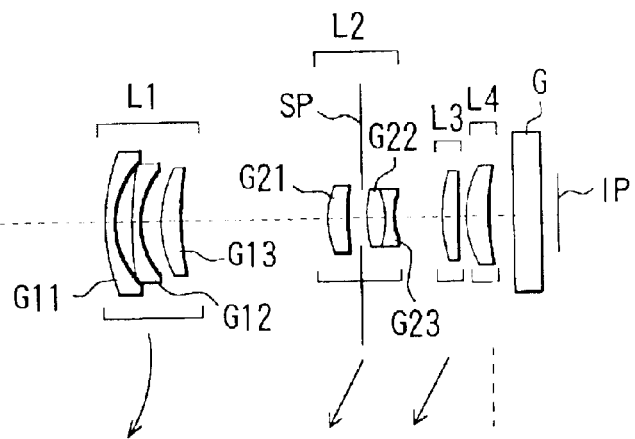
FIG. 5 is an optical sectional view of a zoom lens according to Embodiment 2 of the invention.
Figure 5:
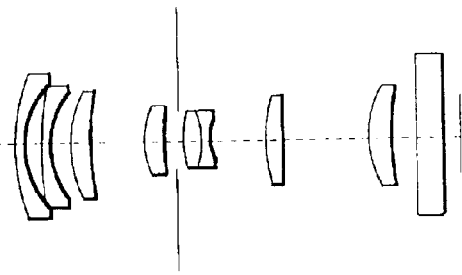
Figure 5:
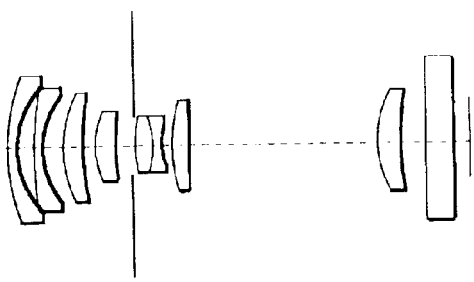
Figure 6:
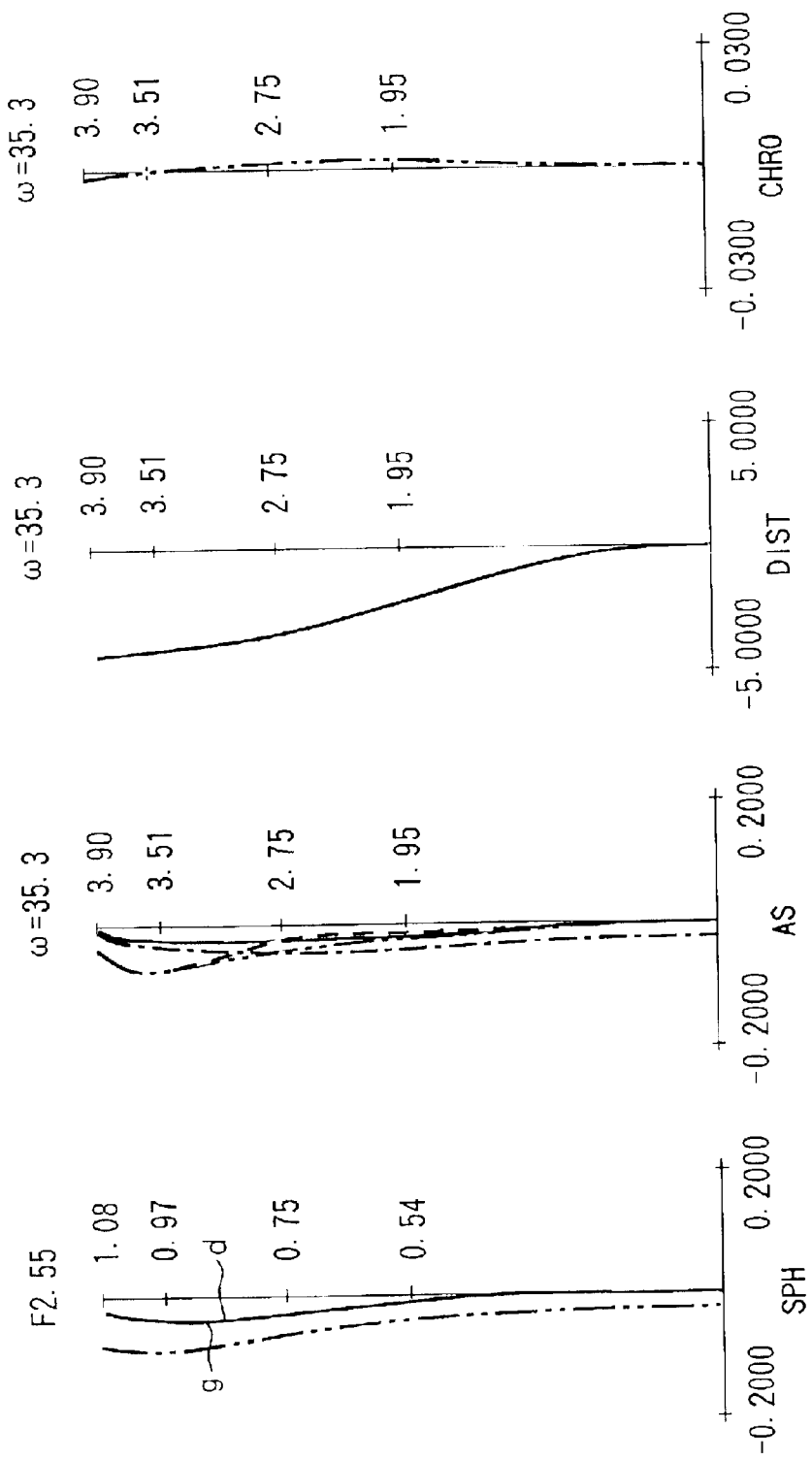
FIG. 6 shows aberration of the zoom lens of Embodiment 2 at a wide angle end.
Figure 7:
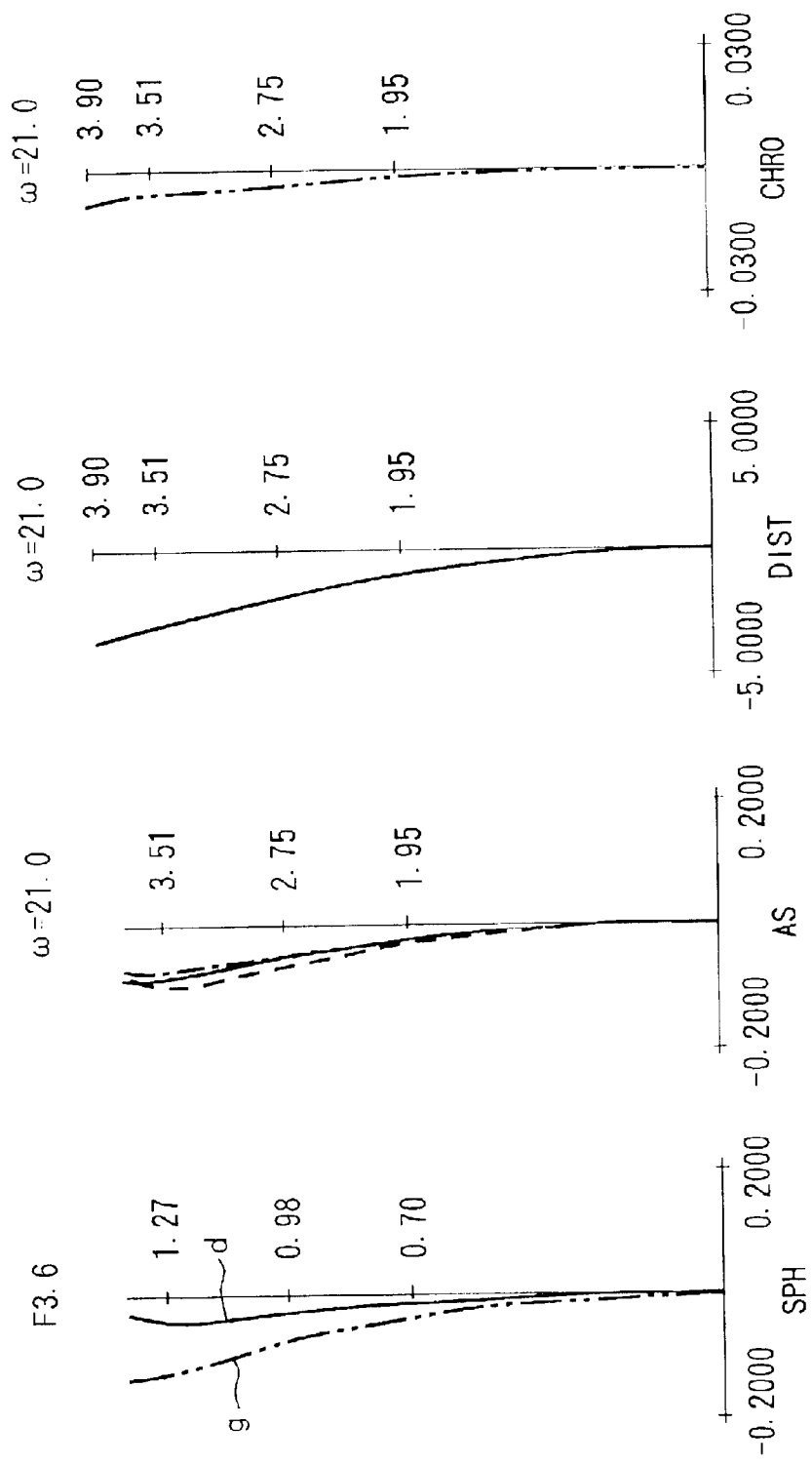
FIG. 7 shows aberration of the zoom lens of Embodiment 2 at an intermediate zoom position.
Figure 8:
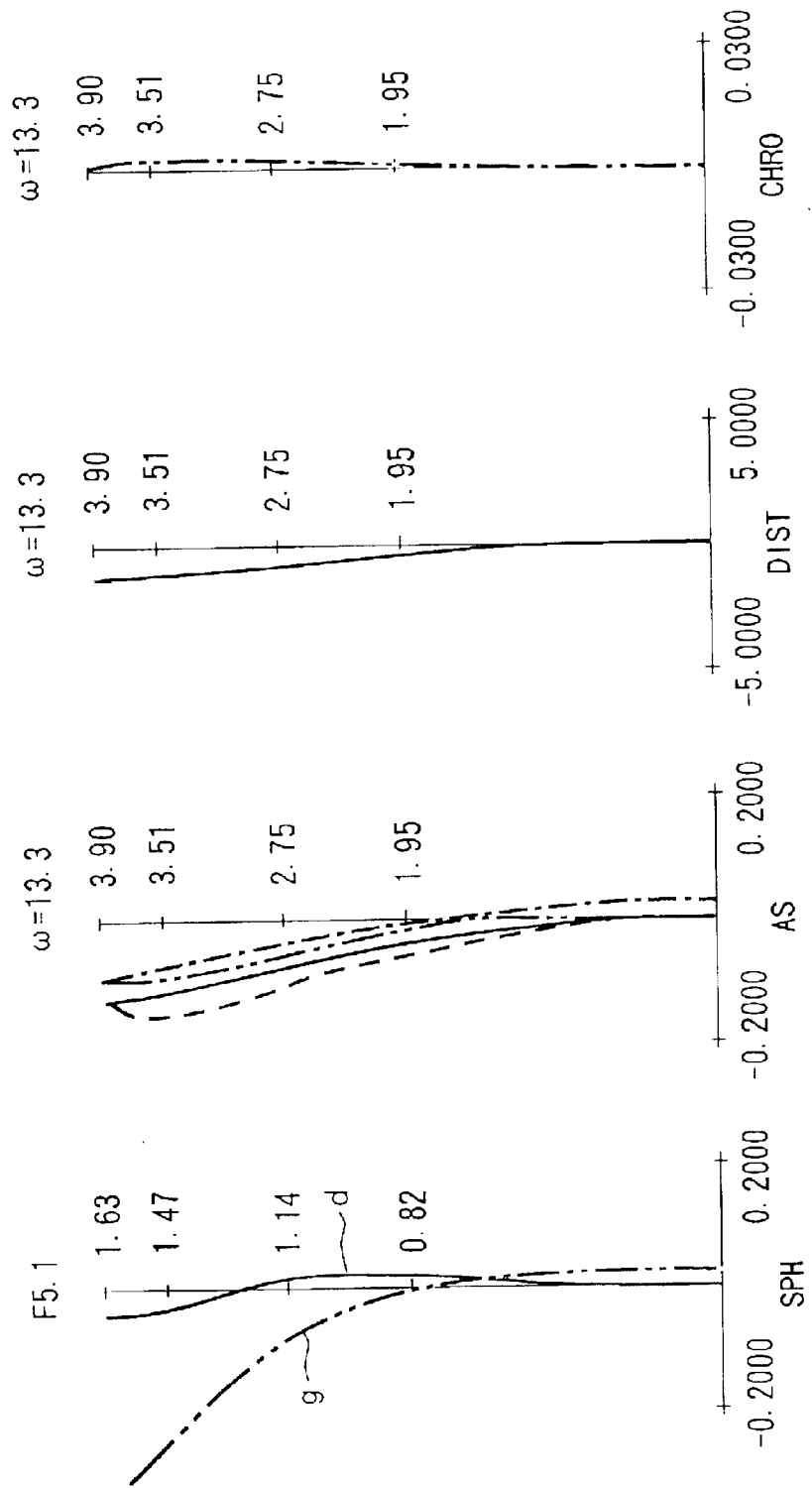
FIG. 8 shows aberration of the zoom lens of Embodiment 2 at a telephoto end.

FIG. 1 is an optical sectional view of a zoom lens according to Embodiment 1 of the invention. FIGS. 2 to 4 show aberrations of the zoom lens of Embodiment 1 at a wide angle end, an intermediate zoom position, and a telephoto end. FIG. 5 is an optical sectional view of a zoom lens according to Embodiment 2 of the invention. FIGS. 6 to 8 show aberrations of the zoom lens of Embodiment 2 at a wide angle end, an intermediate zoom position, and a telephoto end.

Figure 9:
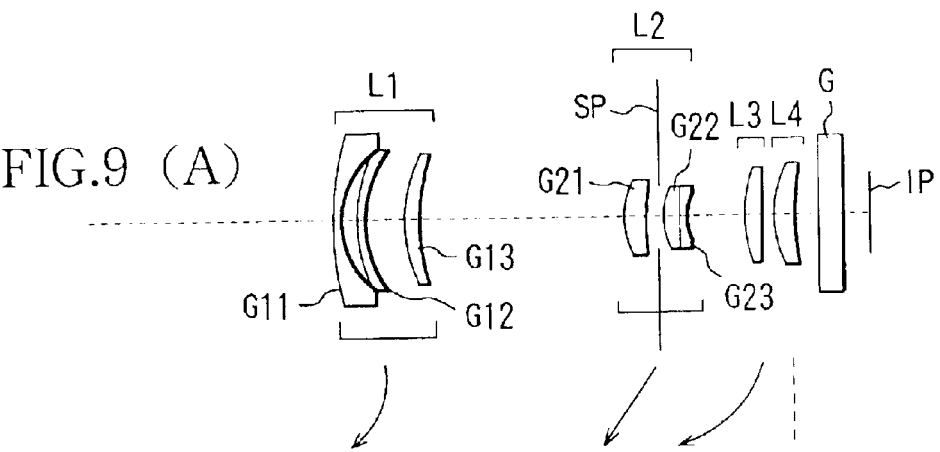
FIG. 9 is an optical sectional view of a zoom lens according to Embodiment 3 of the invention.
Figure 9:
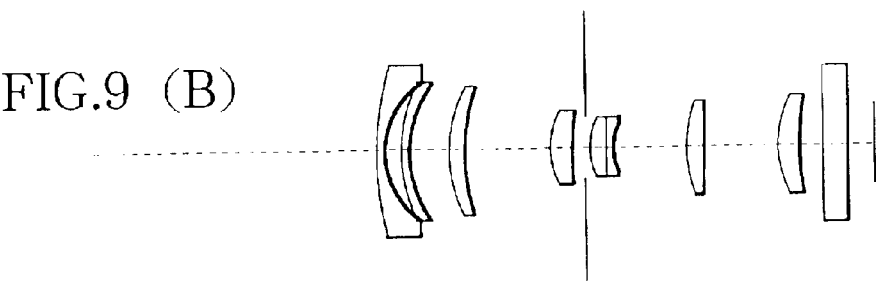
Figure 9:
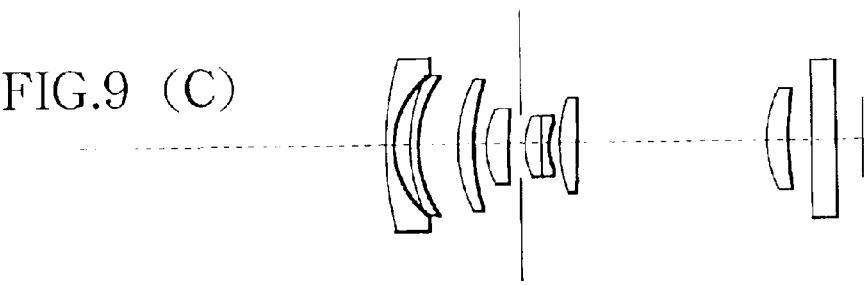
Figure 10:
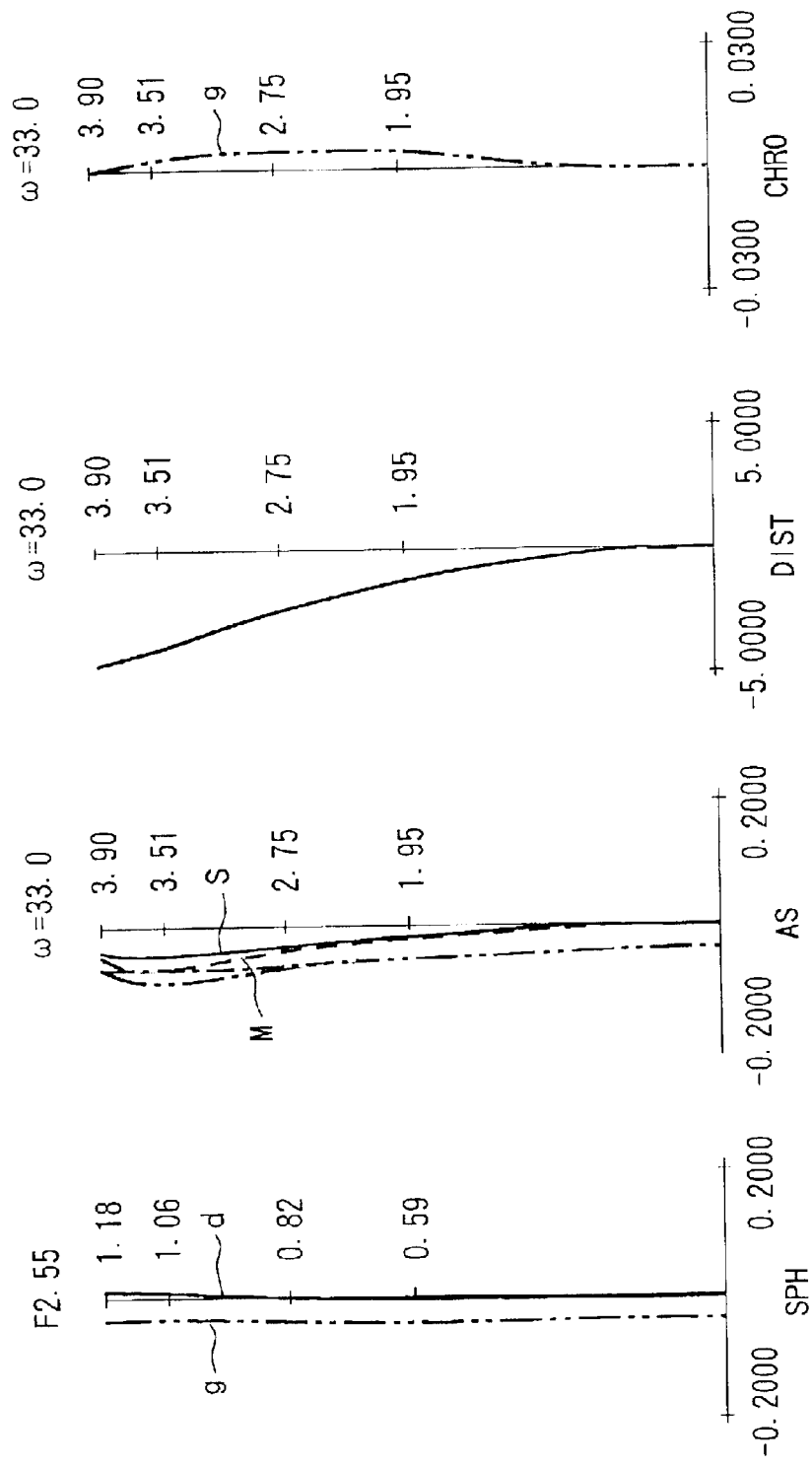
FIG. 10 shows aberration of the zoom lens of Embodiment 3 at a wide angle end.
Figure 11:
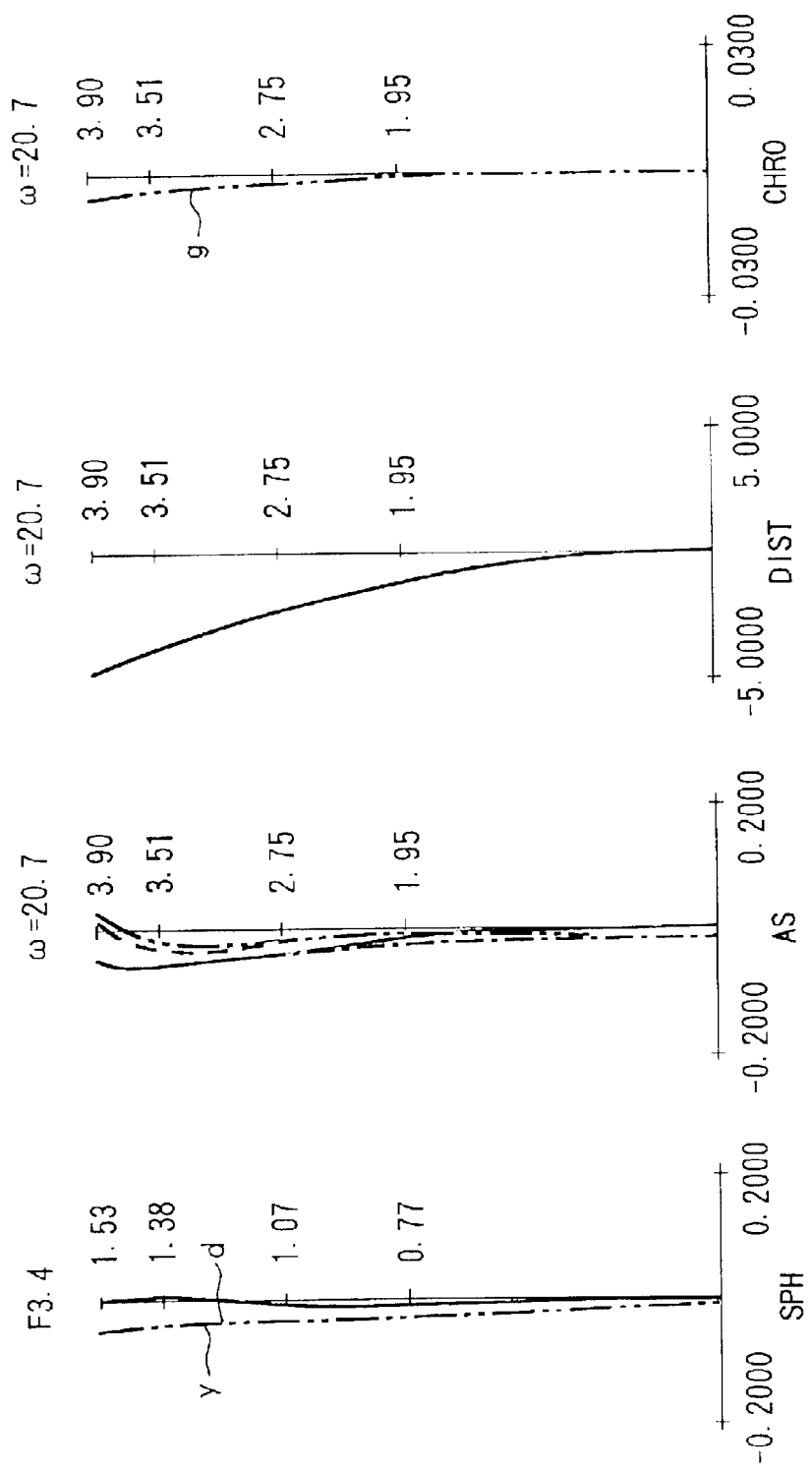
FIG. 11 shows aberration of the zoom lens of Embodiment 3 at an intermediate zoom position.
Figure 12:
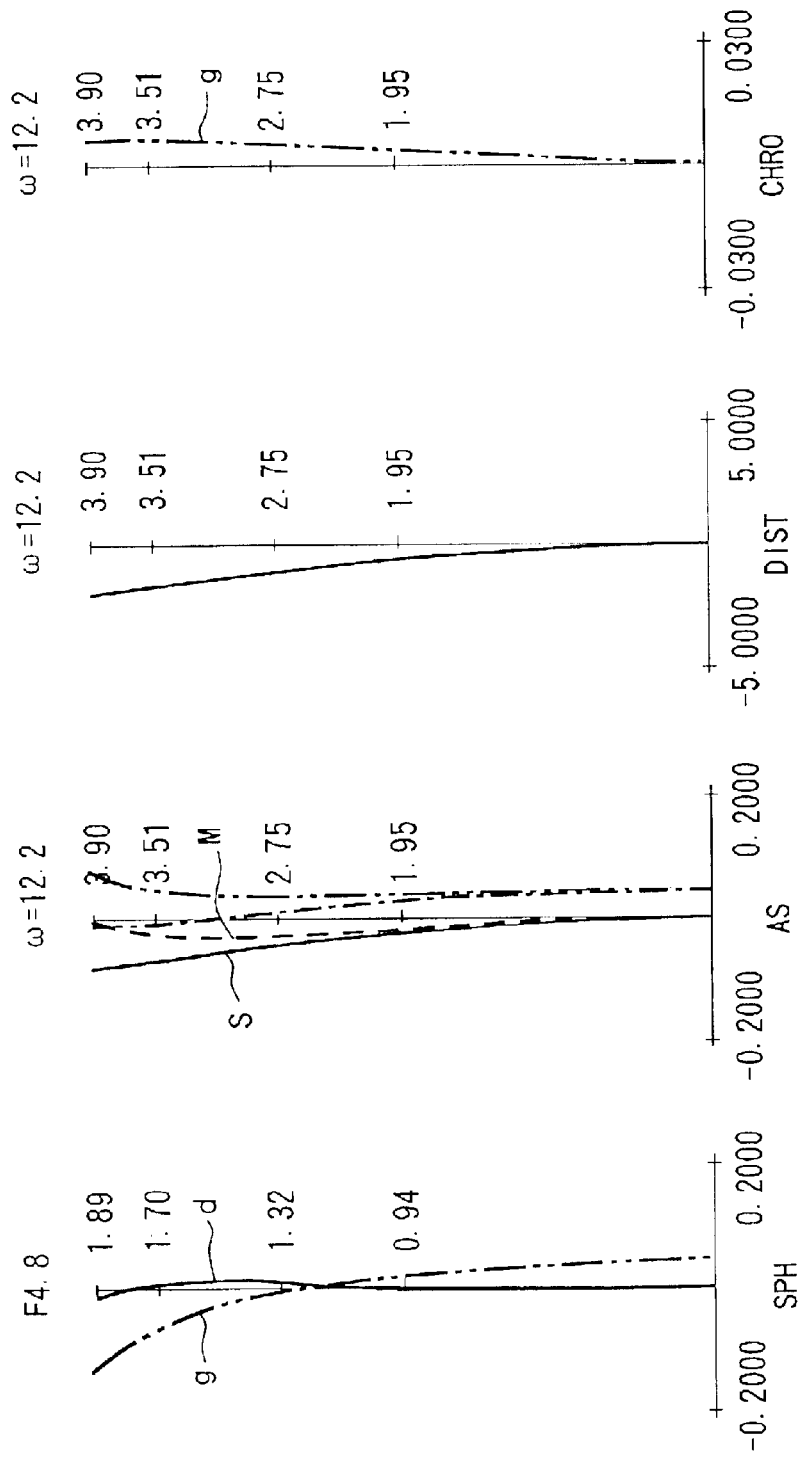
FIG. 12 shows aberration of the zoom lens of Embodiment 3 at a telephoto end.

FIG. 9 is an optical sectional view of a zoom lens according to Embodiment 3 of the invention. FIGS. 10 to 12 show aberrations of the zoom lens of Embodiment 3 at a wide angle end, an intermediate zoom position, and a telephoto end.

In the zoom lenses of the embodiments in FIGS. 1, 5, and 9, reference character L1 denotes a first lens unit having negative refractive power; L2, a second lens unit having positive refractive power; L3, a third lens unit having positive refractive power; L4, a fourth lens unit having positive refractive power; SP, an aperture stop; and IP, an image plane. On the image plane IP, an image pickup plane of an image pickup device in a digital camera described below is placed. Reference character G denotes a glass block corresponding to a filter or a color separation prism.

Each of the zoom lenses in Embodiments 1 to 3 has the first lens unit L1 having negative refractive power, the second lens unit L2 having positive refractive power, the third lens unit L3 having positive refractive power, and the fourth lens unit L4 having positive refractive power, in this order from an object side. The first lens unit L1, the second lens unit L2, and the third lens unit L3 are moved as shown by arrows in FIGS. 1(A), 5(A) and FIG. 9(A) (the second lens unit L2 and the third lens unit L3 are moved toward the object side), during zooming (variation of the power) from the wide angle end to the telephoto end, such that a space between the first lens unit L1 and the second lens unit L2 is smaller, a space between the second lens unit L2 and the third lens unit L3 is smaller, and a space between the third lens unit L3 and the fourth lens unit L4 is larger at the telephoto end than at the wide angle end. The fourth lens unit L4 is fixed during magnification change.

On a closest side to the object of the first lens unit L1, a negative lens (lens having negative refractive power) G1 is placed.

The first lens unit L1 has two negative lenses G11, G12 adjacent to each other and a positive lens element G13. The second lens unit L2 has two or more positive lens elements G21, G22, a negative lens element G23, and one or more aspheric surfaces. The third lens unit L3 has one positive lens components consist of a single lens element or cemented lens element.

The fourth lens unit L4 has one or more positive lens components consist of a single lens or cemented lens element.

Focusing is performed by moving the third lens unit L3 or the fourth lens unit L4 forward.

Next, a detailed lens configuration of Embodiments 1 to 3 will be described.

The first lens unit L1 having negative refractive power is consists of three lenses: the meniscus negative lens element (lens element having negative refractive power) G11 having a convex surface toward the object, the meniscus negative lens element G12 similarly having a convex surface toward the object, and the meniscus positive lens element (lens element having positive refractive power) G13 having a convex surface toward the object.

The second lens unit L2 having positive refractive power is consists of three lenses: the positive lens element G21, the positive lens element G22 having a convex surface toward the object, and the negative lens element G23 having a concave surface toward the image. The positive lens element G22 having a convex surface toward the object and the negative lens element G23 having a concave surface toward the image are cemented to each other.

The third lens unit L3 having positive refractive power consists of the single lens element or cemented positive lens element having a convex surface toward the object.

The fourth lens unit L4 having positive refractive power consist of the single lens element or cemented positive lens element having a convex surface toward the object.

In Embodiments 1 to 3, a zoom lens suitable for a digital still camera or the like is provided in which a lens configuration of each lens unit, a position of an aspheric surface, and a moving method of each lens unit during magnification change are optimized to reduce the number of lenses and reduce a total length of the lens system, and the zoom lens has an appropriately 3× zoom ratio, has bright and extremely high optical performance, and includes a wide angle area.

The zoom lens of the embodiments attains the primary object by the above described configuration, but for better optical performance or for smaller size of a total lens system, it is preferable to satisfy at least one of the following conditions.

Specifically, when a focal length of the total lens system at the wide angle end is fw, a focal length of the total lens system at the telephoto end is ft, a length from an image plane to an exit pupil at the wide angle end is tkw, and a length from an image plane to an exit pupil at the telephoto end is tkt, it is preferable to satisfy the conditions:

$$0.15 < \sqrt{(fw \times ft)} \times (|1/tkt - 1/tkw|) < 0.35 \quad (1)$$

$$2.5 < ft/fw < 4.5 \quad (2)$$

The conditional expression (1) relates to exit pupil variation during zooming (variation of the power) from the wide angle end to the telephoto end, and a focal length at the intermediate zoom position, and is preferably satisfied at an appropriately 3× zoom ratio (a value range of the conditional expression (2)) that satisfies the conditional expression (2) defining a zoom ratio.

If the exit pupil variation during zooming becomes too large at a value beyond an upper limit of the conditional expression (1), image quality is undesirably degraded by shading.

If the exit pupil variation unnecessarily becomes small at a value below a lower limit of the conditional expression (1), the total length of the lens system in the wide angle area and a front diameter of the lens undesirably increase.

The conditional expression (2) relates to the zoom ratio, and by appropriately setting the zoom ratio, good optical performance can be achieved across a zoom range based on the conditional expression (1). Technical advantages by the conditional expression (1) cannot be obtained without the conditional expressions (1), (2) simultaneously satisfied.

More preferably, value ranges of the conditional expressions (1), (2) are as follows:

$$0.17 < \sqrt{(fw \times ft)} \times (|1/tkt - 1/tkw|) < 0.3 \quad (1a)$$

$$2.7 < ft/fw < 3.5 \quad (2a)$$

When a back focus at the wide angle end is bfw, it is preferable to satisfy a condition $$0.2 < bfw/\sqrt{(fw \times ft)} < 0.7 \quad (3)$$

The back focus bfw is an air conversion length from the last lens surface to the image plane.

Thus, when a low pass filter or an optical filter exists between the last lens surface and the image plane, instead of the thickness (t) of the filter, a value (t/n) of the thickness (t) divided by a refractive index (n) is used as a length for determining a length of the back focus.

The conditional expression (3) relates to the back focus at the wide angle end and an intermediate focal length.

If the back focus becomes too long at a value beyond an upper limit of the conditional expression (3), the total length of the lens system at the wide angle end and the front diameter of the lens undesirably increase. If the back focus becomes too short at a value below a lower limit of the conditional expression (3), a space undesirably decreases into which the low pass filter or an IR cut filter is inserted.

More preferably, a value range of the conditional expression (3) is preferably as follows:

$$0.3 < bfw/\sqrt{(fw \times ft)} < 0.65 \quad (3a)$$

When the space between the second lens unit L2 and the third lens unit L3 at the wide angle end is d2w, and the space between the second lens unit L2 and the third lens unit L3 at the telephoto end is d2t, it is preferable to satisfy a condition:

$$0.1 < d2t/d2w < 0.7 \quad (4)$$

The conditional expression (4) relates to a ratio of the air space between the second lens unit L2 and the third lens unit L3 at the wide angle end to the air space between the second lens unit L2 and the third lens unit L3 at the telephoto end.

If the space between the second lens unit L2 and the third lens unit L3 at the wide angle end decreases at a value beyond an upper limit of the conditional expression (4), the distance from the image plane to an exit pupil at the wide angle end undesirably decreases.

If the space between the second lens unit L2 and the third lens unit L3 at the wide angle end becomes too large at a value below a lower limit of the conditional expression (4), the total length of the lens system at the wide angle end undesirably increases.

More preferably, a value range of the conditional expression (4) is as follows:

$$0.19 < d2t/d2w < 0.5 \tag{4a}$$

Now, numerical examples of Embodiments 1 to 3 will be shown. Numerical Examples 1, 2, and 3 correspond to Embodiments 1, 2, and 3. In each numerical example, reference character f denotes a focal length; Fno, an F number; ω, a half angle of view; i, an order of surfaces from the object side; Ri, a radius of curvature of each surface; Di, a thickness of a member or an air space between an i-th surface and an i+1-th surface; Ni, a refractive index to a d-line; and vi, an Abbe number thereto. Two surfaces closest to the image are surfaces of the glass block G corresponding to a crystal low pass filter or an infrared ray cut filter.

When displacement of an optical axis direction at a height H from the optical axis is x relative to a vertex of the aspheric surface, a shape of the aspheric surface is shown by the expression:

$$X = \frac{(1/R)H^2}{1 + \sqrt{1 - (1+k)(H/R)^2}} + AH^2 + BH^4 + CH^6 + DH^8 + EH^{10}$$

Where R is a radius of curvature, k is a conic constant, and A, B, C, D, and E are aspheric surface coefficients.

Further, [e-X] mean [x $10^{-x}$].

Relationships between the above described conditional expression and the values in the numerical examples will be shown in Table 1.

<Numerical Example 1>

| f = 5.50 – 16.50 | Fno = 2.55 – 4.95 | 2ω = 70.7 – 26.6 | |
|---|---|---|---|
| *R1 = 26.124 | D1 = 0.80 | N1 = 1.743300 | v1 = 49.3 |
| R2 = 8.081 | D2 = 1.70 | | |
| R3 = 41.202 | D3 = 0.80 | N2 = 1.804000 | v2 = 46.6 |
| R4 = 7.977 | D4 = 2.00 | | |
| R5 = 11.377 | D5 = 2.00 | N3 = 1.846659 | v3 = 23.8 |
| R6 = 34.560 | D6 = Variable | | |
| R7 = 8.026 | D7 = 2.08 | N4 = 1.772499 | v4 = 49.6 |
| R8 = 36.765 | D8 = 1.21 | | |
| R9 = Stop | D9 = 0.50 | | |
| *R10 = 10.357 | D10 = 1.83 | N5 = 1.743300 | v5 = 49.2 |
| R11 = –7.057 | D11 = 0.70 | N6 = 1.698947 | v6 = 30.1 |
| R12 = 5.746 | D12 = Variable | | |
| R13 = 17.773 | D13 = 1.52 | N7 = 1.696797 | v7 = 55.5 |
| R14 = 305.433 | D14 = Variable | | |
| R15 = 10.446 | D15 = 2.30 | N8 = 1.563839 | v8 = 60.7 |
| R16 = 49.455 | D16 = 2.0 | | |
| R17 = ∞ | D17 = 2.61 | N9 = 1.516330 | v9 = 64.2 |
| R18 = ∞ | | | |

| Variable | Focal length | | |
|---|---|---|---|
| space | 5.50 | 10.83 | 16.50 |
| D6 | 14.24 | 4.39 | 1.01 |
| D12 | 5.02 | 4.59 | 1.34 |
| D14 | 1.00 | 9.56 | 18.23 |

Aspheric Surface Coefficient

First surface: k=0.00000e+00 A=0 B=1.65845e-04 C=-3.59273e-07 D=1.45015e-08 E=-1.03399e-10

Tenth surface: k=0.00000e+00 A=0 B=-4.51789e-04 C=-1.37143e-05 D=1.65165e-06 E=-1.79580e-07

<Numerical Example 2>

| f 5.50 – 16.50 | Fno = 2.55 – 5.05 | 2ω = 70.7 – 26.6 | |
|---|---|---|---|
| *R1 = 29.871 | D1 = 0.80 | N1 = 1.743300 | v1 = 49.3 |
| R2 = 7.483 | D2 = 1.57 | | |
| R3 = 33.658 | D3 = 0.80 | N2 = 1.804000 | v2 = 46.6 |
| R4 = 8.073 | D4 = 2.14 | | |
| R5 = 11.586 | D5 = 1.61 | N3 = 1.846659 | v3 = 23.8 |
| R6 = 35.803 | D6 = Variable | | |
| R7 = 7.040 | D7 = 2.08 | N4 = 1.696797 | v4 = 55.5 |
| R8 = 55.063 | D8 = 1.20 | | |
| R9 = Stop | D9 = 0.50 | | |
| *R10 = 8.720 | D10 = 1.47 | N5 = 1.743300 | v5 = 49.2 |
| R11 = 38.584 | D11 = 0.70 | N6 = 1.846660 | v6 = 23.8 |
| R12 = 5.563 | D12 = Variable | | |
| R13 = 14.954 | D13 = 1.57 | N7 = 1.487490 | v7 = 70.2 |
| R14 = –70.426 | D14 = Variable | | |
| R15 = 10.861 | D15 = 2.30 | N8 = 1.563839 | v8 = 60.7 |
| R16 = 49.455 | D16 = 2.0 | | |
| R17 = ∞ | D17 = 2.61 | N9 = 1.516330 | v9 = 64.2 |
| R18 = ∞ | | | |

| Variable | Focal length | | |
|---|---|---|---|
| space | 5.50 | 10.14 | 16.50 |
| D6 | 14.16 | 5.41 | 1.41 |
| D12 | 5.00 | 5.82 | 1.20 |
| D14 | 1.00 | 8.36 | 18.44 |

Aspheric Surface Coefficient

First surface: k=0.00000e+00 A=0 B=2.10590e-04 C=-1.67585e-06 D=4.93547e-08 E=-4.92258e-10

Tenth surface: k=0.00000e+00 A=0 B=-5.82318e-04 C=-1.82948e-05 D=5.23222e-07 E=-1.10775e-07

<Numerical Example 3>

| f = 6.00 – 18.11 | Fno = 2.55 – 4.80 | 2ω = 66.0 – 24.3 | |
|---|---|---|---|
| R1 = 29.524 | D1 = 0.80 | N1 = 1.696797 | v1 = 55.5 |
| R2 = 7.807 | D2 = 1.66 | | |
| R3 = 14.035 | D3 = 0.80 | N2 = 1.583126 | v2 = 59.4 |
| *R4 = 8.029 | D4 = 3.78 | | |
| R5 = 13.601 | D5 = 1.58 | N3 = 1.846659 | v3 = 23.8 |
| R6 = 22.139 | D6 = Variable | | |
| R7 = 8.013 | D7 = 2.08 | N4 = 1.834807 | v4 = 42.7 |
| R8 = 20.191 | D8 = 1.33 | | |
| R9 = Stop | D9 = 0.50 | | |
| *R10 = 7.936 | D10 = 1.47 | N5 = 1.743300 | v5 = 49.2 |
| R11 = 46.561 | D11 = 0.70 | N6 = 1.846660 | v6 = 23.8 |
| R12 = 5.622 | D12 = Variable | | |
| R13 = 14.854 | D13 = 1.64 | N7 = 1.487490 | v7 = 70.2 |
| R14 = –93.063 | D14 = Variable | | |
| R15 = 10.054 | D15 = 2.3 | N8 = 1.487490 | v8 = 70.2 |
| R16 = 42.759 | D16 = 2.0 | | |
| R17 = ∞ | D17 = 2.61 | N9 = 1.516330 | v9 = 64.2 |
| R18 = ∞ | | | |

| Variable | Focal length | | |
|---|---|---|---|
| space | 6.00 | 10.30 | 18.11 |
| D6 | 19.86 | 8.17 | 0.99 |
| D12 | 5.75 | 7.40 | 1.17 |
| D14 | 1.00 | 7.10 | 18.50 |

Aspheric Surface Coefficient

Fourth surface: k=0.00000e+00 A=0 B=-2.92144e-04 C=-4.99251e-06 D=2.83519e-08 E=-1.67831e-09

Tenth surface: k=0.00000e+00 A=0 B=-3.21502e-04 C=-9.29779e-06 D=0.00000e+00 E=0.00000e+00

TABLE 1

|  | Numerical example | | |
|---|---|---|---|
| Conditional expression | 1 | 2 | 3 |
| (1) $\sqrt{fw \times ft} \times (|1/tkt - 1/tkw|)$ | 0.24 | 0.23 | 0.18 |
| (2) ft/fw | 3.0 | 3.0 | 3.02 |
| (3) bfw/$\sqrt{fw \times ft}$ | 0.55 | 0.55 | 0.60 |
| (4) d2t/d2w | 0.27 | 0.24 | 0.20 |

According to Embodiments 1 to 3 described above, a zoom lens suitable for a digital camera such as a digital still camera or a video cameras can be provided in which a lens configuration of each lens unit and a moving method of each lens unit during zooming are optimized and an aspheric surface is appropriately used to reduce the number of lenses of a total lens system and reduce a total length of the lens system, and the zoom lens has a desired zoom ratio, has bright and high optical performance, and includes a wide angle area.

Figure 13:
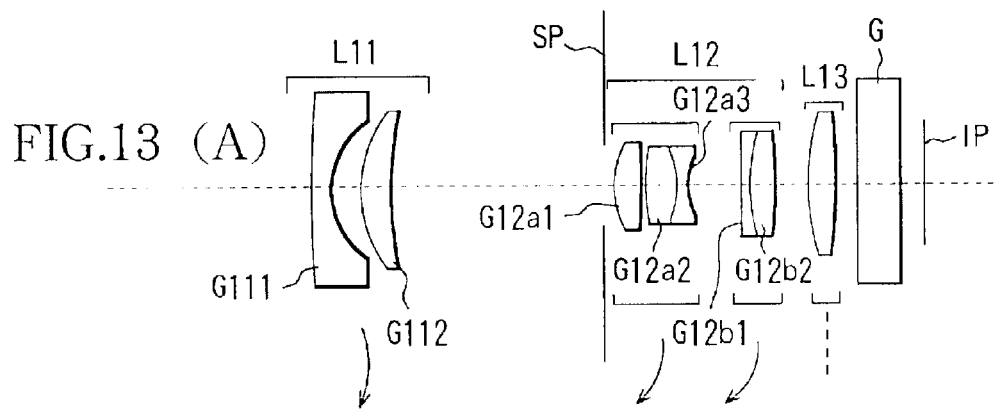
FIG. 13 is an optical sectional view of a zoom lens according to Embodiment 4 of the invention.
Figure 13:
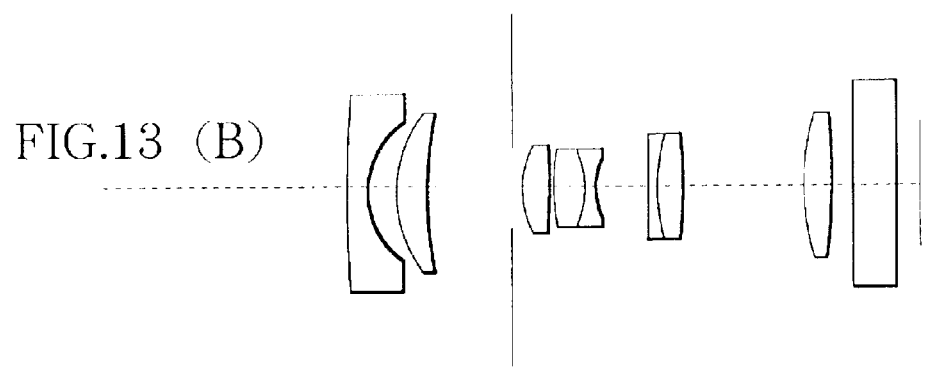
Figure 13:
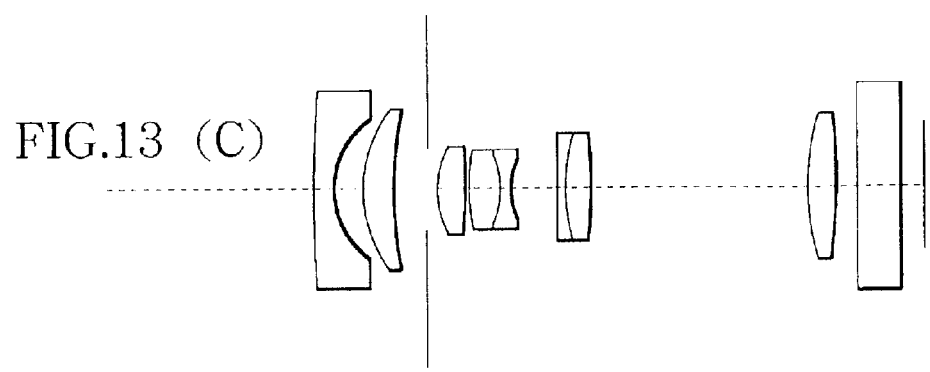
Figure 14:
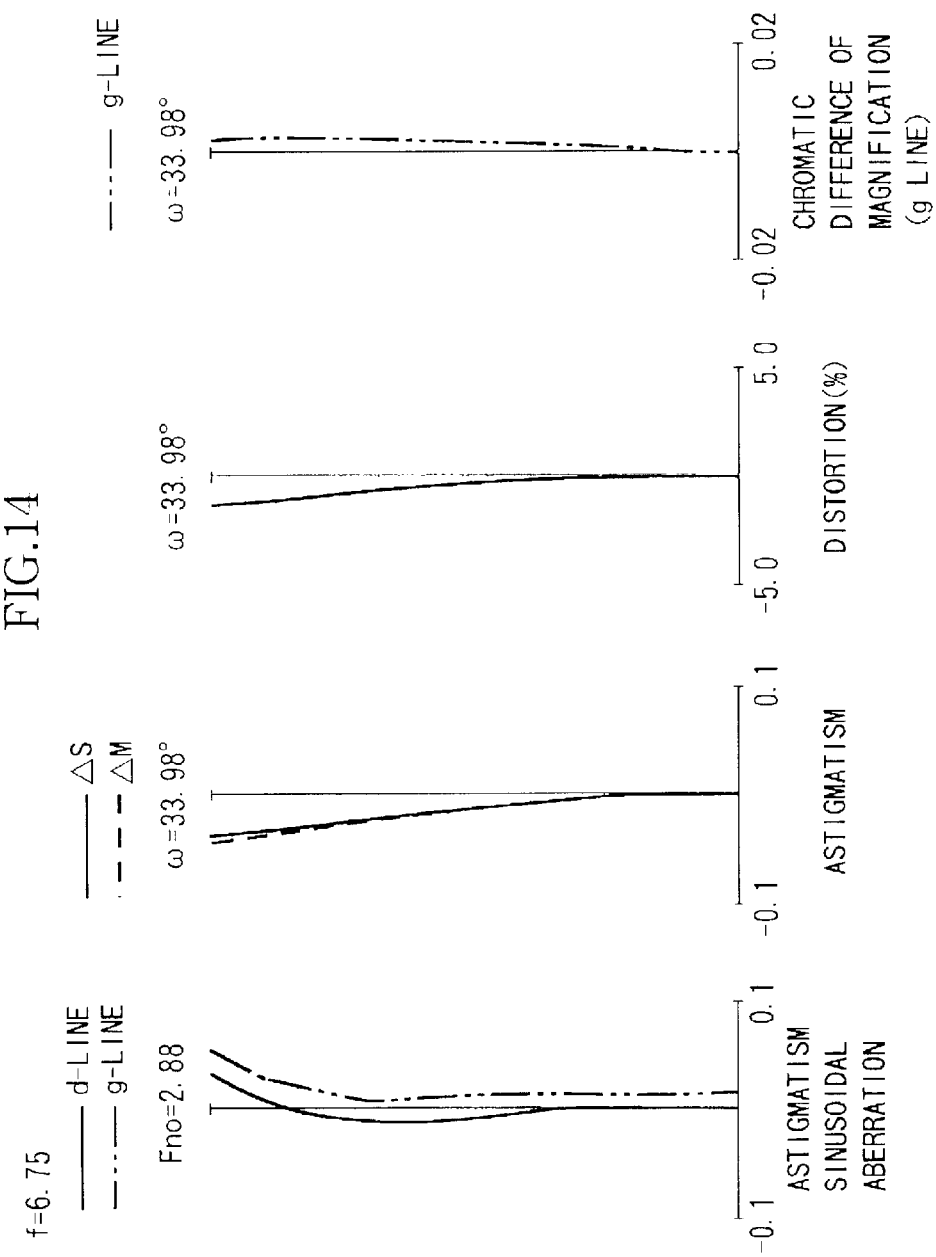
FIG. 14 shows aberration of the zoom lens of Embodiment 4 at a wide angle end.
Figure 15:
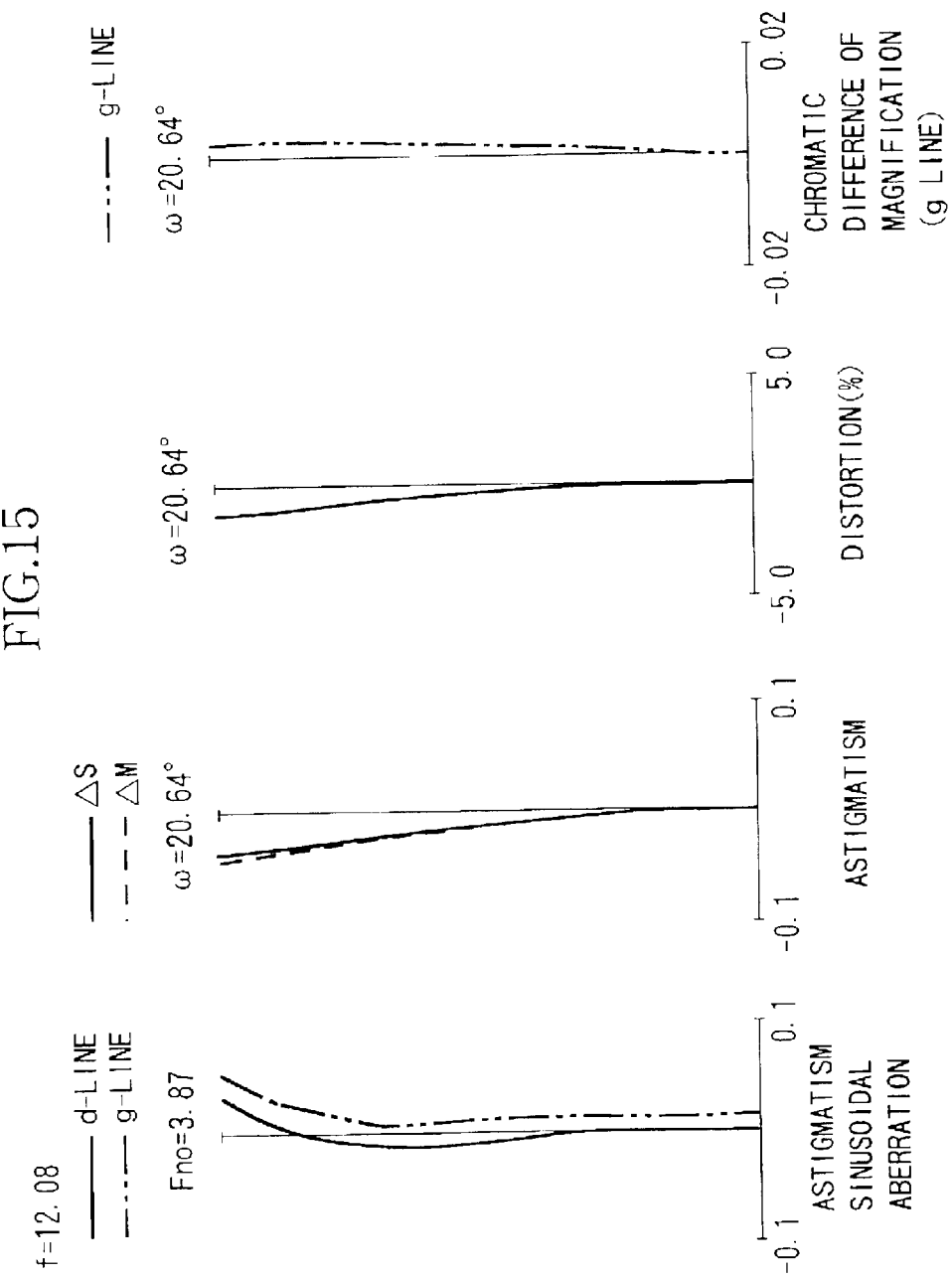
FIG. 15 shows aberration of the zoom lens of Embodiment 4 at an intermediate zoom position.
Figure 16:
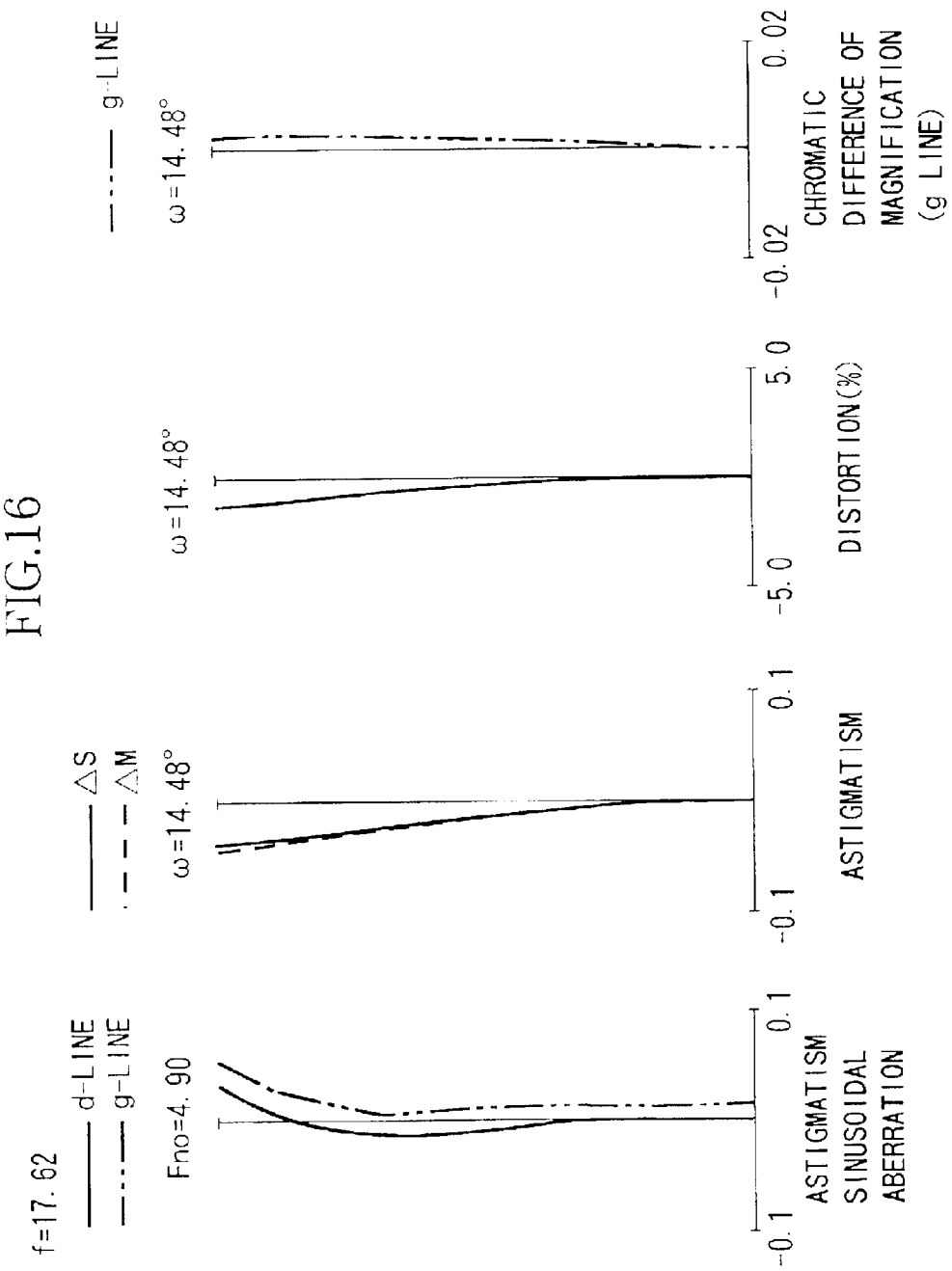
FIG. 16 shows aberration of the zoom lens of Embodiment 4 at a telephoto end.

FIG. 13 is an optical sectional view of a zoom lens according to Embodiment 4 of the invention. FIGS. 14 to 16 show aberrations of the zoom lens of Embodiment 4 at a wide angle end, an intermediate zoom position, and a telephoto end.

Figure 17:
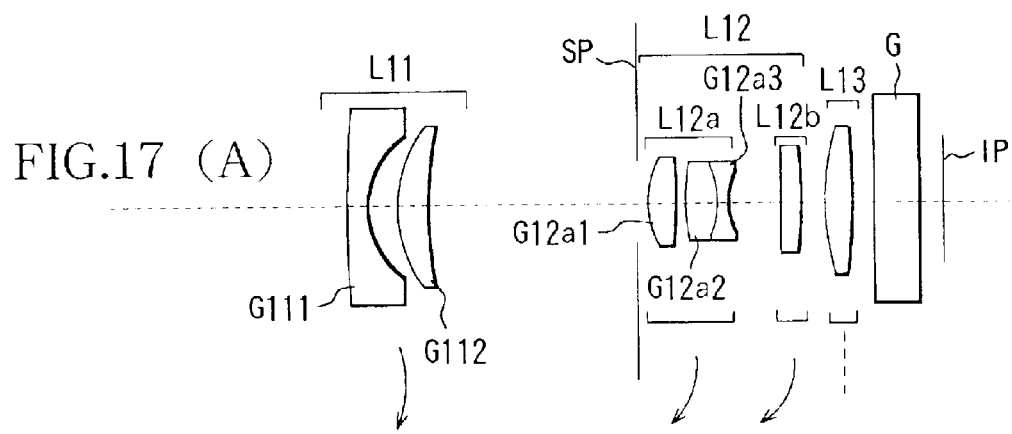
FIG. 17 is an optical sectional view of a zoom lens according to Embodiment 5 of the invention.
Figure 17:
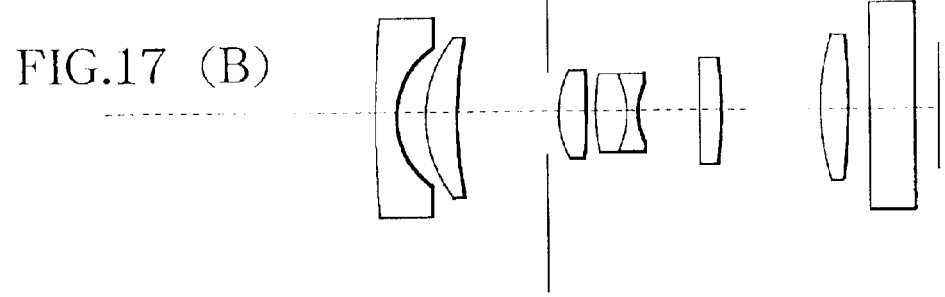
Figure 17:
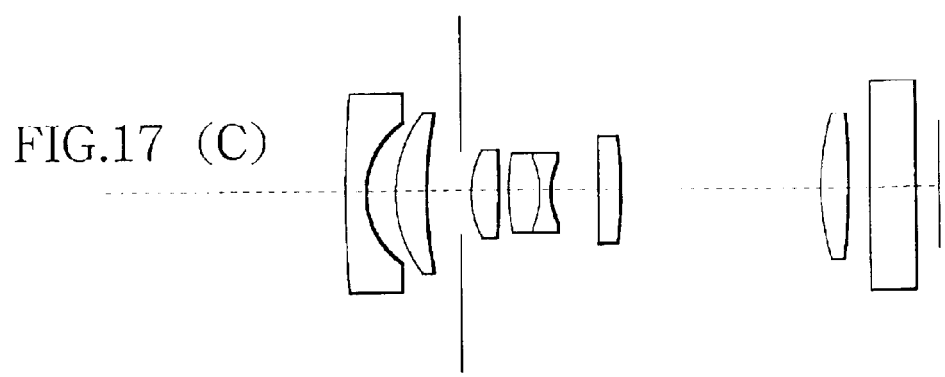
Figure 18:
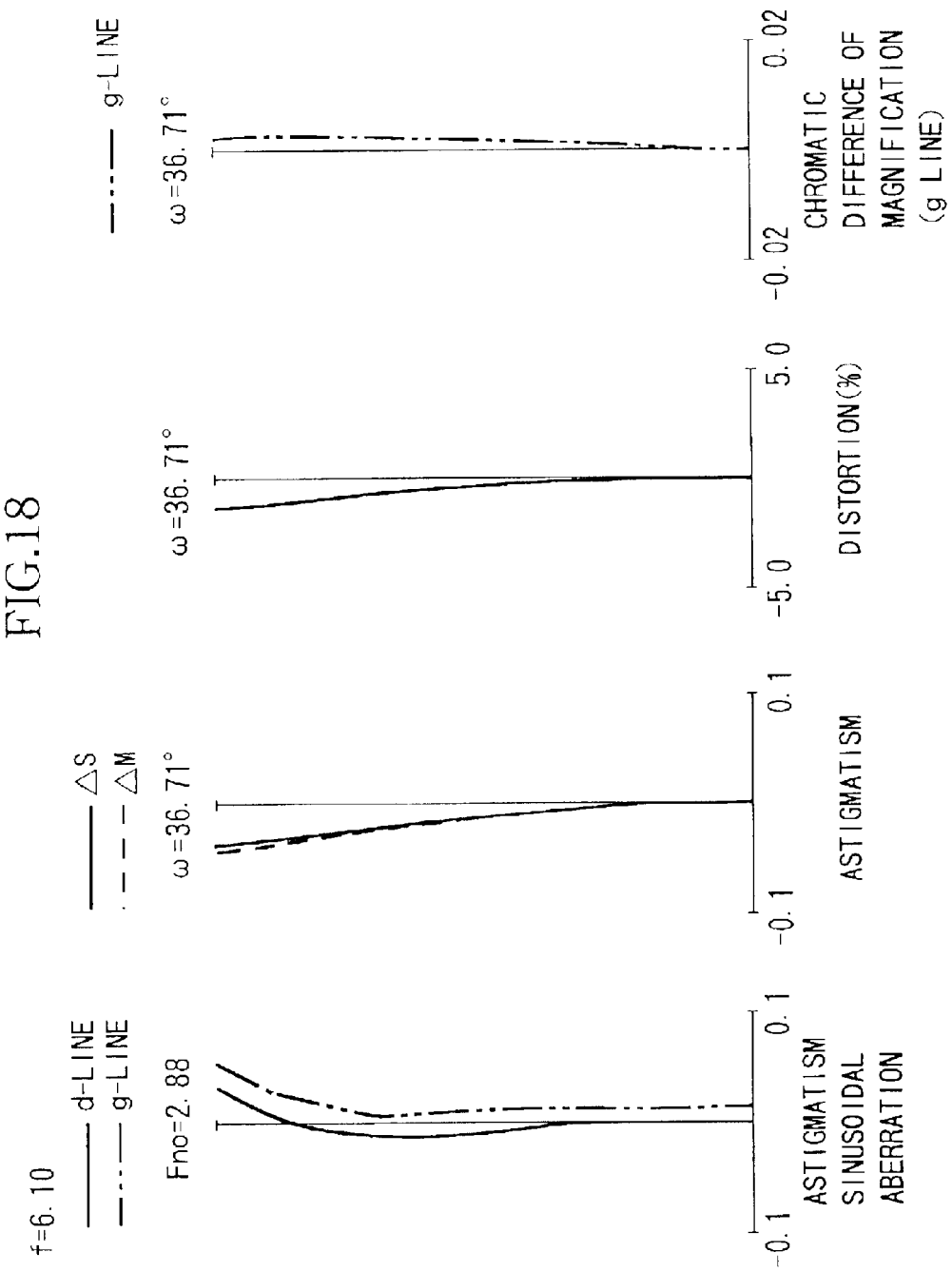
FIG. 18 shows aberration of the zoom lens of Embodiment 5 at a wide angle end.
Figure 19:
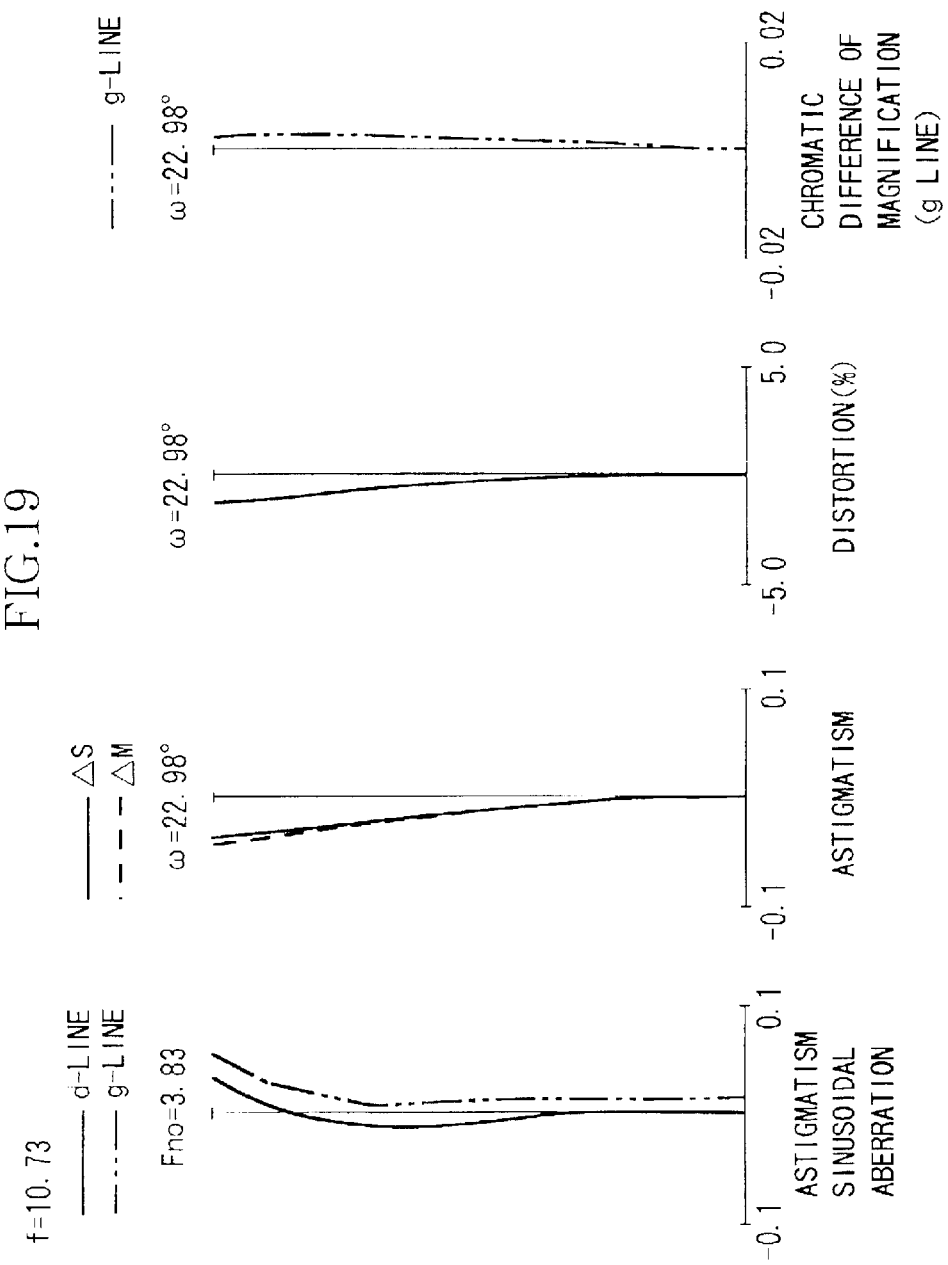
FIG. 19 shows aberration of the zoom lens of Embodiment 5 at an intermediate zoom position.
Figure 20:
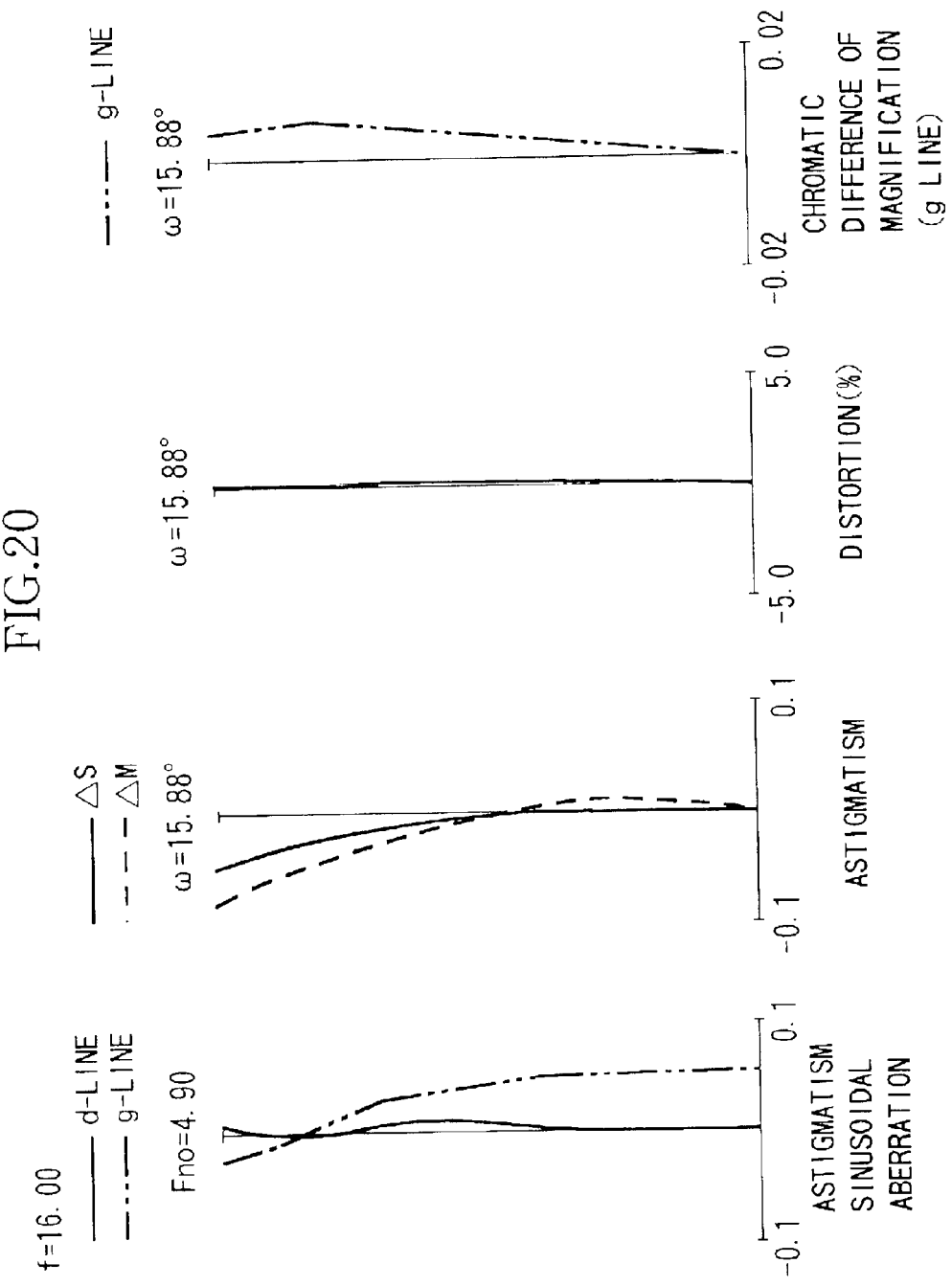
FIG. 20 shows aberration of the zoom lens of Embodiment 5 at a telephoto end.

FIG. 17 is an optical sectional view of a zoom lens according to Embodiment 5 of the invention. FIGS. 18 to 20 show aberrations of the zoom lens of Embodiment 5 at a wide angle end, an intermediate zoom position, and a telephoto end.

Figure 21:
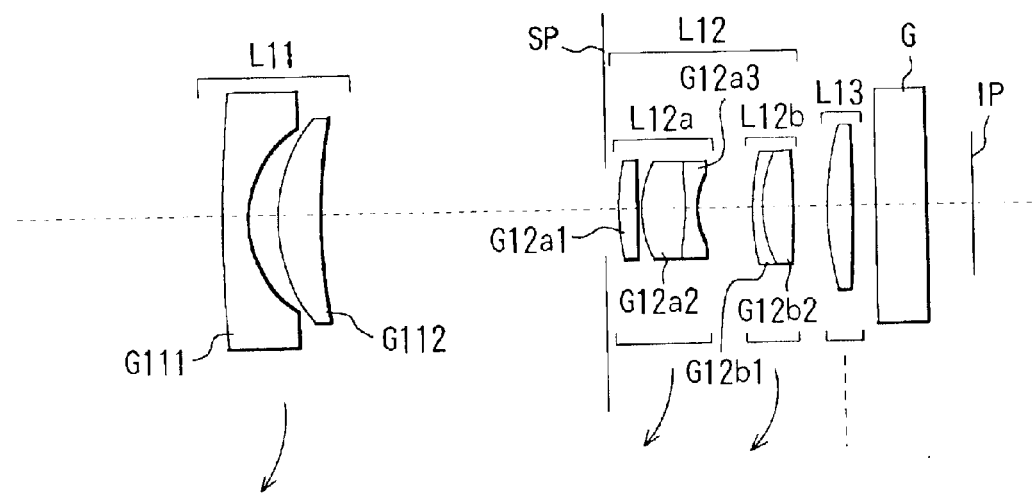
FIG. 21 is an optical sectional view of a zoom lens according to Embodiment 6 of the invention.
Figure 21:
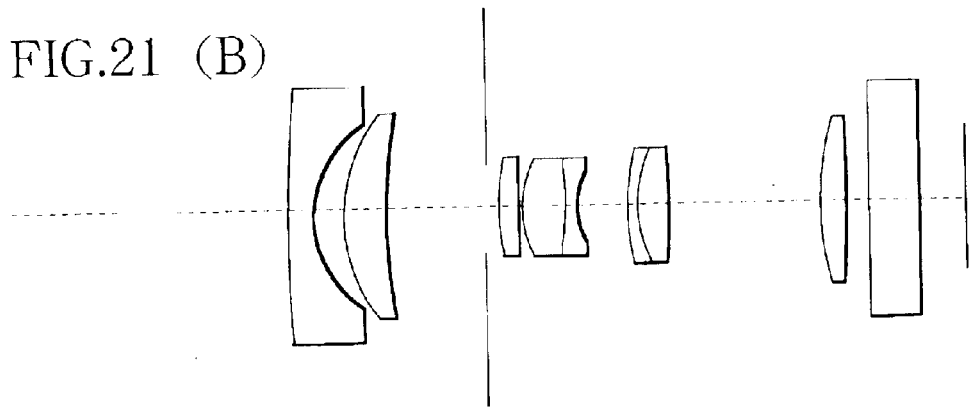
Figure 21:
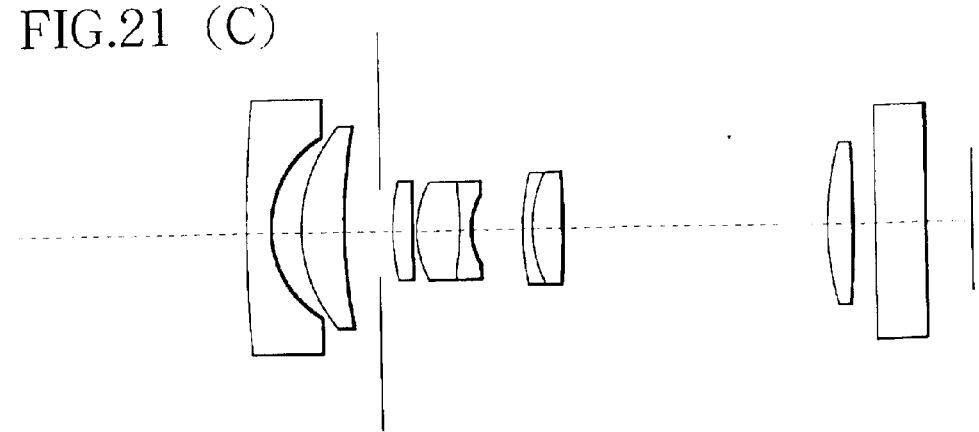
Figure 22:
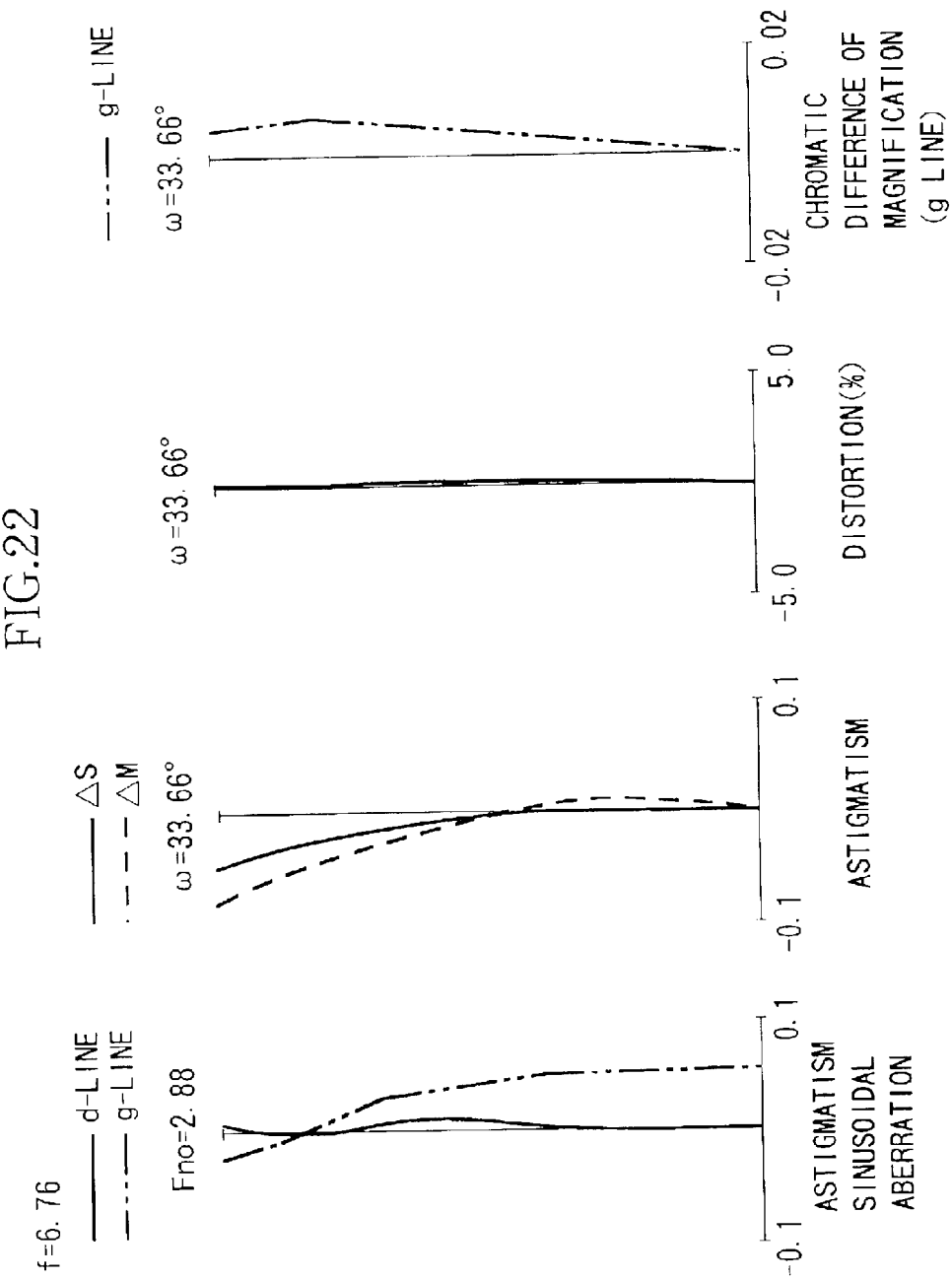
FIG. 22 shows aberration of the zoom lens of Embodiment 6 at a wide angle end.
Figure 23:
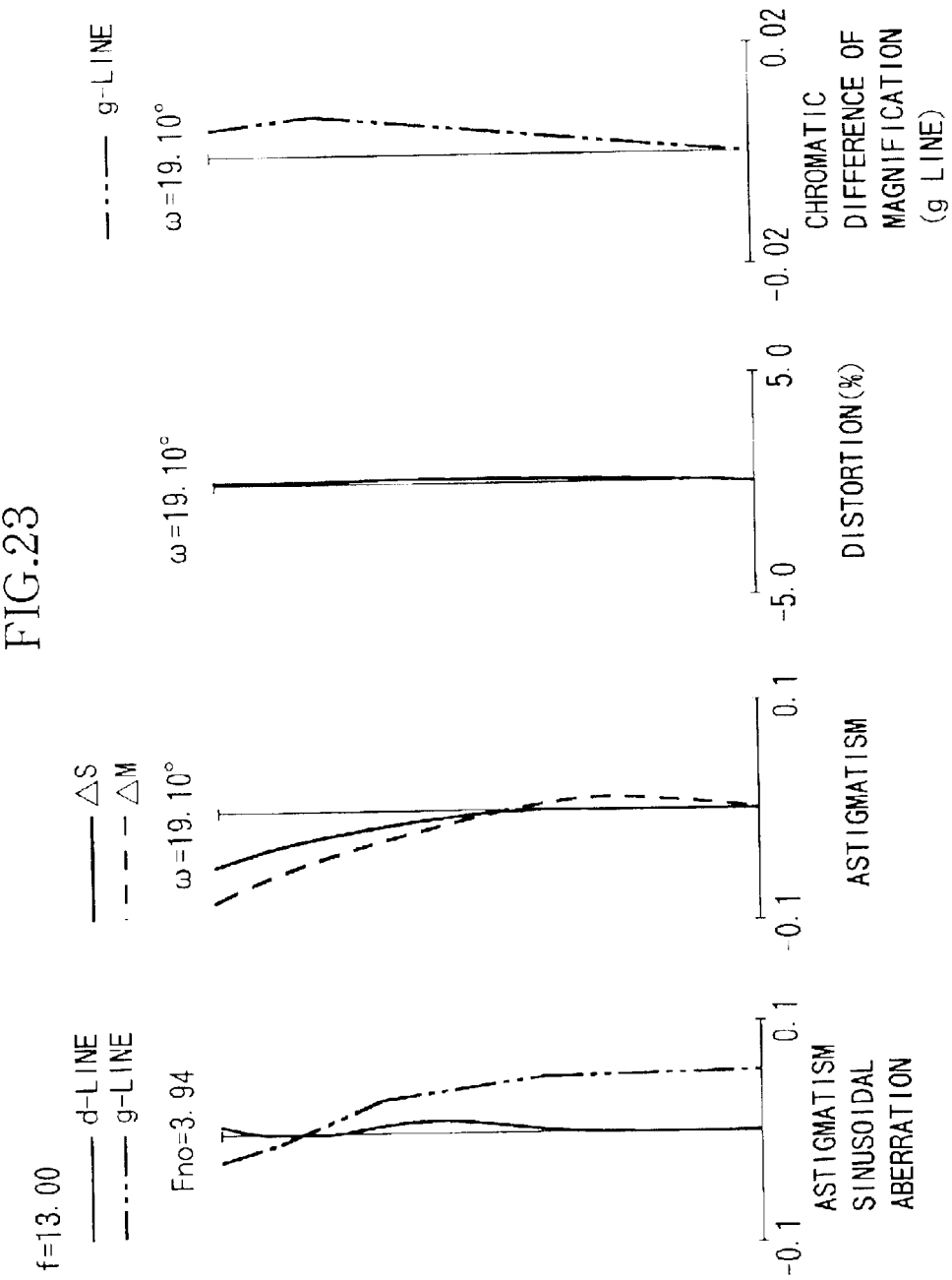
FIG. 23 shows aberration of the zoom lens of Embodiment 6 at an intermediate zoom position.
Figure 24:
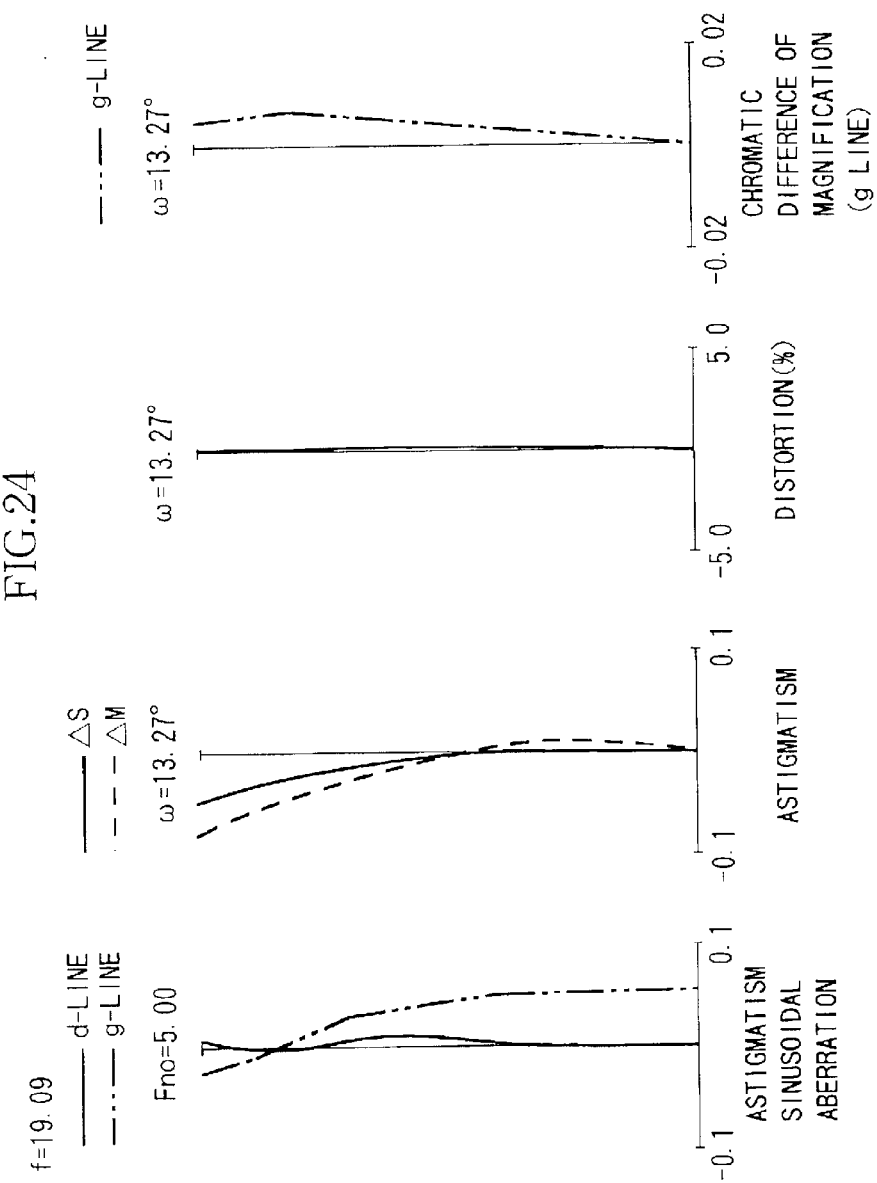
FIG. 24 shows aberration of the zoom lens of Embodiment 6 at a telephoto end.

FIG. 21 is an optical sectional view of a zoom lens according to Embodiment 6 of the invention. FIGS. 22 to 24 show aberrations of the zoom lens of Embodiment 6 at a wide angle end, an intermediate zoom position, and a telephoto end.

Figure 25:
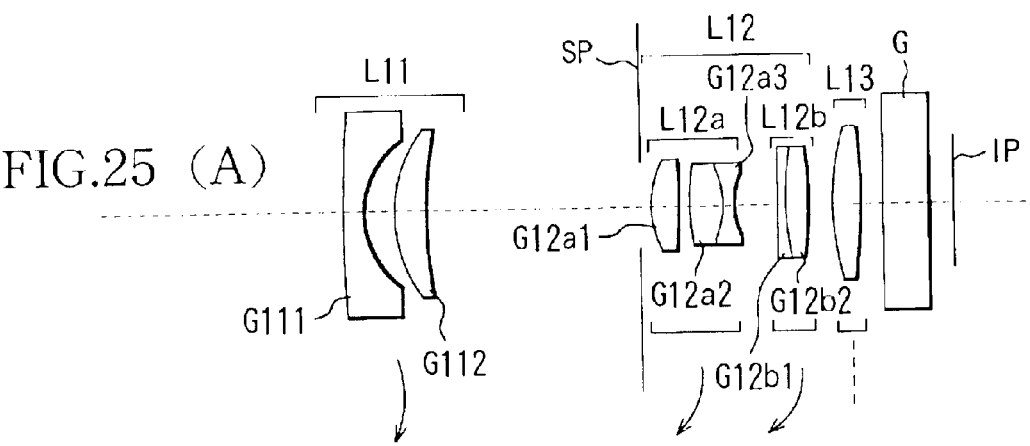
FIG. 25 is an optical sectional view of a zoom lens according to Embodiment 7 of the invention.
Figure 25:
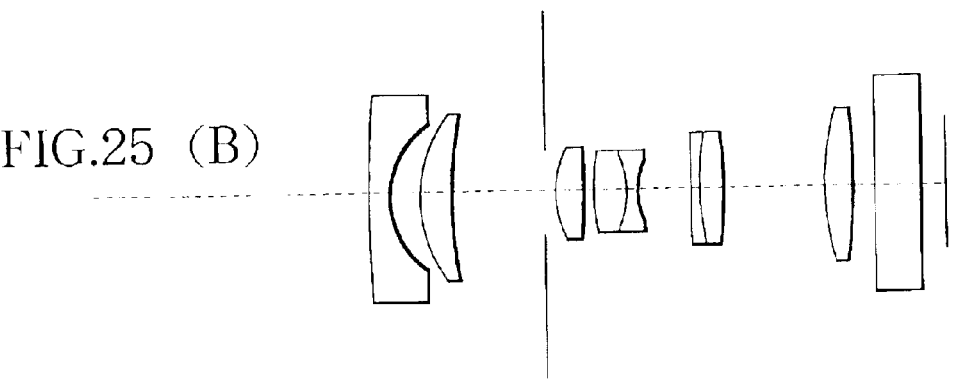
Figure 25:
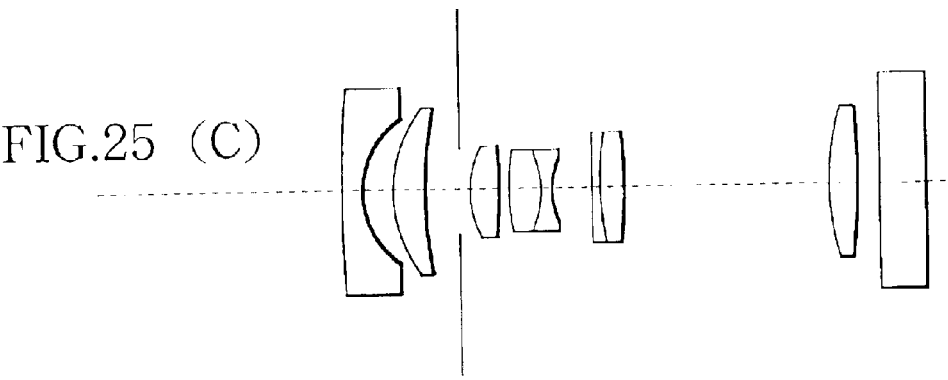
Figure 26:
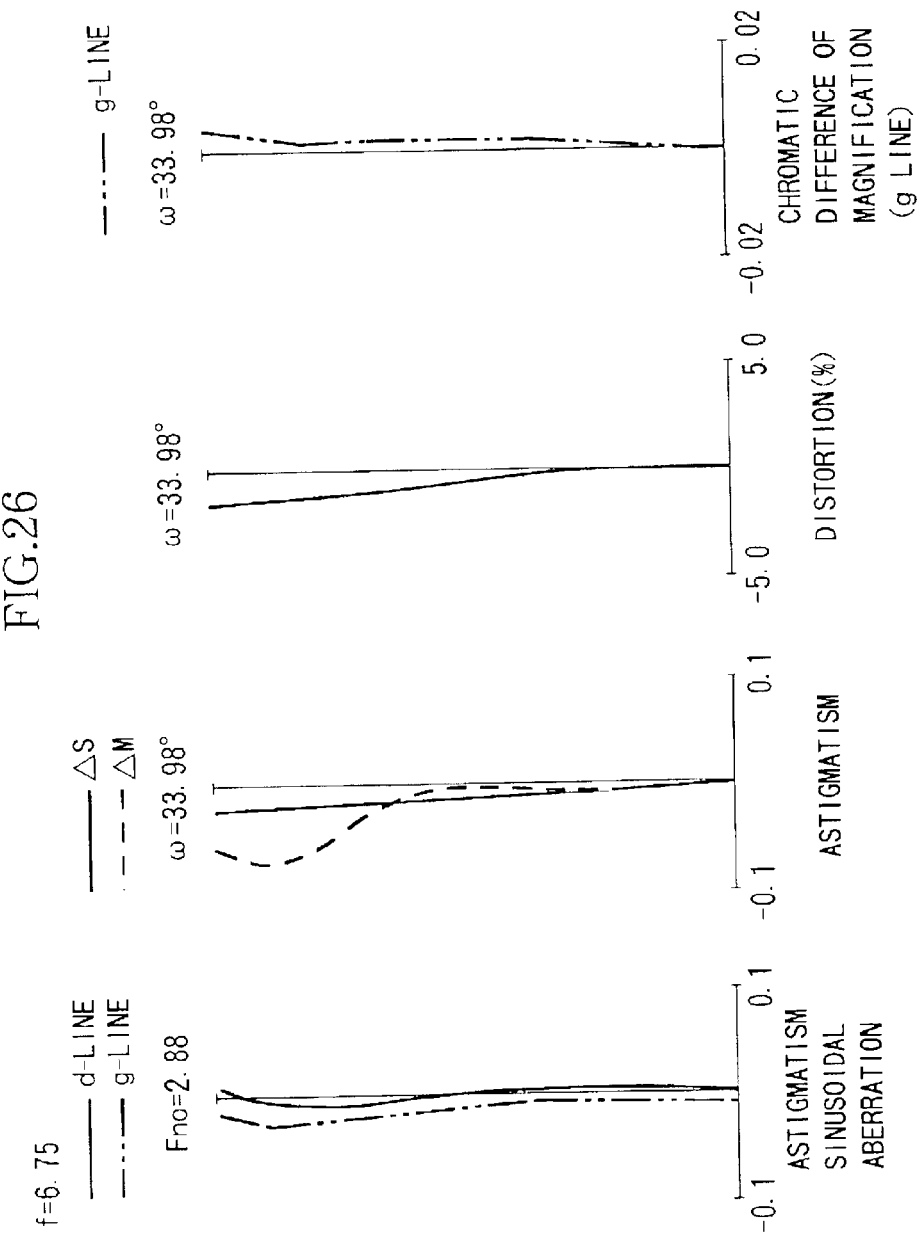
FIG. 26 shows aberration of the zoom lens of Embodiment 7 at a wide angle end.
Figure 27:
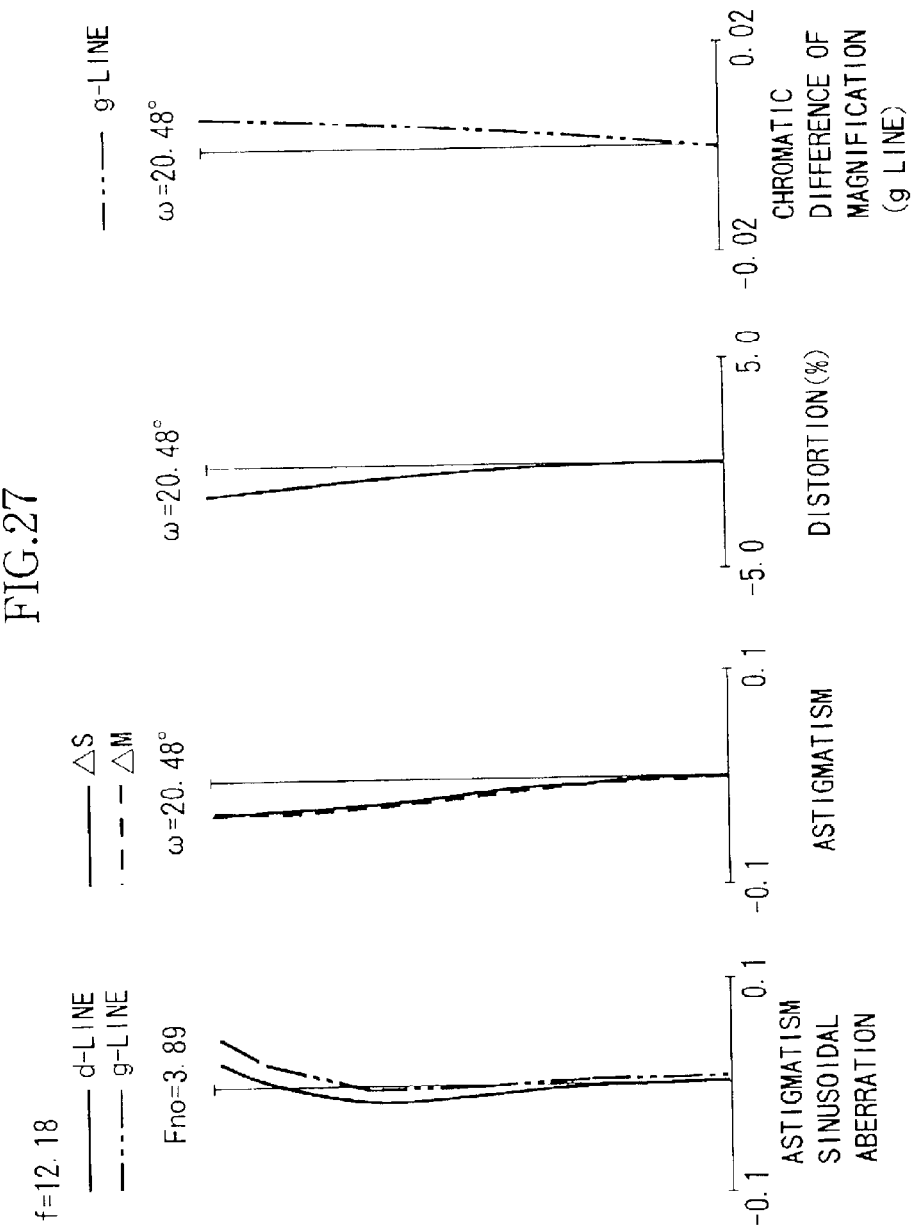
FIG. 27 shows aberration of the zoom lens of Embodiment 7 at an intermediate zoom position.
Figure 28:
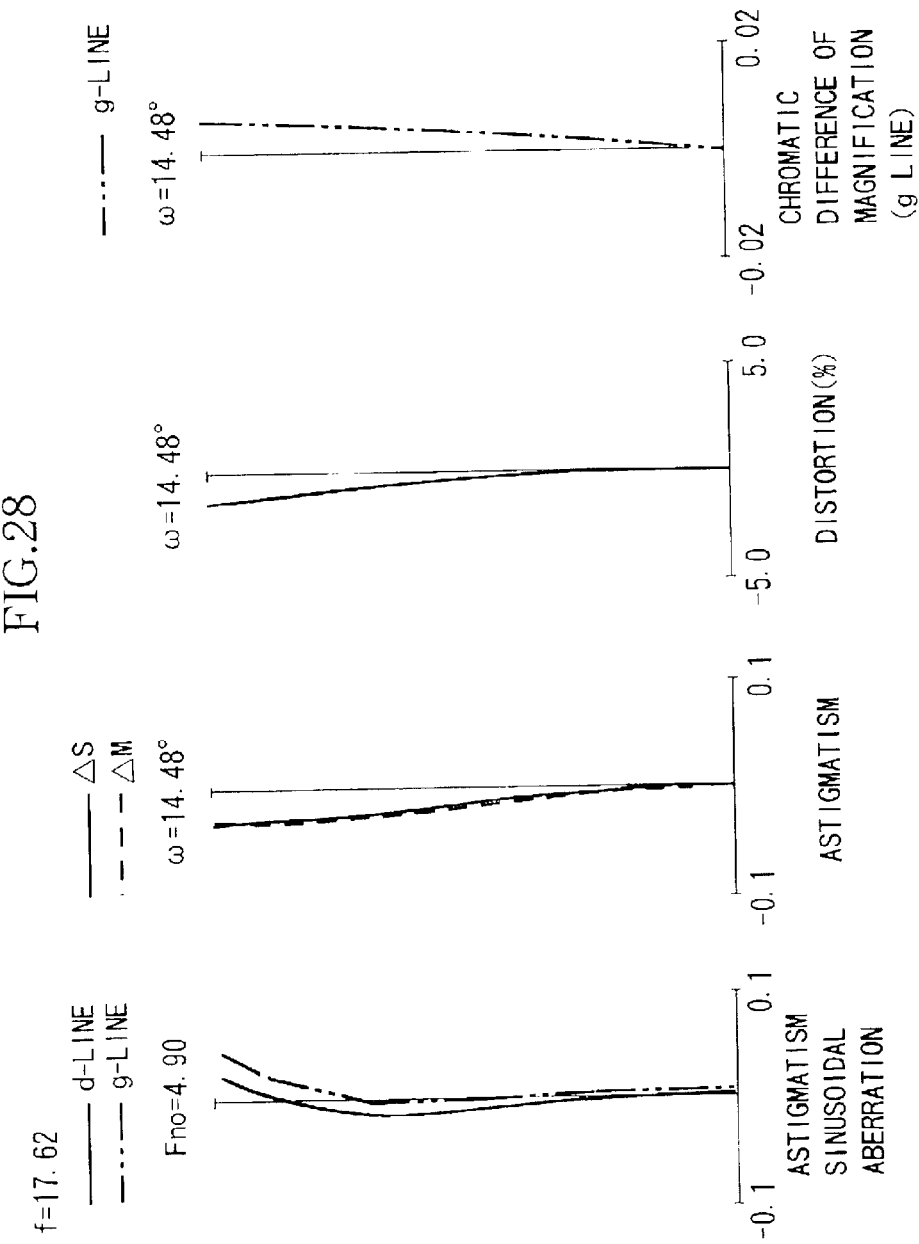
FIG. 28 shows aberration of the zoom lens of Embodiment 7 at a telephoto end.

FIG. 25 is an optical sectional view of a zoom lens according to Embodiment 7 of the invention. FIGS. 26 to 28 show aberrations of the zoom lens of Embodiment 7 at a wide angle end, an intermediate zoom position, and a telephoto end.

In the sectional views of the zoom lenses of the embodiments in FIGS. 13, 17, 21, and 25, reference character L11 denotes a first lens unit having negative refractive power; L12, a second lens unit having positive refractive power; L13, a third lens unit having positive refractive power; SP, an aperture stop; and IP, an image plane. On the image plane IP, an image pickup plane of an image pickup device in a digital camera described below is placed. Reference character G denotes a glass block corresponding to a filter or a color separation prism.

The second lens unit L12 consist of a first lens subunit L12a having positive refractive power and a second lens subunit L12b having positive refractive power, with a largest air space in the unit therebetween. The second lens subunit L12b is moved in an optical axis direction to perform focusing from an infinite object to a finite object.

Each of the zoom lenses in Embodiments 4 to 7 has the first lens unit L11 having negative refractive power, the second lens unit L12 having positive refractive power, the third lens unit L13 having positive refractive power, in this order from an object side. The lens units are moved such that a space between the first lens unit L11 and the second lens unit L12 at the telephoto end is smaller, and a space between the second lens unit L12 and the third lens unit L13 is larger at the telephoto end than at the wide angle end, that is, during zooming from the wide angle end to the telephoto end, the space between the first lens unit L11 and the second lens unit L12 decreases, and the space between the second lens unit L12 and the third lens unit L13 increases.

The first lens unit L11 consists of two lenses: a negative lens element G11, and a positive lens element G112 in this order from the object side, and the first lens subunit L12a consists of three lenses: a positive lens element G12a1, a positive lens element G12a2, and a negative lens element G12a3 in this order from the object side.

When a space between the first lens subunit L12a and the second lens subunit L12b under in-focus state on the infinite object at the wide angle end is d2abW, and a focal length of a total lens system at the wide angle end is fw,
the following condition is satisfied:

$$0.2 < d2abW/fw < 1.0 \qquad (5)$$

In the zoom lens of the embodiments, the second lens unit L12 having positive refractive power moves to perform main variation of the power, and the first lens unit L11 having negative refractive power reciprocates to correct movement of an image point in accordance with variation of the power.

The third lens unit L13 having positive refractive power does not contribute to variation of the power when it is fixed during zooming. However, increase in the refractive power of an image taking lens system in accordance with reduction in size of the image pickup device is shared to reduce refractive power of a short zoom system consist of the first lens unit L11 and the second lens unit L12, thereby particularly preventing aberration at each lens element of the first lens unit L11 to achieve good optical performance. Further, telecentric image formation on an image side that is especially necessary for a digital camera with a solid-state image pickup device is achieved by allowing the third lens unit L13 having positive refractive power to function as a field lens.

An "inner focusing system" for performing focusing by moving the compact and light second lens subunit L12b is adopted to facilitate prompt focusing, and a lens configuration is appropriately set to reduce aberration variation during focusing. Focusing may be performed in the first lens subunit L12a or the third lens unit L13.

The third lens unit L13 is fixed during zooming and focusing to simplify a barrel structure.

In all zoom lenses in Embodiments 4 to 7, the third lens unit L13 is fixed during zooming, but it may be moved. In such a case, a barrel has a more complex structure, but reduction in aberration variation during zooming can be facilitated.

In Embodiments 4 to 7, the second lens subunit L12b is driven by placed on the same cam as the first lens subunit L12a, and driven by an actuator interlocked with the second lens unit L12 during zooming to move a differential distance between the first lens subunit L12a and the second lens subunit L12b changing in accordance with the object distance, thereby simplifying a mechanical structure.

Changing the space between the first lens subunit L12a and the second lens subunit L12b during zooming allows reduction in aberration variation in accordance with zooming change, but changing this space is not always necessary if the aberration variation is acceptable.

In Embodiments 4 to 7, a case where the space between the first lens subunit L12a and the second lens subunit L12b does not change during zooming (Embodiment 7) may be regarded as a zoom lens consist of three lens units, while a case where it changes may be regarded as a zoom lens consist of four lens units.

Next, a meaning of the conditional expression (5) will be described.

The conditional expression (5) standardizes the space d2abw between the first lens subunit L12a and the second lens subunit L12b at the wide angle end with the focal length fw at the wide angle end.

If the space between the first lens subunit L12a and the second lens subunit L12b becomes too large at a value beyond an upper limit of the conditional expression (5), a size of a driving mechanism for driving the second lens subunit L12b undesirably increases.

If the space between the first lens subunit L12a and the second lens subunit L12b becomes too small at a value below a lower limit of the conditional expression (5), the distance from the image plane to an exit pupil at the wide angle end becomes too short, undesirably increasing influence of shading.

More preferably, a value range of the conditional expression (5) is as follows:

$$0.3 < d2abw/fw < 0.7 \tag{5a}$$

When the space between the first lens subunit L12a and the second lens subunit L12b does not change during zooming or focusing, d2abw is, of course, always constant. The zoom lens of the embodiments attains the primary object by the above described configuration, but for less aberration variation across the zoom range and for higher optical performance across a picture area, it is preferable to satisfy at least one of the following conditions a to i:

a. The negative lens element G111 has a lens shape having higher refractive power on the image side than on the object side, and has one or more aspheric surfaces, and the positive lens element G112 has a meniscus shape with a convex surface toward the object.

b. The positive lens element G12a1 has a lens shape with higher refractive power on the object side than on the image side, the positive lens element G12a2 has both convex lens surfaces, and the negative lens element G12a3 has both concave lens surfaces. The positive lens element G12a2 and the negative lens element G12a3 are joined to each other.

c. The space between the first lens subunit L12a and the second lens subunit L12b changes during zooming from the wide angle end to the telephoto end.

d. The second lens subunit L12b consists of a single lens component having a single lens element or cemented lens elements.

e. The third lens unit L13 is consist of a single lens having higher refractive power on the object side than on the image side, f. A stop is placed on the object side of the first lens subunit L12a.

g. The third lens unit L13 does not move for zooming.

h. When an axial thickness of the second lens subunit L12b is TD2bt, the following condition is satisfied:

$$0.2 < TD2bt/fw < 0.45 \tag{6}$$

The conditional expression (6) standardizes the axial thickness of the second lens subunit L12b with the focal length at the wide angle end. If the axial thickness of the second lens subunit L12b becomes too large at a value beyond an upper limit of the conditional expression (6), a total length of the camera when the lens barrel thereof is housed into the camera body undesirably increases. If the axial thickness of the second lens subunit L12b becomes too small at a value below a lower limit of the conditional expression (6), an edge thickness of the positive lens of the second lens subunit L12b tends to be insufficient, undesirably increasing difficulty in manufacturing.

More preferably, a value range of the conditional expression (6) is as follows:

$$0.25 < TD2bt/fw < 0.4 \tag{6a}$$

i. When a maximum amount of change in the space between the first lens subunit L12a and the second lens subunit L12b in accordance with zooming from the wide angle end to the telephoto end is M2ab, and the focal length at the wide angle end is fw, the following condition is satisfied:

$$0.03 < \frac{M2ab}{fw} < 0.16\ldots \tag{7}$$

The conditional expression (7) relates to reduction in aberration variation in accordance with zooming change, and when a value is beyond an upper limit, a size of a mechanism for relatively moving the second lens subunit L12b undesirably increases. When a value is below a lower limit, variation in curvature of the image plane in accordance with zooming is undesirably difficult to correct well.

If the zoom lens in Embodiments 4 to 7 is applied to a digital camera such as a digital still camera or a video camera, when a length of a diagonal line of an effective image pickup area of the image pickup device is Y, it is preferable to satisfy a condition $$0.6 < fw/Y < 0.8 \tag{8}$$

The conditional expression (8) relates to a ratio between the focal length of the total lens system at the wide angle end and a diameter of an image circle (the length of the diagonal line of the effective image pickup area). When a value is beyond an upper limit of the conditional expression (8), the total length of the lens system undesirably increases. When a value is below a lower limit of the conditional expression (8), the front diameter of the lens undesirably increases. The conditional expression (8) is satisfied to facilitate reduction in size of the digital camera.

More preferably, a value range of the conditional expression (8) is as follows:

$$0.65 < fw/Y < 0.77 \tag{8a}$$

Next, a further detailed lens configuration of Embodiments 4 to 7 will be described. In Embodiments 4 to 7, the first lens unit L11 consists of two lenses: the negative meniscus lens element G111 having a convex surface toward the object and the aspheric surface toward the image, and the positive meniscus lens element G112 having a convex surface toward the object.

In Embodiments 4 to 7, the first lens subunit L12a consists of three lenses: the positive lens element G12a1, and cemented lens of the positive lens element G12a2 having both convex lens surfaces and the negative lens element G12a3 having both concave lens surfaces cemented to each other.

Further, in Embodiments 4 to 7, the stop SP is placed on the object side of the second lens unit L12 and moves integral with the second lens unit L12 during zooming.

In Embodiments 4 to 7, the positive lens element G12a2 on the object side of the cemented lens of the first lens subunit L12a has an aspheric surface toward the object.

In Embodiments 4, 6, and 7, the second lens subunit L12b is consists of the cemented lens of the negative lens element G12b1 and the positive lens element G12b2 having both convex lens surfaces cemented to each other.

In Embodiment 5, the second lens subunit L12b consists of the positive lens having both convex lens surfaces.

In Embodiments 4 to 7, the first lens unit L11 moves along a nearly complete back and forth locus during zooming. Positions of the first lens unit L11 on the optical axis at the wide angle end and at the telephoto end are almost the same, and in the intermediate zoom area, the first lens unit L11 moves along a convex locus toward the image. In Embodiments 4 to 7, the first lens subunit L12a and the second lens subunit L12b move toward the object during zooming.

In Embodiments 4 and 5, the space between the first lens subunit L12a and the second lens subunit L12b decreases during zooming from the wide angle end to the telephoto end.

In Embodiment 6, the space between the first lens subunit L12a and the second lens subunit L12b once decreases during zooming from the wide angle end to the telephoto end, and then increases. At this time, the air space is slightly smaller at the telephoto end than at the wide angle end.

In Embodiment 7, the space between the first lens subunit L12a and the second lens subunit L12b does not change during zooming.

Now, numerical examples of Embodiments 4 to 7 will be shown. Numerical Examples 4, 5, 6, and 7 correspond to Embodiments 4, 5, 6, and 7. Reference characters in Numerical Examples 4, 5, 6, and 7 have the same meanings as those in Numerical Examples 1, 2, and 3, and the descriptions thereof will be omitted.

Relationships between the above described conditional expressions and the values in the numerical examples will be shown in Table 2.

<Numerical Example 5>

| | | | |
|---|---|---|---|
| f = 6.10 – 16.00 | Fno = 2.88 – 4.90 | 2ω = 73.4 – 31.8 | |
| R1 = 97.811 | D1 = 1.50 | N1 = 1.802380 | ν1 = 40.8 |
| *R2 = 5.004 | D2 = 2.07 | | |
| R3 = 9.524 | D3 = 2.30 | N2 = 1.846659 | ν2 = 23.8 |
| R4 = 28.731 | D4 = Variable | | |
| R5 = Stop | D5 = 0.80 | | |
| R6 = 7.333 | D6 = 1.91 | N3 = 1.696797 | ν3 = 55.5 |
| R7 = –60.009 | D7 = 0.69 | | |
| *R8 = 15.085 | D8 = 2.20 | N4 = 1.740130 | ν4 = 49.2 |
| R9 = –8.363 | D9 = 0.90 | N5 = 1.698947 | ν5 = 30.1 |
| R10 = 5.298 | D10 = Variable | | |
| R11 = 56.392 | D11 = 1.60 | N6 = 1.487490 | ν6 = 70.2 |
| R12 = –27.331 | D12 = Variable | | |
| *R13 = 18.000 | D13 = 1.80 | N7 = 1.487490 | ν7 = 70.2 |
| R14 = –34.395 | D14 = 1.50 | | |
| R15 = ∞ | D15 = 3.23 | N8 = 1.516330 | ν8 = 64.2 |
| R16 = ∞ | | | |

| Variable | Focal length | | |
|---|---|---|---|
| space | 6.10 | 10.73 | 16.00 |
| D4 | 14.82 | 6.24 | 2.30 |
| D10 | 3.59 | 4.42 | 3.53 |
| D12 | 1.42 | 6.63 | 13.57 |

Aspheric Surface Coefficient
Second surface: k=–1.42414e+00 A=0 B=7.23759e–04 C=–2.08045e–06 D=–2.82830e–08 E=–6.04235e–10
Eighth surface: k=3.27853e+00 A=0 B=–6.89163e–04 C=–1.61482e–05 D=7.84009e–07 E=–9.00555e–08
Thirteenth surface: k=–4.09797e+00 A=0 B=–8.85731e–06 C=4.95899e–06 D=–1.47591e–07 E=1.43418e–09

<Numerical Example 4>

| | | | |
|---|---|---|---|
| f = 6.75 – 17.62 | Fno = 2.88 – 4.90 | 2ω = 68.0 – 29.0 | |
| R1 = 88.033 | D1 = 1.50 | N1 = 1.802380 | ν1 = 40.8 |
| *R2 = 5.336 | D2 = 2.15 | | |
| R3 = 9.867 | D3 = 2.14 | N2 = 1.846659 | ν2 = 23.8 |
| R4 = 27.614 | D4 = Variable | | |
| R5 = Stop | D5 = 0.80 | | |
| R6 = 7.073 | D6 = 2.00 | N3 = 1.696797 | ν3 = 55.5 |
| R7 = –49.011 | D7 = 0.20 | | |
| *R8 = 13.188 | D8 = 2.25 | N4 = 1.743300 | ν4 = 49.2 |
| R9 = –6.389 | D9 = 0.70 | N5 = 1.749497 | ν5 = 35.3 |
| R10 = 5.043 | D10 = Variable | | |
| R11 = 181.307 | D11 = 0.60 | N6 = 1.698947 | ν6 = 30.1 |
| R12 = 16.719 | D12 = 1.80 | N7 = 1.696797 | ν7 = 55.5 |
| R13 = –30.566 | D13 = Variable | | |
| R14 = 18.000 | D14 = 2.00 | N8 = 1.513275 | ν8 = 57.0 |
| R15 = –53.888 | D15 = 1.50 | | |
| R16 = ∞ | D16 = 3.10 | N9 = 1.516330 | ν9 = 64.2 |
| R17 = ∞ | | | |

| Variable | Focal length | | |
|---|---|---|---|
| space | 6.75 | 12.08 | 17.62 |
| D4 | 15.37 | 6.05 | 2.30 |
| D10 | 3.91 | 3.90 | 3.52 |
| D13 | 2.36 | 8.65 | 15.32 |

Aspheric Surface Coefficient
Second surface: k=–1.24318e+00 A=0 B=4.73453e–04 C=9.28313e–07 D=–2.12052e–08 E=1.11929e–10
Eighth surface: k=2.09553e–01 A=0 B=–5.19937e–04 C=–5.60937e–06 D=–1.03207e–06 E=4.79022e–08

<Numerical Example 6>

| | | | |
|---|---|---|---|
| f = 6.76 – 19.09 | Fno = 2.88 – 5.00 | 2ω = 67.9 – 26.8 | |
| R1 = 113.018 | D1 = 1.50 | N1 = 1.802380 | ν1 = 40.8 |
| *R2 = 5.744 | D2 = 1.97 | | |
| R3 = 10.228 | D3 = 2.70 | N2 = 1.846659 | ν2 = 23.8 |
| R4 = 33.176 | D4 = Variable | | |
| R5 = Stop | D5 = 0.80 | | |
| R6 = 15.337 | D6 = 1.30 | N3 = 1.696797 | ν3 = 55.5 |
| R7 = –78.663 | D7 = 0.20 | | |
| *R8 = 6.997 | D8 = 2.86 | N4 = 1.743300 | ν4 = 49.2 |
| R9 = –13.532 | D9 = 0.70 | N5 = 1.749497 | ν5 = 35.3 |
| R10 = 5.016 | D10 = Variable | | |
| R11 = 18.343 | D11 = 0.60 | N6 = 1.846659 | ν6 = 23.8 |
| R12 = 9.017 | D12 = 2.00 | N7 = 1.563839 | ν7 = 60.7 |
| R13 = –47.741 | D13 = Variable | | |
| R14 = 21.000 | D14 = 1.65 | N8 = 1.672700 | ν8 = 32.1 |
| R15 = –135.884 | D15 = 1.50 | | |
| R16 = ∞ | D16 = 3.10 | N9 = 1.516330 | ν9 = 64.2 |
| R17 = ∞ | | | |

| Variable | Focal length | | |
|---|---|---|---|
| space | 6.76 | 13.00 | 19.09 |
| D4 | 18.47 | 6.45 | 2.34 |
| D10 | 3.57 | 3.25 | 3.29 |
| D13 | 2.08 | 9.63 | 16.82 |

Aspheric Surface Coefficient
Second surface: k=–1.50011e+00 A=0 B=5.34016e–04 C=–7.35171e–07 D=–3.40652e–09 E=–1.37860e–10
Eighth surface: k=–3.04524e–01 A=0 B=4.53886e–05 C=1.51254e–06 D=–2.49007e–08 E=–5.02936e–09

<Numerical Example 7>

| f = 6.75 – 17.62 | Fno = 2.88 – 4.90 | 2ω = 68.0 – 29.0 | |
|---|---|---|---|
| R1 = 83.703 | D1 = 1.50 | N1 = 1.802380 | v1 = 40.8 |
| *R2 = 5.363 | D2 = 2.11 | | |
| R3 = 9.804 | D3 = 2.14 | N2 = 1.846659 | v2 = 23.8 |
| R4 = 27.456 | D4 = Variable | | |
| R5 = Stop | D5 = 0.80 | | |
| R6 = 7.081 | D6 = 2.00 | N3 = 1.696797 | v3 = 55.5 |
| R7 = −50.257 | D7 = 0.20 | | |
| *R8 = 13.209 | D8 = 2.24 | N4 = 1.743300 | v4 = 49.2 |
| R9 = −6.336 | D9 = 0.70 | N5 = 1.749497 | v5 = 35.3 |
| R10 = 5.058 | D10 = 3.54 | | |
| R11 = 193.350 | D11 = 0.60 | N6 = 1.698947 | v6 = 30.1 |
| R12 = 17.363 | D12 = 1.85 | N7 = 1.696797 | v7 = 55.5 |
| R13 = −30.373 | D13 = Variable | | |
| R14 = 18.000 | D14 = 2.00 | N8 = 1.513275 | v8 = 57.0 |
| R15 = −51.402 | D15 = 1.50 | | |
| R16 = ∞ | D16 = 3.10 | N9 = 1.516330 | v9 = 64.2 |
| R17 = ∞ | | | |

| Variable | Focal length | | |
|---|---|---|---|
| space | 6.75 | 12.18 | 17.62 |
| D4 | 15.54 | 5.98 | 2.32 |
| D13 | 2.54 | 8.83 | 15.12 |

Aspheric Surface Coefficient
Second surface: k=−1.05082e+00 A=0 B=3.19014e−04 C=1.61194e−06 D=−7.41175e−09 E=−2.85420e−10
Eighth surface: k=2.84690e−01 A=0 B=−5.17986e−04 C=−5.72174e−06 D=−1.00844e−06 E=4.79022e−08

TABLE 2

| Conditional expression | Numerical example | | | |
|---|---|---|---|---|
| | 4 | 5 | 6 | 7 |
| (1) d2ab/fw | 0.58 | 0.59 | 0.53 | 0.52 |
| (2) TD2bt/fw | 0.36 | 0.26 | 0.38 | 0.36 |
| (3) M2ab/fw | 0.06 | 0.15 | 0.05 | — |
| (4) fw/Y | 0.74 | 0.67 | 0.74 | 0.74 |

According to Embodiments 4 to 7 described above, a zoom lens suitable for a digital camera such as a digital still camera or a video camera can be provided in which a lens configuration of each lens unit and a moving method of each lens unit during zooming are optimized to reduce the number of lenses of a total lens system and reduce a total length of the lens system, and the zoom lens has a desired zoom ratio, has bright and high optical performance, and includes a wide angle area.

Figure 29:
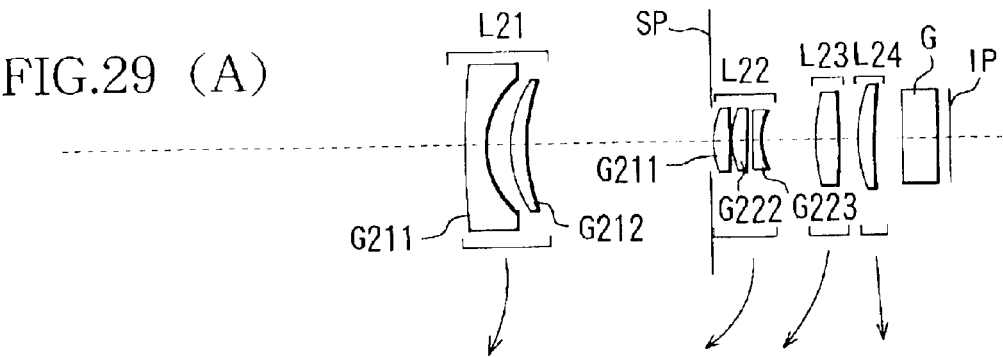
FIG. 29 is an optical sectional view of a zoom lens according to Embodiment 8 of the invention.
Figure 29:
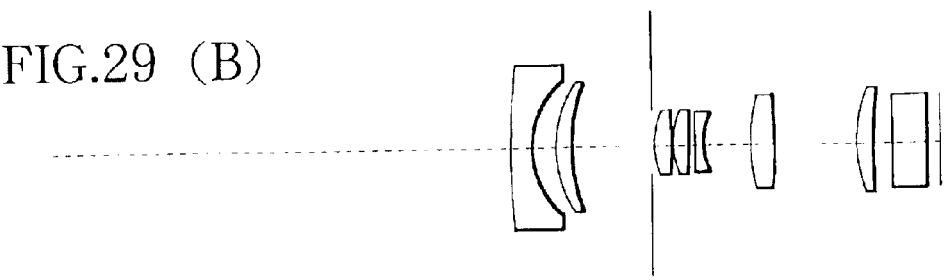
Figure 29:
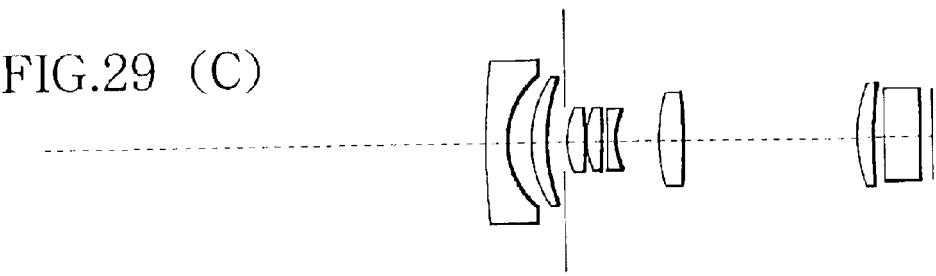
Figure 30:
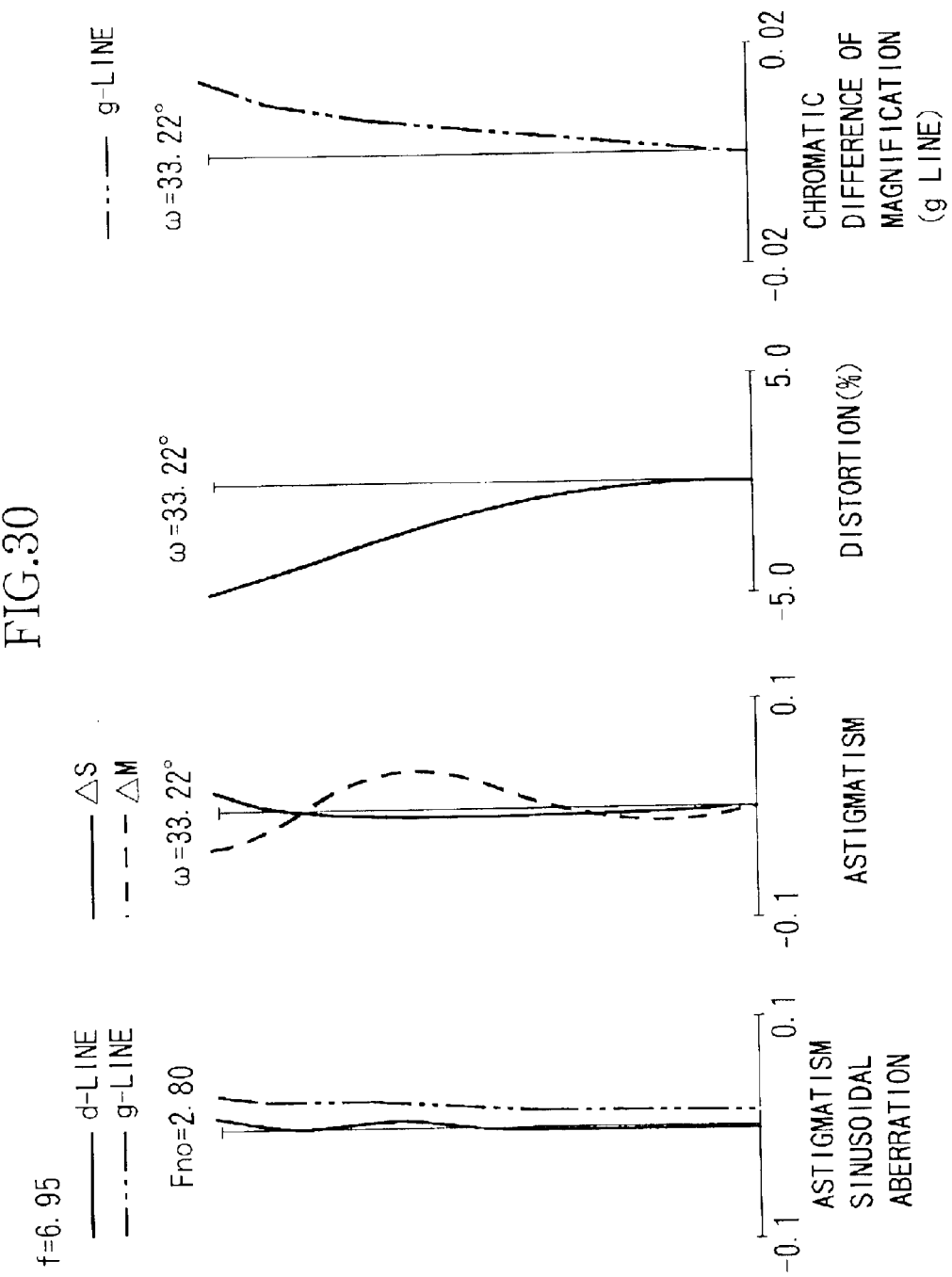
FIG. 30 shows aberration of the zoom lens of Embodiment 8 at a wide angle end.
Figure 31:
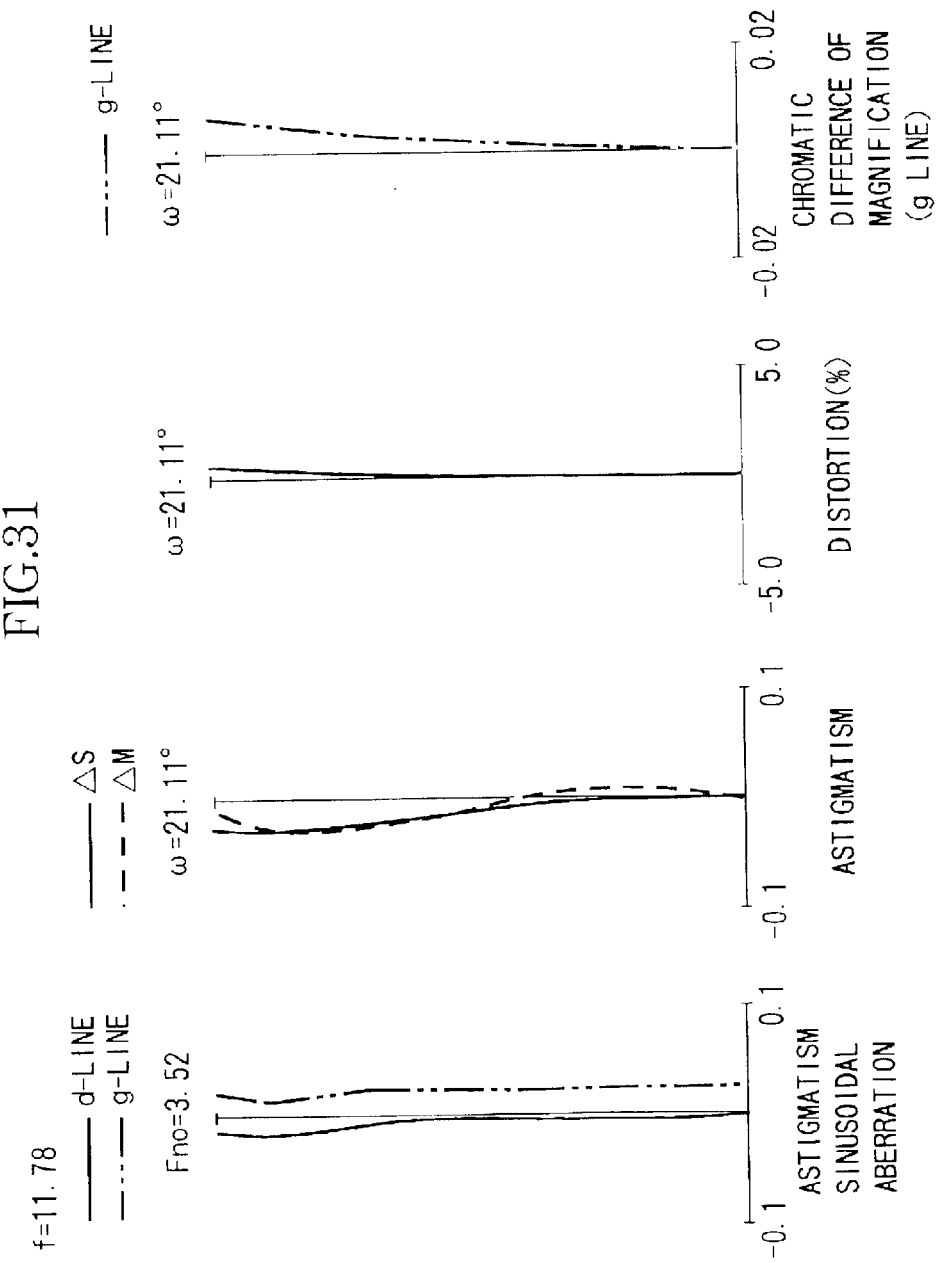
FIG. 31 shows aberration of the zoom lens of Embodiment 8 at an intermediate zoom position.
Figure 32:
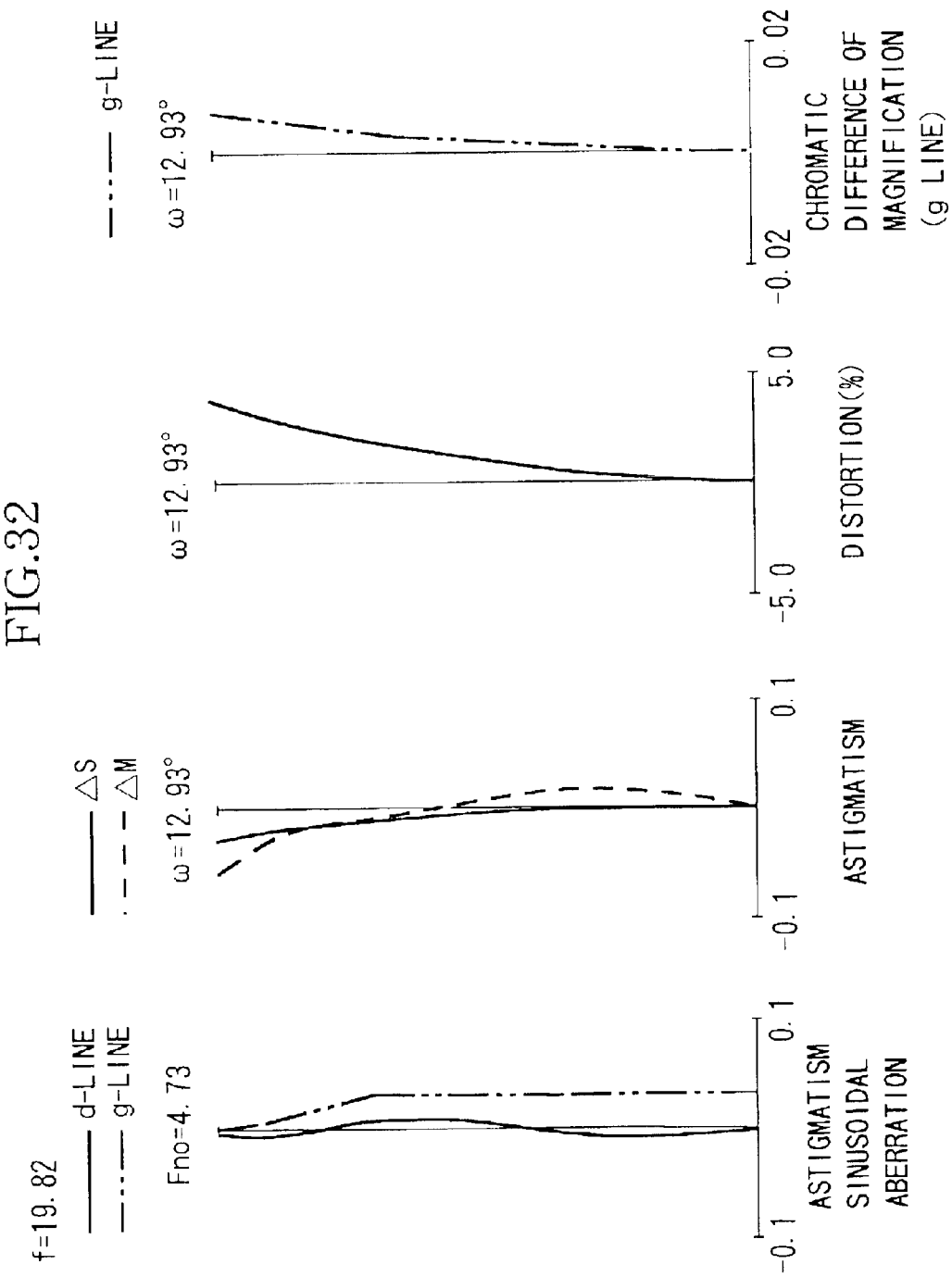
FIG. 32 shows aberration of the zoom lens of Embodiment 8 at a telephoto end.

FIG. 29 is an optical sectional view of a zoom lens according to Embodiment 8 of the invention. FIGS. 30 to 32 show aberrations of the zoom lens of Embodiment 8 at a wide angle end, an intermediate zoom position, and a telephoto end.

Figure 33:
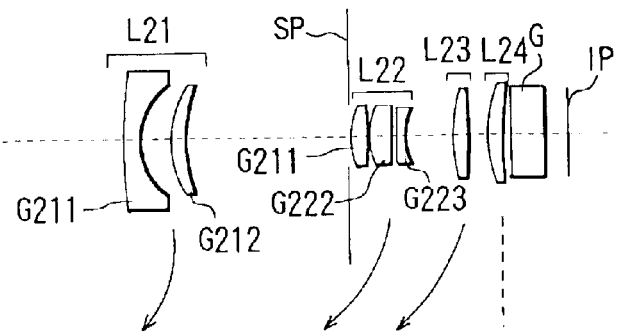
FIG. 33 is an optical sectional view of a zoom lens according to Embodiment 9 of the invention.
Figure 33:
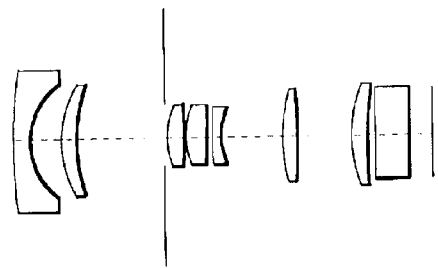
Figure 33:
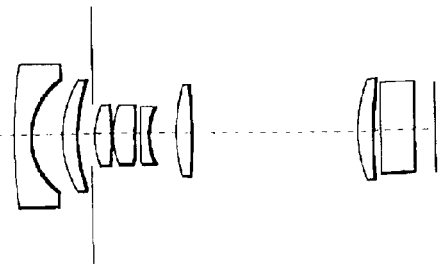
Figure 34:
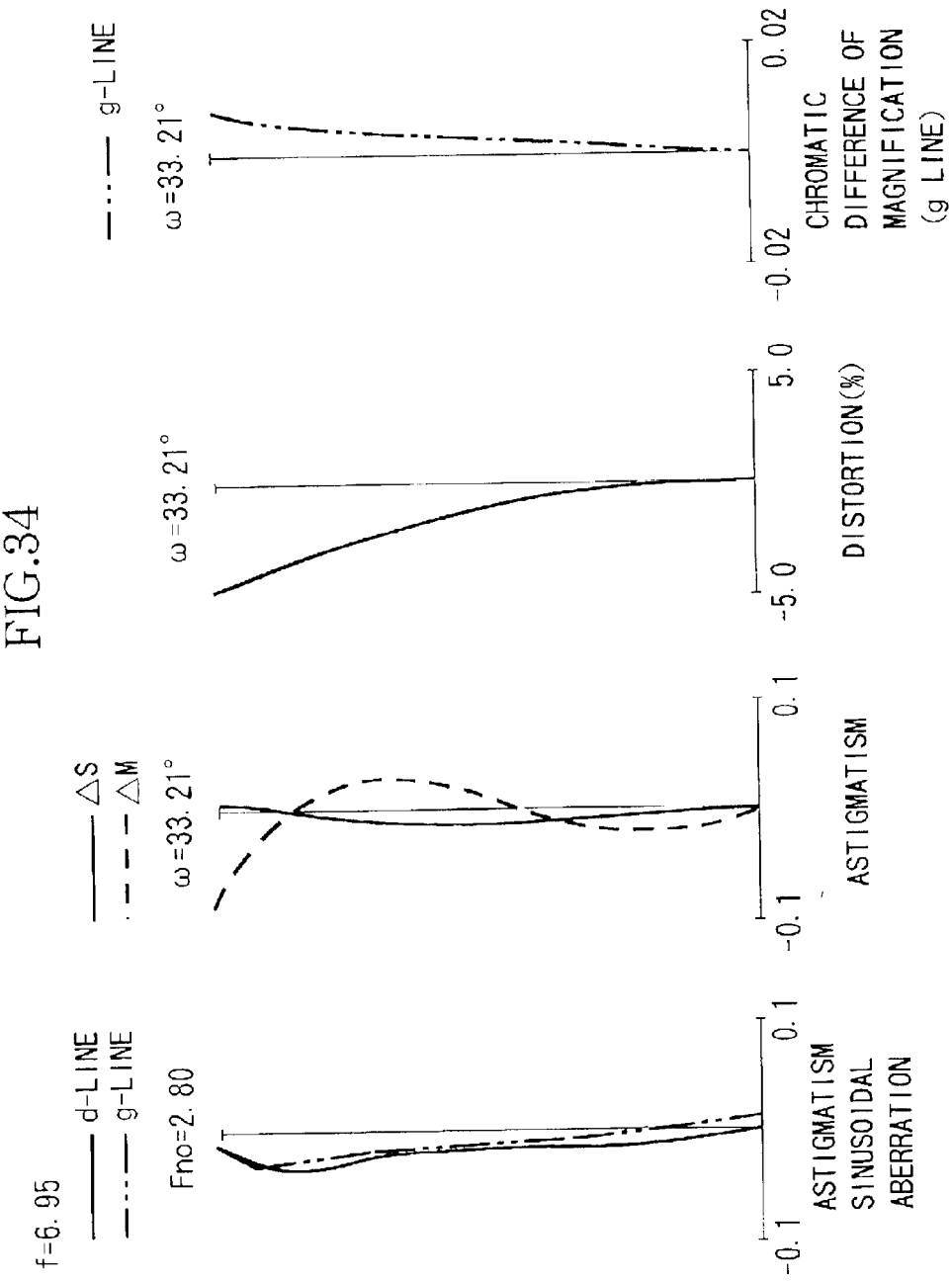
FIG. 34 shows aberration of the zoom lens of Embodiment 9 at a wide angle end.
Figure 35:
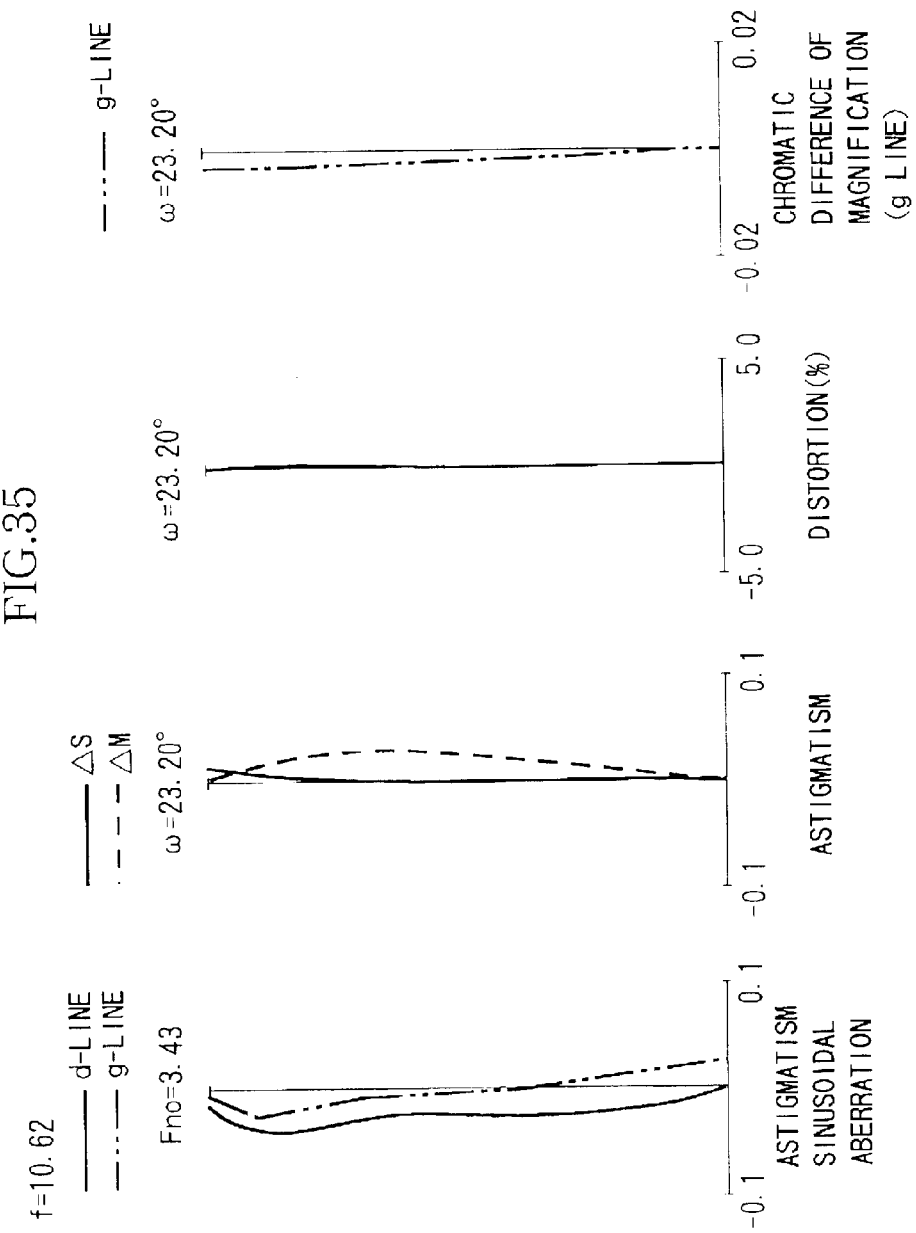
FIG. 35 shows aberration of the zoom lens of Embodiment 9 at an intermediate zoom position.
Figure 36:
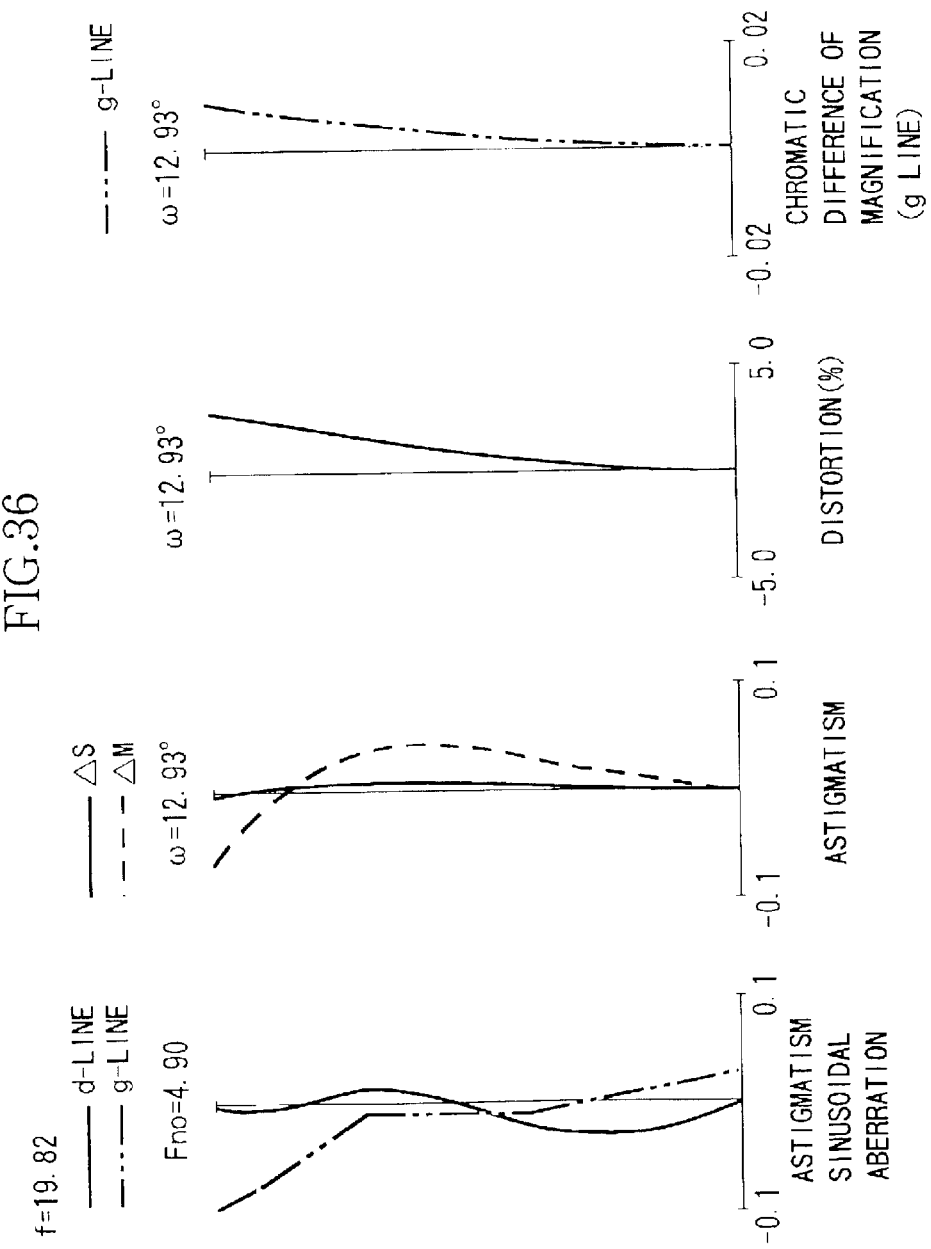
FIG. 36 shows aberration of the zoom lens of Embodiment 9 at a telephoto end.

FIG. 33 is an optical sectional view of a zoom lens according to Embodiment 9 of the invention. FIGS. 34 to 36 show aberrations of the zoom lens of Embodiment 9 at a wide angle end, an intermediate zoom position, and a telephoto end.

Figure 37:
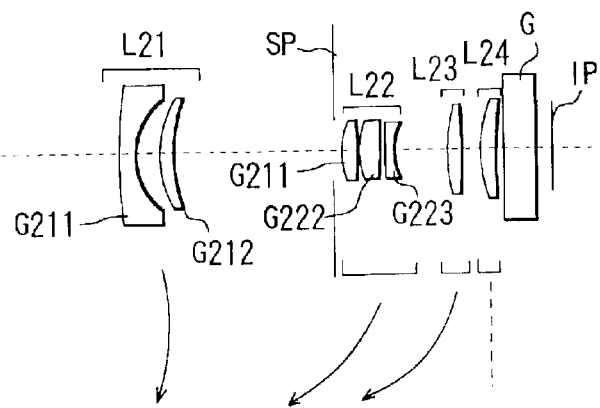
FIG. 37 is an optical sectional view of a zoom lens according to Embodiment 10 of the invention.
Figure 37:
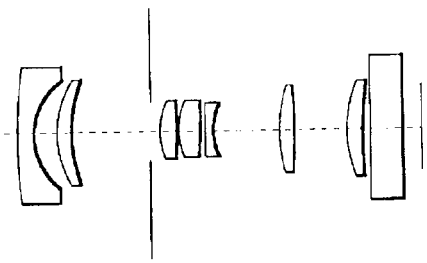
Figure 37:
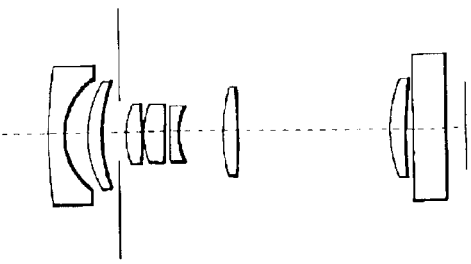
Figure 38:
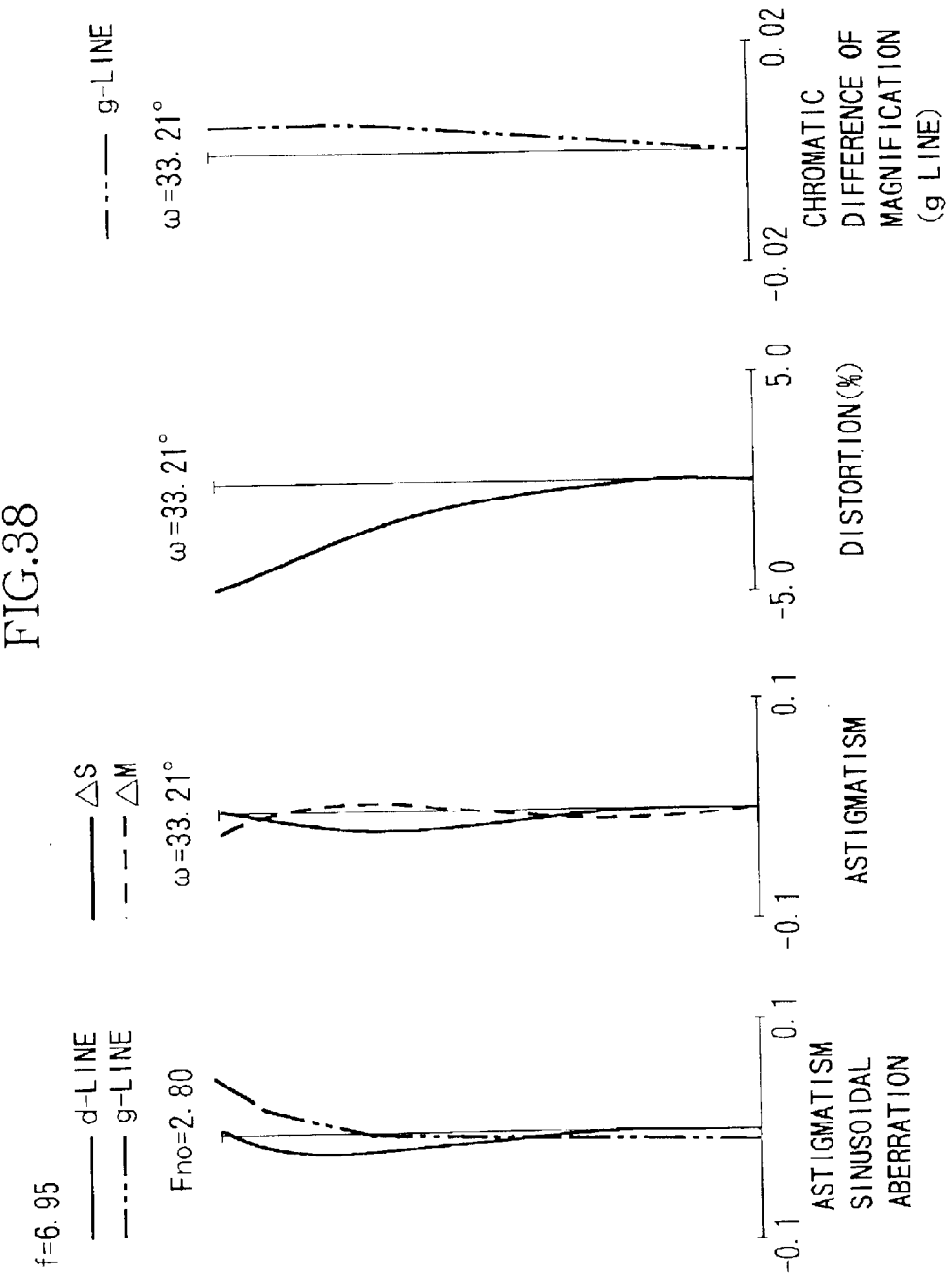
FIG. 38 shows aberration of the zoom lens of Embodiment 10 at a wide angle end.
Figure 39:
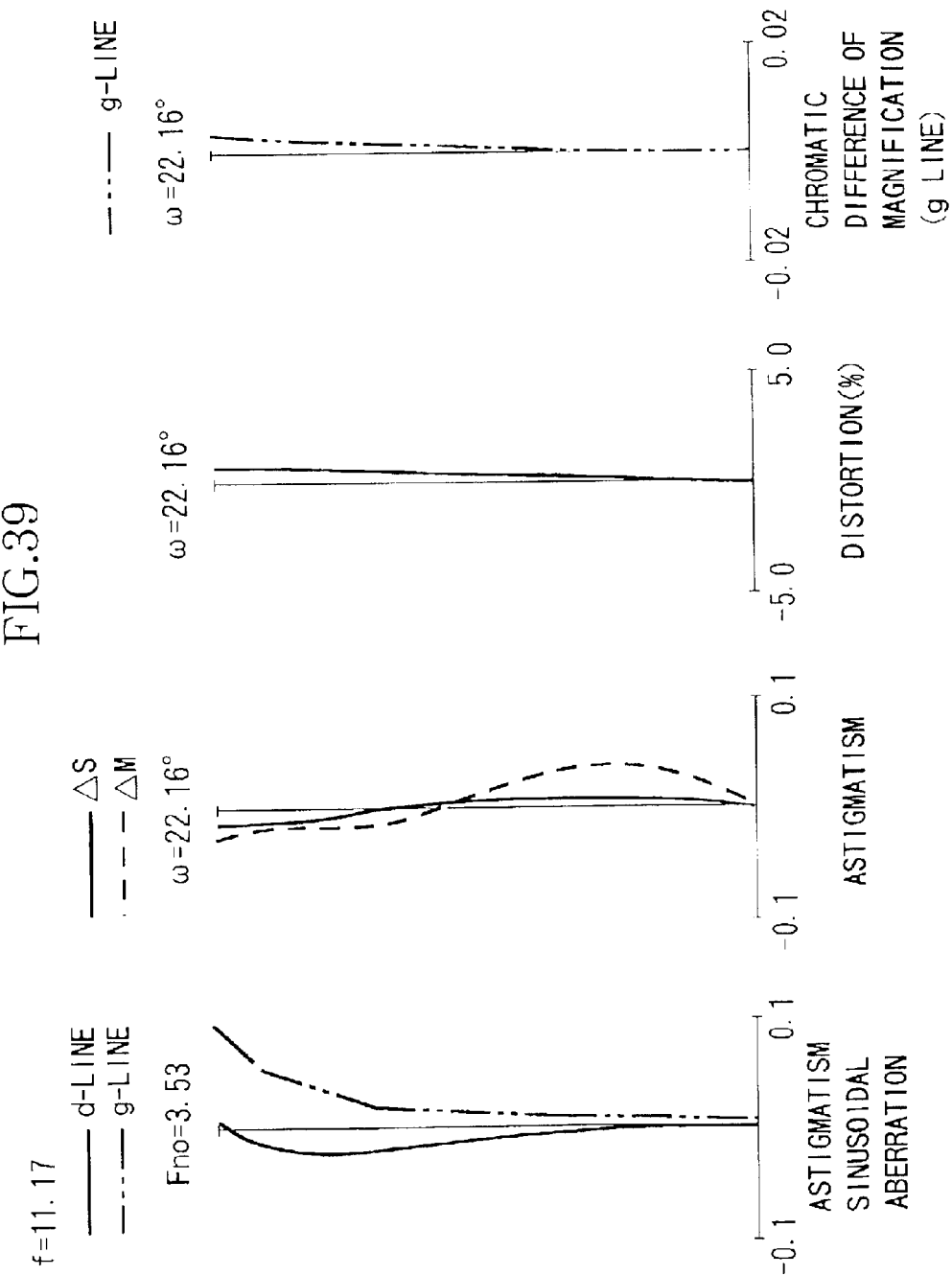
FIG. 39 shows aberration of the zoom lens of Embodiment 10 at an intermediate zoom position.
Figure 40:
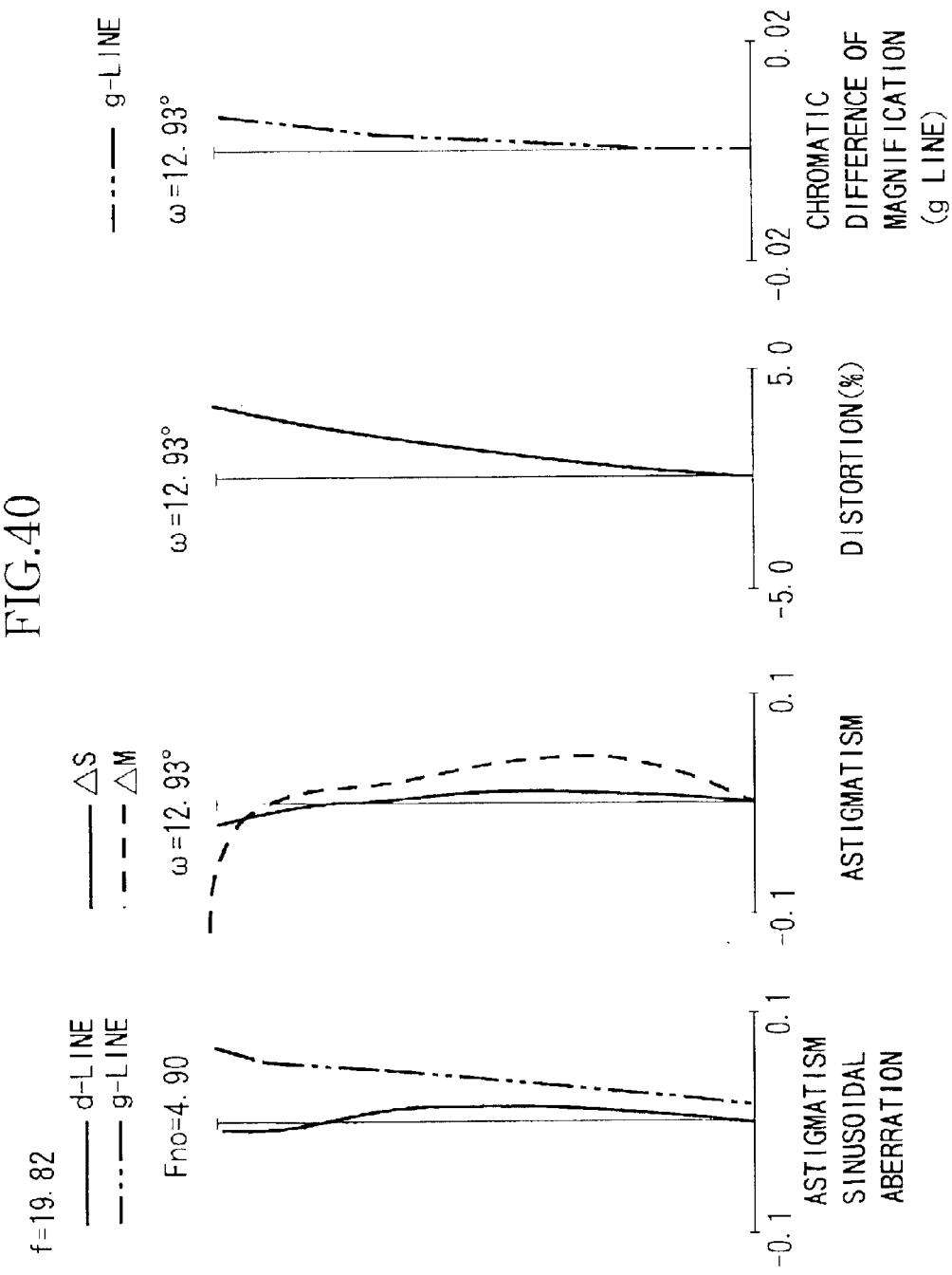
FIG. 40 shows aberration of the zoom lens of Embodiment 10 at a telephoto end.

FIG. 37 is an optical sectional view of a zoom lens according to Embodiment 10 of the invention. FIGS. 38 to 40 show aberrations of the zoom lens of Embodiment 10 at a wide angle end, an intermediate zoom position, and a telephoto end. In the optical sectional views in FIGS. 29, 33, and 37, reference character (A) denotes a zoom position at the wide angle end; (B), the intermediate zoom position; and (C), a zoom position at the telephoto end.

In each optical sectional view, reference character L21 denotes a first lens unit having negative refractive power; L22, a second lens unit having positive refractive power; L23, a third lens unit having positive refractive power; and L24, a fourth lens unit having positive refractive power.

Arrows in the drawings show moving directions of the lens units during zooming from the wide angle end to the telephoto end.

Reference character SP denotes a stop; and IP, an image plane. On the image plane IP, an image pickup plane of an image pickup device in a digital camera described below is placed. Reference character G denotes a glass block such as a face plate or a color filter. Reference character FP denotes a flare stop.

For the zoom lens in Embodiments 8 to 10, both the second lens unit L22 and the third lens unit L23 are moved toward an object such that, during zooming from the wide angle end to the telephoto end, a space between the first lens unit L21 and the second lens unit L22 and a space between the second lens unit L22 and the third lens unit L23 decrease, and a space between the third lens unit L23 and the fourth lens unit L24 increases.

The first lens unit L21 is moved along a part of a convex locus toward the image plane. In Embodiment 8 in FIG. 29, the fourth lens unit L24 is moved toward the image plane. In Embodiments 9 and 10 in FIGS. 33 and 37, the fourth lens unit L24 is fixed during zooming.

As for the zoom lens in Embodiments 8 to 10, the first lens unit L21 consists of two lenses: a negative lens element G211 having an aspheric surface, and a positive lens element G212 in this order from the object side.

The second lens unit L22 has at least one negative lens, and when an Abbe number of a material of the positive lens element G212 in the first lens unit L21 is vd12, the following condition is satisfied:

$$vd12 < 22 \quad (9)$$

In Embodiments 8 to 10, when a refractive index of a material of the negative lens element G211 is Nd11 and an Abbe number thereof is vd11, the following conditions are satisfied:

$$Nd11 > 1.7 \quad (10)$$

$$vd11 > 35 \quad (11)$$

Next, technical meanings of the conditional expressions will be described.

The conditional expression (9) relates to the Abbe number of the material of the positive lens element G212 in the first lens unit L21, and if the Abbe number of the material of the positive lens element G212 increases at a value beyond an upper limit of the conditional expression (9), a deflection ratio of the negative lens element G211 having the aspheric surface in the first lens unit L21 increases to cause difficulty in molding.

If the refractive index of the material of the negative lens element G211 decreases at a value below a lower limit of the conditional expression (10), a deflection ratio between center thickness and edge thickness of the negative lens element G211 having the aspheric surface in the first lens unit L21 increases to cause difficulty in molding.

If the Abbe number of the material of the negative lens element G211 decreases at a value below a lower limit of the conditional expression (11), axial chromatic aberration in a telephoto area is undesirably difficult to correct.

In Embodiments 8 to 10, it is more preferable to set the conditional expressions (9) to (11) as follows:

$vd12 < 20$ (9a)

$Nd11 > 1.72$ (10a)

$vd11 > 38$ (11a)

According to Embodiments 8 to 10, a zoom lens suitable for a digital camera such as a digital still camera or a video camera can be provided in which the above described configuration causes reduction in the number of lenses and reduction in a total length of the lens system, and the zoom lens has an approximately 3× zoom ratio, has bright and high optical performance, includes a wide angle area, and has a simple lens barrel structure.

Next, a further detailed lens configuration of Embodiments 8 to 10 will be described.

In Embodiments 8 to 10, the zoom lens consists of the lens units having negative, positive, positive, and positive refractive power in this order from the object side.

In Embodiments 8 to 10, the first lens unit L21 consists of two lenses: the negative lens element G211 having sharper curvature of a lens surface on the image side than on the object and having the aspheric surface toward the image, and the positive meniscus lens element G212 made of an ultra-dispersion glass material and having a convex surface toward the object in this order from the object side.

The second lens unit L22 consists of the stop SP and three lenses: two positive lens element G221, G222 and one negative lens element G223 in this order from the object side.

The third lens unit L23 consists of a positive single lens element. The fourth lens unit L24 consists of a positive single lens element having sharper curvature of a lens surface on the object side than on the image side.

According to Embodiments 8 to 10, as described above, a zoom lens suitable for a digital still camera can be provided in which the zoom lens has four lens units having negative, positive, positive, and positive refractive power, a lens configuration of each lens unit, a position of an aspheric surface, and a moving method are optimized to reduce the number of lenses and reduce a total length of the lens system, and the zoom lens has an approximately 3× zoom ratio, has bright and extremely high optical performance, and includes a wide angle area.

The positive lens element G212 in the first lens unit L21 is made of the ultra-high-dispersion glass material to weaken power (the inverse of the focal length) of the negative lens element G211 in the first lens unit L21 and reduce the deflection ratio between center thickness and edge thickness. This facilitates molding of the negative lens element G211 that is an aspheric lens.

Embodiments 8 to 10 include two main inventions. The first invention has, as a basic configuration, at least the first lens unit L21 having negative refractive power and the second lens unit L22 having positive refractive power in this order from the object side, zooming is performed by changing the air space between the first lens unit L21 and the second lens unit L22. The first lens unit L21 has the lens configuration as described above, and the conditional expression (9) is satisfied. More preferably, the conditional expressions (10), (11) are satisfied.

The second invention has, as a basic configuration, the first lens unit L21 having negative refractive power, second lens unit L22 having positive refractive power, third lens unit L23 having positive refractive power, and fourth lens unit L24 having positive refractive power, in this order from the object side, and at least the second lens unit L22 and the third lens unit L23 are moved toward the object for zooming from a wide angle side to a telephoto side such that the space between the first lens unit L21 and the second lens unit L22 is smaller, and the space between the third lens unit L23 and the fourth lens unit L24 is larger at the telephoto end than at the wide angle end, and the space between the second lens unit L22 and the third lens unit L23 changes. The first lens unit L21 has the lens configuration as described above, and the conditional expressions (9) to (11) are satisfied.

Now, numerical examples of Embodiments 8 to 10 will be shown. Numerical Examples 8, 9, and 10 correspond to Embodiments 8, 9, and 10. Reference characters in Numerical Examples 8, 9, and 10 have the same meanings as those in Numerical Examples 1, 2, and 3, and the descriptions thereof will be omitted.

Relationships between the above described conditional expressions and the values in the numerical examples will be shown in Table 3.

<Numerical Example 8>

| $f = 6.95 - 19.82$ | $Fno = 2.80 - 4.73$ | $2\omega = 66.4 - 25.9$ | |
|---|---|---|---|
| R1 = 102.240 | D1 = 1.94 | N1 = 1.743300 | ν1 = 49.3 |
| *R2 = 7.383 | D2 = 2.36 | | |
| R3 = 11.094 | D3 = 1.51 | N2 = 1.922860 | ν2 = 18.9 |
| R4 = 16.307 | D4 = Variable | | |
| R5 = Stop | D5 = 0.34 | | |
| *R6 = 8.692 | D6 = 1.57 | N3 = 1.743300 | ν3 = 49.2 |
| R7 = 444.882 | D7 = 0.23 | | |
| R8 = 9.774 | D8 = 1.39 | N4 = 1.834807 | ν4 = 42.7 |
| R9 = −355.940 | D9 = 0.47 | | |
| R10 = −67.413 | D10 = 0.91 | N5 = 1.846660 | ν5 = 23.8 |
| R11 = 5.601 | D11 = Variable | | |
| R12 = 23.667 | D12 = 2.18 | N6 = 1.804000 | ν6 = 46.6 |
| R13 = −88.791 | D13 = Variable | | |
| *R14 = 14.655 | D14 = 1.66 | N7 = 1.583126 | ν7 = 59.4 |
| R15 = 79.800 | D15 = Variable | | |
| R16 = ∞ | D16 = 3.42 | N8 = 1.516330 | ν8 = 64.2 |
| R17 = ∞ | | | |
| R16 = ∞ | D16 = 3.42 | N9 = 1.516330 | ν9 = 64.2 |
| R17 = ∞ | | | |

| Variable | Focal length | | |
|---|---|---|---|
| space | 6.95 | 11.78 | 19.82 |
| D4 | 17.74 | 7.55 | 1.74 |
| D11 | 5.32 | 4.84 | 4.17 |
| D13 | 1.71 | 7.79 | 16.83 |
| D15 | 2.50 | 1.89 | 0.98 |

Aspheric Surface Coefficient

Second surface: k=0.00000e+00 A=0 B=−1.87155e−04 C=−1.36192e−06 D=−1.06179e−08 E=−1.63504e−09

Sixth surface: k=0.00000e+00 A=0 B=−1.30067e−04 C=−4.70732e−06 D=6.20192e−07 E=−3.33052e−08

Fourteenth surface: k=0.00000e+00 A=0 B=−2.41553e−04 C=5.84190e−06 D=−2.57982e−07 E=3.30841e−09

<Numerical Example 9>

| $f = 6.95 - 19.82$ | $Fno = 2.80 - 4.90$ | $2\omega = 66.4 - 25.9$ | |
|---|---|---|---|
| R1 = 63.193 | D1 = 1.50 | N1 = 1.743300 | ν1 = 49.3 |
| *R2 = 6.445 | D2 = 3.07 | | |
| R3 = 10.523 | D3 = 1.37 | N2 = 1.922860 | ν2 = 18.9 |
| R4 = 15.012 | D4 = Variable | | |
| R5 = Stop | D5 = 0.34 | | |

-continued

<Numerical Example 9>

| *R6 = | 8.697 | D6 = 1.68 | N3 = 1.730022 | v3 = 52.8 |
|---|---|---|---|---|
| *R7 = | −73.414 | D7 = 0.23 | | |
| R8 = | 8.028 | D8 = 1.91 | N4 = 1.585982 | v4 = 61.3 |
| R9 = | −91.083 | D9 = 0.47 | | |
| R10 = | −589.742 | D10 = 0.91 | N5 = 1.850011 | v5 = 24.9 |
| R11 = | 5.055 | D11 = Variable | | |
| R12 = | 19.896 | D12 = 1.55 | N6 = 1.586021 | v6 = 40.2 |
| R13 = | −70.648 | D13 = Variable | | |
| *R14 = | 18.366 | D14 = 1.66 | N7 = 1.730770 | v7 = 40.6 |
| R15 = | 100.005 | D15 = 0.75 | | |
| R16 = | ∞ | D16 = 3.42 | N8 = 1.516330 | v8 = 64.2 |
| R17 = | ∞ | | | |
| R16 = | ∞ | D16 = 3.42 | N9 = 1.516330 | v9 = 64.2 |
| R17 = | ∞ | | | |

| Variable | Focal length | | |
|---|---|---|---|
| space | 6.95 | 10.62 | 19.82 |
| D4 | 15.86 | 8.60 | 1.53 |
| D11 | 4.96 | 6.20 | 2.40 |
| D13 | 1.71 | 5.23 | 16.16 |

Aspheric Surface Coefficient
Second surface: k=0.00000e+00 A=0 B=−2.45010e−04
C=−6.22800e−06 D=1.48644e−07 E=−8.12579e−09
Sixth surface: k=0.00000e+00 A=0 B=−6.14955e−05
C=−6.39531e−07 D=1.80803e−06 E=−5.98804e−08
Seventh surface: k=0.00000e+00 A=0 B=1.31188e−04
C=1.56612e−05 D=3.93817e−07 E=0.00000e+00
Fourteenth surface: k=0.00000e+00 A=0 B=−1.38609e−04
C=1.35937e−06 D=0.00000e+00 E=0.00000e+00

<Numerical Example 10> f = 6.95 −19.82   Fno = 2.80 − 4.90   2ω =66.4 − 25.9

| R1 = | 71.517 | D1 = 1.50 | N1 = 1.806100 | v1 = 40.7 |
|---|---|---|---|---|
| *R2 = | 6.546 | D2 = 2.39 | | |
| R3 = | 10.472 | D3 = 1.61 | N2 = 1.922860 | v2 = 18.9 |
| R4 = | 17.375 | D4 = Variable | | |
| R5 = | Stop | D5 = 0.80 | | |
| *R6 = | 11.023 | D6 = 1.73 | N3 = 1.583126 | v3 = 59.4 |
| *R7 = | −19.937 | D7 = 0.23 | | |
| R8 = | 5.608 | D8 = 2.45 | N4 = 1.643507 | v4 = 34.4 |
| R9 = | −17.615 | D9 = 0.91 | N5 = 1.846660 | v5 = 23.8 |
| R10 = | 4.458 | D10 = Variable | | |
| R11 = | 18.804 | D11 = 1.49 | N6 = 1.527082 | v6 = 50.3 |
| R12 = | −96.678 | D12 = Variable | | |
| *R13 = | 17.357 | D13 = 1.66 | N7 = 1.727270 | v7 = 40.6 |
| R14 = | 94.511 | D14 = 0.75 | | |
| R15 = | ∞ | D15 = 3.42 | N8 = 1.516330 | v8 = 64.2 |
| R16 = | ∞ | | | |

| Variable | Focal length | | |
|---|---|---|---|
| space | 6.95 | 11.17 | 19.82 |
| D4 | 16.00 | 8.01 | 1.53 |
| D10 | 5.41 | 6.92 | 4.53 |
| D12 | 1.71 | 5.37 | 15.52 |

Aspheric Surface Coefficient
Second surface: k=0.00000e+00 A=0 B=−2.29038e−04
C=−7.36924e−06 D=2.34103e−07 E=−8.93361e−09
Sixth surface: k=0.00000e+00 A=0 B=6.05876e−05
C=1.21497e−05 D=−6.68719e−08 E=0.00000e+00
Seventh surface: k=0.00000e+00 A=0 B=1.59111e−04
C=1.13640e−05 D=0.00000e+00 E=0.00000e+00
Thirteenth surface: k=0.00000e+00 A=0 B=−2.72178e−04
C=1.70604e−05 D=−8.01931e−07 E=1.40239e−08

TABLE 3

| | Numerical example | | |
|---|---|---|---|
| Conditional expression | 8 | 9 | 10 |
| (1) vd12 | 18.9 | 18.9 | 18.9 |
| (2) Nd11 | 1.743 | 1.743 | 1.806 |
| (3) vd11 | 49.3 | 49.3 | 40.7 |

As described above, according to Embodiments 8 to 10, there can be provided a negative lead type zoom lens with a front lens unit having negative refractive power, refractive power of each lens unit or a material of a lens being appropriately set to simplify a total lens system and achieve a wide angle of view and high optical performance across a zoom range, and a digital camera such as a digital still camera or a video camera using the same.

Figure 41:
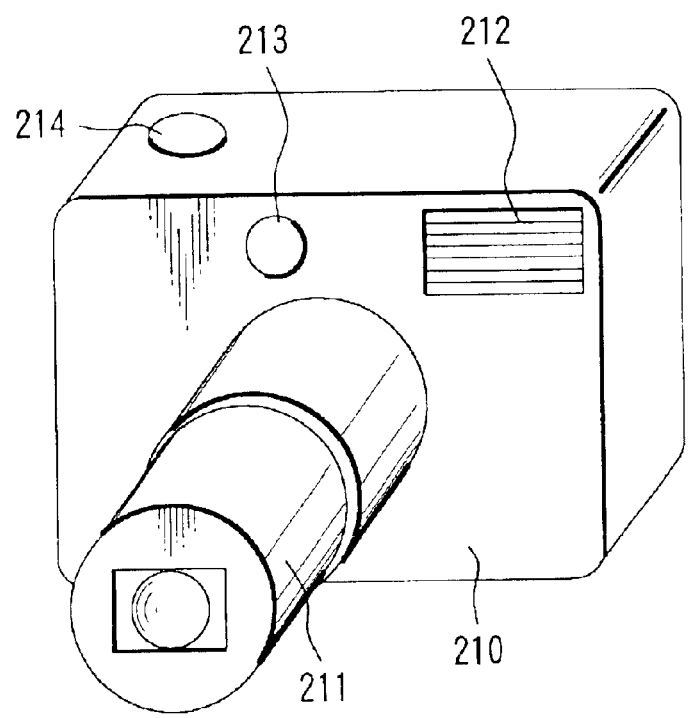
FIG. 41A is a schematic view of a digital camera using the zoom lens according to the embodiments of the invention.
FIG. 41B is a sectional view of the digital camera.
Figure 41:
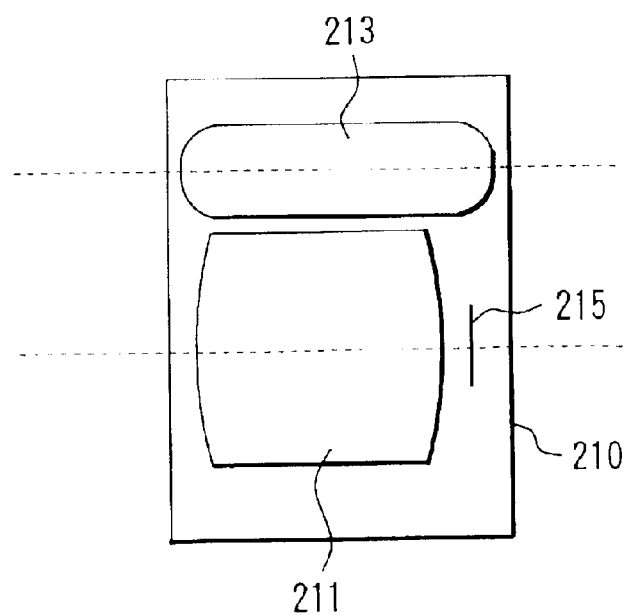

Next, a digital camera using the zoom lens of Embodiments 1 to 10 as an image taking optical system will be described with reference to FIG. 41.

In FIGS. 41(A) and 41(B), reference numeral 210 denotes a camera body; 211, a picture taking optical system consist of the zoom lens of the embodiments; 212, a flash built in the camera body 210; 213, a finder optical system; and 214, a shutter button.

Reference numeral 215 denotes a solid-state image pickup device such as a CCD or a CMOS. The solid-state image pickup device 215 photoelectrically converts an object image formed by the image taking optical system 211. Image information obtained by the photoelectric conversion is stored in an unshown memory.

The zoom lens of Embodiments 8 to 10 is thus applied to the image taking optical system of the digital camera, thereby achieving a compact digital camera having high optical performance.

While preferred embodiments have been described, it is to be understood that modification and variation of two present invention may be made without departing from the spirit or scope of the following claims.

What is claimed is:

1. A zoom lens comprising:
    a first lens unit having negative optical power, said first lens unit having a negative lens element on a closest side to an object;
    a second lens unit having positive optical power, said second lens unit having two or more positive lens elements;
    a third lens unit having positive optical power; and a fourth lens unit having positive optical power, said fourth lens unit consisting of one positive lens component, said units arranged in the order presented from an object side to an image side,
    wherein at least said second lens unit and said third lens unit are moved toward the object for zooming from a wide angle side to a telephoto side such that a space between said first lens unit and said second lens unit is smaller, a space between said second lens unit and said third lens unit is smaller, and a space between said third lens unit and said fourth lens unit is larger at a telephoto end than at a wide angle end.

2. The zoom lens according to claim 1, wherein said zoom lens satisfying the following condition:

$$0.2 < bfw/\sqrt{(fw \times ft)} < 0.7$$

where fw is a focal length of a total lens system at the wide angle end, ft is a focal length of the total lens system at the telephoto end, and bfw is a back focus at the wide angle end.

3. The zoom lens according to claim 1, wherein said zoom lens satisfying the following condition:

$$0.1 < d2t/d2w < 0.7$$

where d2w is the space between said second lens unit and said third lens unit at the wide angle end, and d2t is the space between said second lens unit and said third lens unit at the telephoto end.

4. The zoom lens according to claim 1, wherein said second lens unit has a positive lens element, a positive lens element, and a negative lens element, said elements arranged in the order presented from the object side to the image side.

5. The zoom lens according to claim 1, wherein said first lens unit has two negative lens elements and one-positive lens element.

6. The zoom lens according to claim 1, wherein said first lens unit has one or more aspheric surfaces.

7. The zoom lens according to claim 1, wherein a aperture stop is placed in said second lens unit, said aperture stop moving integral with said second lens unit during zooming.

8. The zoom lens according to claim 1, wherein said first lens unit moves toward the image during zooming from the wide angle end to an intermediate zoom position, and moves toward the object during zooming from the intermediate zoom position to the telephoto end.

9. The zoom lens according to claim 1, wherein said first lens unit moves during zooming.

10. The zoom lens according to claim 1, wherein said zoom lens satisfying the following condition:

$$0.15 < \sqrt{(fw \times ft)} \times < (|1/tkt - 1/tkw|) < 0.35$$
$$2.5 < ft/fw < 4.5$$

where fw is the focal length of the total lens system at the wide angle end, ft is the focal length of the total lens system at the telephoto end tkw is a length from an image plane to an exit pupil at the wide angle end and tkt is a length from an image plane to an exit pupil at the telephoto end.

11. The zoom lens according to claim 10, wherein said zoom lens satisfying the following condition:

$$0.2 < bfw/\sqrt{(fw \times ft)} < 0.7$$

where bfw is the back focus aL Lhe wide angle end.

12. The zoom lens according to claim 11, wherein said zoom lens satisfying the following condition:

$$0.1 < d2t/d2w < 0.7$$

where d2w is the space between said second lens unit and said third lens unit at the wide angle end, and d2t is the space between said second lens unit and said third lens unit at the telephoto end.

13. A camera comprising:
a zoom lens according to claim 1, and an image pickup device photoelectrically converting an object image formed by said zoom lens.

14. A zoom lens comprising:
a first lens unit having negative optical power, said first lens unit having a negative lens element on a closest side to an object;

a second lens unit having positive optical power, said second lens unit having two or more positive lens elements and one or more aspheric surfaces;

a third lens unit having positive optical power; and a fourth lens unit having positive optical power, said units in the order presented from an object side to an image side, wherein at least said second lens unit and said third lens unit are moved toward the object for zooming from a wide angle side to a telephoto side such that a space between said first lens unit and said second lens unit is smaller, a space between said second lens unit and said third lens unit is smaller, and a space between said third lens unit and said fourth lens unit is larger at a telephoto end than at a wide angle end.

15. A camera comprising: a zoom lens according to claim 14, and an image pickup device photoelectrically converting an object image formed by said zoom lens.

16. A zoom lens comprising:
a first lens unit having negative optical power, said first lens unit having a negative lens element on a closest side to an object;

a second lens unit having positive optical power, said second lens unit having two or more positive lens elements;

a third lens unit having positive optical power, said third lens, unit consisting of one positive lens component; and a fourth lens unit having positive optical power, said units arranged in the order presented from an object side to an image side, wherein at least said second lens unit and said third lens unit are moved toward the object for zooming from a wide angle side to a telephoto side such that a space between said first lens unit and said second lens unit is smaller, a space between said second lens unit arid said third lens unit is smaller, and a space between said third lens unit and said fourth lens unit is larger at a telephoto end than at a wide angle end.

17. A camera comprising:
a zoom lens according to claim 16, and an image pickup device photoelectrically converting an object image formed by said zoom lens.

18. A zoom lens comprising:
a first lens unit having negative optical power, said first lens unit having two negative lenses adjacent to each other and a positive lens;

a second lens unit having positive optical power, said second lens unit having one or more aspheric surfaces;

a third lens unit having positive optical power; and a fourth lens unit having positive optical power, said units arranged in the order presented from an object side to an image side, wherein at least said second lens unit and said third lens unit are moved toward the object for zooming from a wide angle side to a telephoto side such that a space between said first lens unit and said second lens unit is smaller, a space between said second lens unit and said third lens unit is smaller, and a space between said third lens unit and said fourth lens unit is larger at a telephoto end than at a wide angle end.

19. A camera comprising: a zoom lens according to claim 18, and an image pickup device photoelectrically converting an object image formed by said zoom lens.

20. A zoom lens comprising:

a first lens unit having negative optical power, said first lens unit having two negative lenses adjacent to each other and a positive lens;

a second lens unit having positive optical power, said second lens unit having two or more positive lens elements;

a third lens unit having positive optical power, said third lens unit consisting of one positive lens component; and a fourth lens unit having positive optical power, said units arranged in the order presented from an object side to an image side, wherein at least said second lens unit and said third lens unit are moved toward the object for zooming to a telephoto side from a wide angle side such that a space between said first lens unit and said second lens unit is smaller, a space between said second lens unit and said third lens unit is smaller, and a space between said third lens unit and said fourth lens unit is larger at a telephoto end than at a wide angle end.

21. A camera comprising: a zoom lens according to claim 20, and an image pickup device photoelectrically converting an object image formed by said zoom lens.

22. A zoom lens comprising:

a first lens unit having negative optical power;

a second lens unit having positive optical power, said second lens unit having two or more positive lens elements;

a third lens unit having positive optical power; and a fourth lens unit having positive optical power, said units arranged in the order presented from an object side to an image side, wherein at least said second lens unit and said third lens unit are moved toward the object for zooming from a wide angle side to a telephoto side such that a space between said first lens unit and said second lens unit is smaller, a space between said second lens unit and said third lens unit is smaller, and a space between said third lens unit and said fourth lens unit is larger at a telephoto end than at a wide angle end, and said zoom lens satisfying the following condition:

$$0.15 < \sqrt{(fw \times ft)} \times (|1/tkt - 1/tkw|) < 0.35$$

$$2.5 < ft/fw < 4.5$$

where fw is a focal length of a total lens system at the wide angle end, ft is a focal length of the total lens system at the telephoto end, tkw is a length from an image plane to an exit pupil at the wide angle end, and tkt is a length from an image plane to an exit pupil at the telephoto end.

23. A camera comprising: a zoom lens according to claim 22, and an image pickup device photoelectrically converting an object image formed by said zoom lens.

24. A zoom lens comprising:

a first lens unit having negative optical power, said first lens unit consisting of a negative lens element, a negative lens element, and a positive lens element, said elements arranged in the order presented from an object side to an image side;

a second lens unit having positive optical power, said second lens unit having two or more positive lens elements and a negative lens element;

a third lens unit having positive optical power, said third lens unit consisting of one positive lens component; and a fourth lens unit having positive optical power, said fourth lens unit consisting of one positive lens component, said units arranged in the order presented from the object side to the image side, wherein at least said second lens unit and said third lens unit are moved toward the object for zooming from a wide angle side to a telephoto side such that a space between said first lens unit and said second lens unit is smaller, a space between said second lens unit and said third lens unit is smaller, and a space between said third lens unit and said fourth lens unit is larger at a telephoto end than at a wide angle end.

25. A camera comprising: a zoom lens according to claim 24, and an image pickup device photoelectrically converting an object image formed by said zoom lens.

26. A zoom lens comprising:

a first lens unit having negative optical power, said first lens unit consisting of having a negative lens element, and a positive lens element, said elements arranged in the order presented from an object side to-an image side;

a second lens unit having positive optical power, said second lens unit consisting of a first lens subunit having positive optical power and a second lens subunit having positive optical power, with a largest space in said second lens unit therebetween; and a third lens unit having positive optical power, said units arranged in the order presented from the object side to the image side, wherein the lens units are moved for zooming such that a space between said first lens unit and said second lens unit is smaller, and a space between said second lens unit and said third lens unit is larger at a telephoto end than at a wide angle end, said first lens subunit having a first positive lens element, a second positive lens element, and a negative lens element, said elements arranged in the order presented from the object side to the image side, and said zoom lens satisfying the following condition:

$$0.2 < d2abW/fw < 1.0$$

where d2abW is a space between said first lens subunit and said second lens subunit under in-focus on an infinite object at the wide angle end, and fw is a focal length of a total lens system at the wide angle end.

27. The zoom lens according to claim 26, wherein said negative lens element of said first lens unit has a lens shape with higher optical power on the image side than on the object side, and has one or more aspheric surface, and said positive lens element of said first lens unit has a meniscus shape with a convex surface toward the object.

28. The zoom lens according to claim 26, wherein said first positive lens element of said first lens subunit has a lens shape with higher optical power on the object side than on the image side, said second positive lens element of said first lens subunit has both convex lens surfaces, said negative lens element of said first lens subunit has both concave lens surfaces, and said second positive lens element and said negative lens element are cemented to each other.

29. The zoom lens according to claim 26, wherein the space between said first lens subunit and said second lens subunit changes during zooming from the wide angle end to the telephoto end.

30. The zoom lens according to claim 26, wherein said second lens subunit is a single lens component consisting of a single lens element or cemented lens element.

31. The zoom lens according to claim 26, wherein said third lens unit consists of a single lens element having higher optical power on the object side than on the image side.

32. The zoom lens according to claim 26, wherein a aperture stop is placed on the object side of said first lens subunit.

33. The zoom lens according to claim 26, wherein said third lens unit does not move for zooming.

34. The zoom lens according to claim 26, wherein said zoom lens satisfying the following condition:

$$0.2 < TD2bt/fw < 0.45$$

where TD2bt is an axial thickness of said second lens subunit.

35. The zoom lens according to claim 26, wherein said zoom lens satisfying the following condition:

$$0.03 < \frac{M2ab}{fw} < 0.16$$

where M2ab is a maximum amount of change in the space between said first lens subunit and said second lens subunit in accordance with zooming from the wide angle end to the telephoto end, and fw is the focal length at the wide angle end.

36. A camera comprising: a zoom lens according to claim 26, and an image pickup device photoelectrically converting an object image formed by said zoom lens.

37. The camera according to claim 36, wherein said zoom lens satisfying the following condition:

$$0.6 < fw/Y < 0.8$$

where Y is a length of a diagonal line of an effective image pickup area of said image pickup device.

38. A zoom lens comprising:
a first lens unit having negative optical power, said first lens unit consisting of a negative lens element with an aspheric surface, and a positive lens element, said elements arranged in the order presented from an object side to an image side; and
a second lens unit having positive optical power, said second lens unit having at least one negative lens element, said units arranged in the order presented from the object side to the image side,
wherein said second lens unit is moved toward the object for zooming from a wide angle side to a telephoto side such that a space between said first lens unit and said second lens unit is smaller at a telephoto end than at a wide angle end, and said zoom lens satisfying the following condition:

$$vd12 < 22$$

where vd12 is an Abbe number of a material of the positive lens element in said first lens unit.

39. The zoom lens according to claim 38, wherein said zoom lens satisfying the following condition:

$$Nd11 > 1.7$$

$$vd11 > 35$$

where Nd11 is a refractive index of a material of the negative lens element in said first lens unit, and vd11 is an Abbe number thereof.

40. A camera comprising: a zoom lens according to claim 38, and an image pickup device photoelectrically converting an object image formed by said zoom lens.

41. A zoom lens comprising:
a first lens unit having negative optical power, said first lens unit consisting of a negative lens element and a positive lens element, said elements arranged in the order presented from an object side to an image side;
a second lens unit having positive optical power, said second lens unit having at least one negative lens element;
a third lens unit having positive optical power; and a fourth lens unit having positive optical power, said units arranged in the order presented from the object side to the image side,
wherein at least said second lens unit and said third lens unit are moved toward the object for zooming from a wide angle side to a telephoto side such that a space between said first lens unit and said second lens unit is smaller, and a space between said third lens unit and said fourth lens unit is larger at a telephoto end than at a wide angle end, and a space between said second lens unit and said third lens unit changes, and said zoom lens satisfying the following condition:

$$Nd11 > 1.7$$

$$vd11 > 35$$

$$vd12 < 22$$

where Nd11 is a refractive index of a material of the negative lens element in said first lens unit, vd11 is an Abbe number thereof, and vd12 is an Abbe number of a material of the positive lens element in said first lens element.

42. A camera comprising: a zoom lens according to claim 41, and an image pickup device photoelectrically converting an object image formed by said zoom lens.

* * * * *